(12) United States Patent
LePoudre et al.

(10) Patent No.: US 12,385,654 B2
(45) Date of Patent: Aug. 12, 2025

(54) SYSTEMS AND METHODS FOR MANAGING CONDITIONS IN ENCLOSED SPACE

(71) Applicant: Nortek Air Solutions, Canada, Inc.

(72) Inventors: Philip Paul LePoudre, Saskatoon (CA); Manfred Gerber, Saskatoon (CA)

(73) Assignee: Nortek Air Solutions Canada, Inc., Saskatoon (CA)

( * ) Notice: Subject to any disclaimer, the term of this patent is extended or adjusted under 35 U.S.C. 154(b) by 918 days.

(21) Appl. No.: 16/606,673

(22) PCT Filed: Apr. 18, 2017

(86) PCT No.: PCT/CA2017/050478
§ 371 (c)(1),
(2) Date: Oct. 18, 2019

(87) PCT Pub. No.: WO2018/191805
PCT Pub. Date: Oct. 25, 2018

(65) Prior Publication Data
US 2021/0239333 A1  Aug. 5, 2021

(51) Int. Cl.
  *F24F 3/14*  (2006.01)
  *F24F 5/00*  (2006.01)
  *F24F 12/00* (2006.01)

(52) U.S. Cl.
  CPC .......... *F24F 3/1417* (2013.01); *F24F 5/0035* (2013.01); *F24F 12/002* (2013.01)

(58) Field of Classification Search
  CPC ...... F24F 3/1417; F24F 5/0035; F24F 12/002; F25B 17/02
  See application file for complete search history.

(56) References Cited

U.S. PATENT DOCUMENTS

| 1,015,831 A | 1/1912 | Pielock et al. |
| 2,186,844 A | 1/1940 | Smith |
| (Continued) | | |

FOREIGN PATENT DOCUMENTS

| AU | 2011286700 A1 | 12/2012 |
| AU | 2011268661 A1 | 1/2013 |
| (Continued) | | |

OTHER PUBLICATIONS

US 10,739,032 B2, 08/2020, LePoudre et al. (withdrawn)
(Continued)

*Primary Examiner* — David J Teitelbaum
(74) *Attorney, Agent, or Firm* — Schwegman Lundberg & Woessner, P.A.

(57) ABSTRACT

A conditioning system includes a first plenum and a second plenum. The second plenum receives heated air from an enclosed space and supplies cooled air to the space. The system also includes a first liquid-to-air membrane energy exchanger (LAMEE1) arranged inside the first plenum. LAMEE1 is configured to use a liquid desiccant to lower an enthalpy of the first air stream. A LAMEE2 is arranged inside the first plenum downstream of LAMEE1. LAMEE2 is configured to use the first air stream to evaporatively cool water flowing through LAMEE2. A first LAHX (LAHX1) is arranged inside the second plenum. LAHX1 is configured to directly and sensibly cool the second air stream using a first cooling fluid. A second LAHX (LAHX2) is in fluid communication with LAMEE1 and is configured to receive the liquid desiccant from LAMEE1 and cool the liquid desiccant using outdoor air.

29 Claims, 15 Drawing Sheets

(56) References Cited

U.S. PATENT DOCUMENTS

| | | |
|---|---|---|
| 2,214,880 A | 9/1940 | Crawford |
| 2,290,465 A | 7/1942 | Crawford et al. |
| 2,562,811 A | 7/1951 | Muffly |
| 2,852,090 A | 9/1958 | Kelley |
| 2,946,201 A | 7/1960 | Munters |
| 2,968,165 A | 1/1961 | Norback |
| 3,009,684 A | 11/1961 | Munters |
| 3,018,231 A | 1/1962 | Valentine et al. |
| 3,144,901 A | 8/1964 | Meek |
| 3,247,679 A | 4/1966 | Meckler |
| 3,291,206 A | 12/1966 | Nicholson |
| 3,401,530 A | 9/1968 | Meckler |
| 3,467,072 A | 9/1969 | Toesca |
| 3,735,559 A | 5/1973 | Salemme |
| 3,820,353 A | 6/1974 | Shiraishi et al. |
| 3,905,205 A | 9/1975 | Zusmanovich |
| 4,011,731 A | 3/1977 | Meckler |
| 4,113,004 A | 9/1978 | Rush et al. |
| 4,171,620 A | 10/1979 | Turner |
| 4,180,985 A | 1/1980 | Northrup, Jr. |
| 4,233,796 A | 11/1980 | Mazzoni et al. |
| 4,235,081 A | 11/1980 | Dowling |
| 4,257,169 A | 3/1981 | Pierce |
| 4,259,849 A | 4/1981 | Griffiths |
| 4,373,347 A | 2/1983 | Howell et al. |
| 4,380,910 A * | 4/1983 | Hood .............. F24F 1/0007 62/91 |
| 4,430,864 A | 2/1984 | Mathiprakasam |
| 4,434,845 A | 3/1984 | Steeb |
| 4,474,021 A | 10/1984 | Harband |
| 4,532,347 A | 7/1985 | Vaughan |
| 4,538,426 A | 9/1985 | Bock |
| 4,594,860 A | 6/1986 | Coellner et al. |
| 4,691,530 A | 9/1987 | Meckler |
| 4,700,550 A | 10/1987 | Rhodes |
| 4,719,761 A | 1/1988 | Cromer |
| 4,723,417 A | 2/1988 | Meckler |
| 4,729,428 A | 3/1988 | Yasutake et al. |
| 4,729,774 A | 3/1988 | Cohen et al. |
| 4,805,317 A | 2/1989 | Inglis et al. |
| 4,841,733 A | 6/1989 | Dussault et al. |
| 4,887,438 A | 12/1989 | Meckler |
| 4,900,448 A | 2/1990 | Bonne et al. |
| 4,905,479 A | 3/1990 | Wilkinson |
| 4,909,810 A | 3/1990 | Nakao et al. |
| 4,930,322 A | 6/1990 | Ashley et al. |
| 4,936,107 A | 6/1990 | Kitagaki et al. |
| 4,939,906 A | 7/1990 | Spatz et al. |
| 4,941,324 A | 7/1990 | Peterson et al. |
| 4,982,575 A | 1/1991 | Besik |
| 5,003,961 A | 4/1991 | Besik |
| 5,020,334 A | 6/1991 | Wilkinson |
| 5,020,335 A | 6/1991 | Albers et al. |
| 5,022,241 A | 6/1991 | Wilkinson |
| 5,076,065 A | 12/1991 | Brogan |
| 5,120,445 A | 6/1992 | Colman |
| 5,131,238 A | 7/1992 | Meckler |
| 5,148,374 A | 9/1992 | Coellner |
| 5,170,633 A | 12/1992 | Kaplan |
| 5,176,005 A | 1/1993 | Kaplan |
| 5,181,387 A | 1/1993 | Meckler |
| 5,191,771 A | 3/1993 | Meckler |
| 5,203,161 A | 4/1993 | Lehto |
| 5,206,002 A | 4/1993 | Skelley et al. |
| 5,297,398 A | 3/1994 | Meckler |
| 5,311,929 A | 5/1994 | Verret |
| 5,325,676 A | 7/1994 | Meckler |
| 5,337,574 A | 8/1994 | Dick |
| 5,351,497 A | 10/1994 | Lowenstein |
| 5,353,606 A | 10/1994 | Yoho et al. |
| 5,373,704 A | 12/1994 | Mcfadden |
| 5,387,376 A | 2/1995 | Gasser |
| 5,448,895 A | 9/1995 | Coellner et al. |
| 5,460,004 A | 10/1995 | Tsimerman |
| 5,471,852 A | 12/1995 | Meckler |
| 5,482,625 A | 1/1996 | Shimizu et al. |
| 5,496,397 A | 3/1996 | Fischer et al. |
| 5,502,975 A | 4/1996 | Brickley et al. |
| 5,517,828 A | 5/1996 | Calton et al. |
| 5,526,651 A | 6/1996 | Worek et al. |
| 5,536,405 A | 7/1996 | Myrna et al. |
| 5,542,968 A | 8/1996 | Belding et al. |
| 5,551,245 A | 9/1996 | Calton et al. |
| 5,564,281 A | 10/1996 | Calton et al. |
| 5,579,647 A | 12/1996 | Calton et al. |
| 5,580,369 A | 12/1996 | Belding et al. |
| 5,632,954 A | 5/1997 | Coellner et al. |
| 5,638,900 A | 6/1997 | Lowenstein et al. |
| 5,649,428 A | 7/1997 | Calton et al. |
| 5,650,221 A | 7/1997 | Belding et al. |
| 5,653,115 A | 8/1997 | Brickley et al. |
| 5,660,048 A | 8/1997 | Belding et al. |
| 5,661,983 A | 9/1997 | Groten et al. |
| 5,685,897 A | 11/1997 | Belding et al. |
| 5,701,762 A | 12/1997 | Akamatsu et al. |
| 5,718,286 A | 2/1998 | Damsohn et al. |
| 5,727,394 A | 3/1998 | Belding et al. |
| 5,732,562 A | 3/1998 | Moratalla |
| 5,749,230 A | 5/1998 | Coellner et al. |
| 5,758,508 A | 6/1998 | Belding et al. |
| 5,758,511 A | 6/1998 | Yoho et al. |
| 5,761,915 A | 6/1998 | Rao |
| 5,761,923 A | 6/1998 | Maeda |
| 5,791,153 A | 8/1998 | Belding et al. |
| 5,791,157 A | 8/1998 | Maeda |
| 5,816,065 A | 10/1998 | Maeda |
| 5,825,641 A | 10/1998 | Mangtani |
| 5,826,434 A | 10/1998 | Belding et al. |
| 5,826,641 A | 10/1998 | Bierwirth et al. |
| 5,832,736 A | 11/1998 | Yoshioka et al. |
| 5,860,284 A | 1/1999 | Goland et al. |
| 5,890,372 A | 4/1999 | Belding et al. |
| 5,911,273 A | 6/1999 | Brenner et al. |
| 5,931,016 A | 8/1999 | Yoho |
| 5,943,874 A | 8/1999 | Maeda |
| 5,946,931 A | 9/1999 | Lomax et al. |
| 5,950,447 A | 9/1999 | Maeda et al. |
| 5,992,160 A | 11/1999 | Bussjager et al. |
| 6,003,327 A | 12/1999 | Belding et al. |
| 6,018,953 A | 2/2000 | Belding et al. |
| 6,018,954 A | 2/2000 | Assaf |
| 6,029,462 A | 2/2000 | Denniston |
| 6,029,467 A | 2/2000 | Moratalla |
| 6,050,100 A | 4/2000 | Belding et al. |
| 6,079,481 A | 6/2000 | Lowenstein et al. |
| 6,094,835 A | 8/2000 | Cromer |
| 6,138,470 A | 10/2000 | Potnis et al. |
| 6,141,979 A | 11/2000 | Dunlap |
| 6,145,588 A | 11/2000 | Martin et al. |
| 6,156,102 A | 12/2000 | Conrad et al. |
| 6,176,101 B1 | 1/2001 | Lowenstein |
| 6,176,305 B1 | 1/2001 | Haglid |
| 6,178,762 B1 | 1/2001 | Flax |
| 6,199,388 B1 | 3/2001 | Fischer |
| 6,199,392 B1 | 3/2001 | Maeda |
| 6,237,354 B1 | 5/2001 | Cromer |
| 6,269,650 B1 | 8/2001 | Shaw |
| 6,318,106 B1 | 11/2001 | Maeda |
| RE37,464 E | 12/2001 | Meckler |
| 6,363,218 B1 | 3/2002 | Lowenstein et al. |
| 6,412,295 B2 | 7/2002 | Weiss et al. |
| 6,442,951 B1 | 9/2002 | Maeda et al. |
| 6,494,053 B1 | 12/2002 | Forkosh |
| 6,497,107 B2 | 12/2002 | Maisotsenko et al. |
| 6,532,763 B1 | 3/2003 | Gupte |
| 6,546,746 B2 | 4/2003 | Forkosh et al. |
| 6,568,466 B2 | 5/2003 | Lowenstein et al. |
| 6,575,228 B1 | 6/2003 | Ragland et al. |
| 6,598,862 B2 | 7/2003 | Merrill et al. |
| 6,635,104 B2 | 10/2003 | Komkova et al. |
| 6,644,059 B2 | 11/2003 | Maeda et al. |
| 6,684,649 B1 | 2/2004 | Thompson |
| 6,709,492 B1 | 3/2004 | Spadaccini et al. |
| 6,720,990 B1 | 4/2004 | Walker et al. |

(56) References Cited

U.S. PATENT DOCUMENTS

| | | |
|---|---|---|
| 6,739,142 B2 | 5/2004 | Korin |
| 6,745,826 B2 | 6/2004 | Lowenstein et al. |
| 6,751,964 B2 | 6/2004 | Fischer |
| 6,800,118 B2 | 10/2004 | Kusunose et al. |
| 6,841,601 B2 | 1/2005 | Serpico et al. |
| 6,848,265 B2 | 2/2005 | Lowenstein et al. |
| 6,854,278 B2 | 2/2005 | Maisotsenko et al. |
| 6,864,005 B2 | 3/2005 | Mossman |
| 6,935,416 B1 | 8/2005 | Tsunoda et al. |
| 6,973,795 B1 | 12/2005 | Moffitt |
| 6,976,365 B2 | 12/2005 | Forkosh et al. |
| 6,978,633 B2 | 12/2005 | Yamazaki |
| 7,000,427 B2 | 2/2006 | Mathias et al. |
| 7,017,356 B2 | 3/2006 | Moffitt |
| 7,092,006 B2 | 8/2006 | Walker et al. |
| 7,093,452 B2 | 8/2006 | Chee et al. |
| 7,093,649 B2 | 8/2006 | Dawson |
| RE39,288 E | 9/2006 | Assaf |
| 7,178,355 B2 | 2/2007 | Moffitt |
| 7,181,918 B2 | 2/2007 | Reinders et al. |
| 7,231,967 B2 | 6/2007 | Haglid |
| 7,251,945 B2 | 8/2007 | Tongue |
| 7,269,966 B2 | 9/2007 | Lowenstein et al. |
| 7,306,650 B2 | 12/2007 | Slayzak et al. |
| 7,331,376 B2 | 2/2008 | Gagnon et al. |
| 7,340,906 B2 | 3/2008 | Moffitt |
| 7,389,646 B2 | 6/2008 | Moffitt |
| 7,389,652 B1 | 6/2008 | Fair |
| 7,593,033 B2 | 9/2009 | Walker et al. |
| 7,601,208 B2 | 10/2009 | Tongue |
| 7,602,414 B2 | 10/2009 | Walker et al. |
| 7,605,840 B2 | 10/2009 | Walker et al. |
| 7,717,404 B2 | 5/2010 | Hasegawa et al. |
| 7,719,565 B2 | 5/2010 | Walker et al. |
| 7,737,224 B2 | 6/2010 | Willis et al. |
| 7,753,991 B2 | 7/2010 | Kertzman |
| 7,781,034 B2 | 8/2010 | Yializis et al. |
| 7,817,182 B2 | 10/2010 | Walker et al. |
| D638,925 S | 5/2011 | Charlebois et al. |
| 7,942,387 B2 | 5/2011 | Forkosh |
| 7,966,841 B2 | 6/2011 | Lowenstein et al. |
| 8,002,023 B2 | 8/2011 | Murayama |
| 8,033,532 B2 | 10/2011 | Yabu |
| 8,047,511 B2 | 11/2011 | Miyauchi et al. |
| 8,137,436 B2 | 3/2012 | Calis et al. |
| 8,141,379 B2 | 3/2012 | Al-Hadhrami et al. |
| 8,157,891 B2 | 4/2012 | Montie et al. |
| 8,318,824 B2 | 11/2012 | Matsuoka et al. |
| 8,469,782 B1 | 6/2013 | Roy |
| 8,470,071 B2 | 6/2013 | Ehrenberg et al. |
| 8,511,074 B2 | 8/2013 | Kuehnel et al. |
| 8,550,151 B2 | 10/2013 | Murayama et al. |
| 8,769,971 B2 | 7/2014 | Kozubal et al. |
| 8,783,053 B2 | 7/2014 | McCann |
| 8,887,523 B2 | 11/2014 | Gommed et al. |
| 8,899,061 B2 | 12/2014 | Reytblat |
| 8,915,092 B2 | 12/2014 | Gerber et al. |
| 8,920,699 B2 | 12/2014 | Marutani et al. |
| 8,943,848 B2 | 2/2015 | Phannavong et al. |
| 8,966,924 B2 | 3/2015 | Pichai |
| 9,021,821 B2 | 5/2015 | Dunnavant |
| 9,027,764 B2 | 5/2015 | Murutani et al. |
| 9,109,808 B2 | 8/2015 | Gerber et al. |
| 9,140,460 B2 | 9/2015 | Woods et al. |
| 9,146,040 B2 | 9/2015 | DeValve |
| 9,188,349 B2 | 11/2015 | Warmerdam et al. |
| 9,234,665 B2 | 1/2016 | Erb et al. |
| 9,243,810 B2 | 1/2016 | Vandermeulen et al. |
| 9,273,877 B2 | 3/2016 | Vandermeulen |
| 9,377,207 B2 | 6/2016 | Vandermeulen et al. |
| 9,423,140 B2 | 8/2016 | Betts et al. |
| 9,429,332 B2 | 8/2016 | Vandermeulen et al. |
| 9,429,366 B2 | 8/2016 | Dubois |
| 9,664,452 B2 | 5/2017 | Takada et al. |
| 9,810,439 B2 | 11/2017 | Coutu et al. |
| 9,816,760 B2 | 11/2017 | LePoudre et al. |
| 9,909,768 B2 | 3/2018 | Gerber et al. |
| 10,197,310 B2 | 2/2019 | Ghadiri Moghaddam et al. |
| 10,302,317 B2 | 5/2019 | Besant et al. |
| 10,352,628 B2 | 7/2019 | Erb et al. |
| 10,480,801 B2 | 11/2019 | Gerber et al. |
| 10,584,884 B2 | 3/2020 | Coutu et al. |
| 10,712,024 B2 | 7/2020 | LePoudre et al. |
| 10,782,045 B2 | 9/2020 | LePoudre et al. |
| 10,808,951 B2 | 10/2020 | LePoudre et al. |
| 10,928,082 B2 | 2/2021 | Coutu et al. |
| 10,962,252 B2 | 3/2021 | LePoudre et al. |
| 11,035,618 B2 | 6/2021 | Lepoudre et al. |
| 11,092,349 B2 | 8/2021 | Lepoudre et al. |
| 11,143,430 B2 | 10/2021 | Ghadiri Moghaddam et al. |
| 11,300,364 B2 | 4/2022 | Erb et al. |
| 11,408,681 B2 | 8/2022 | Lepoudre |
| 11,892,193 B2 | 2/2024 | Lepoudre |
| 2001/0003902 A1 | 6/2001 | Kopko |
| 2002/0005271 A1 | 1/2002 | Weiss et al. |
| 2002/0038552 A1 | 4/2002 | Maisotsenko |
| 2002/0074105 A1 | 6/2002 | Hayashi et al. |
| 2002/0158023 A1 | 10/2002 | Wurzburger |
| 2002/0161254 A1 | 10/2002 | Schattenmann |
| 2003/0014983 A1 | 1/2003 | Maisotsenko et al. |
| 2003/0033821 A1 | 2/2003 | Maisotsenko et al. |
| 2003/0037905 A1 | 2/2003 | Weng |
| 2003/0070787 A1 | 4/2003 | Moffitt |
| 2003/0121271 A1 | 7/2003 | Dinnage et al. |
| 2003/0132166 A1 | 7/2003 | Rey |
| 2003/0145609 A1 | 8/2003 | Maisotsenko et al. |
| 2004/0000152 A1 | 1/2004 | Fischer |
| 2004/0026225 A1 | 2/2004 | Domen |
| 2004/0055329 A1 | 3/2004 | Mathias et al. |
| 2004/0061245 A1 | 4/2004 | Maisotsenko et al. |
| 2004/0134211 A1 | 7/2004 | Lee et al. |
| 2004/0134212 A1 | 7/2004 | Lee et al. |
| 2004/0168462 A1 | 9/2004 | Assaf |
| 2004/0226685 A1 | 11/2004 | Gagnon et al. |
| 2005/0056042 A1 | 3/2005 | Bourne et al. |
| 2005/0072303 A1 | 4/2005 | Weidenmann |
| 2005/0132738 A1 | 6/2005 | Bourne et al. |
| 2005/0230080 A1 | 10/2005 | Paul et al. |
| 2005/0249901 A1 | 11/2005 | Yializis et al. |
| 2005/0262862 A1 | 12/2005 | Moffitt |
| 2005/0279115 A1 | 12/2005 | Lee et al. |
| 2006/0021615 A1 | 2/2006 | Kertzman |
| 2006/0032258 A1 | 2/2006 | Pruitt et al. |
| 2006/0042295 A1 | 3/2006 | Assaf |
| 2006/0118979 A1 | 6/2006 | Beck et al. |
| 2006/0205301 A1 | 9/2006 | Klare et al. |
| 2007/0029685 A1 | 2/2007 | Lin |
| 2007/0056894 A1 | 3/2007 | Connors |
| 2007/0068663 A1 | 3/2007 | Thomer et al. |
| 2007/0095519 A1 | 5/2007 | Hombucher |
| 2007/0234743 A1 | 10/2007 | Assaf |
| 2007/0279861 A1 | 12/2007 | Doll et al. |
| 2008/0023182 A1 | 1/2008 | Beamer et al. |
| 2008/0066888 A1 | 3/2008 | Tong et al. |
| 2008/0085437 A1 | 4/2008 | Dean et al. |
| 2008/0099184 A1 | 5/2008 | Han |
| 2008/0283217 A1 | 11/2008 | Gagnon et al. |
| 2009/0071638 A1 | 3/2009 | Sugiyama et al. |
| 2009/0095162 A1 | 4/2009 | Hargis et al. |
| 2009/0126913 A1 | 5/2009 | Lee et al. |
| 2009/0133866 A1 | 5/2009 | Campbell et al. |
| 2009/0193974 A1 | 8/2009 | Montie et al. |
| 2009/0211977 A1 | 8/2009 | Miller |
| 2009/0294110 A1 | 12/2009 | Foust |
| 2009/0324929 A1 | 12/2009 | Yamakawa et al. |
| 2010/0055276 A1 | 3/2010 | Chen |
| 2010/0058778 A1 | 3/2010 | Bhatti et al. |
| 2010/0090356 A1 | 4/2010 | Sines et al. |
| 2010/0170655 A1 | 7/2010 | Kronvall et al. |
| 2010/0170776 A1 | 7/2010 | Ehrenberg et al. |
| 2010/0181062 A1 | 7/2010 | Mccann |
| 2010/0192605 A1 | 8/2010 | Fang et al. |
| 2010/0200068 A1 | 8/2010 | D'Arcy et al. |
| 2010/0275629 A1 | 11/2010 | Erickson |

(56) References Cited

U.S. PATENT DOCUMENTS

| | | |
|---|---|---|
| 2010/0300123 A1 | 12/2010 | Park et al. |
| 2010/0319370 A1 | 12/2010 | Kozubal et al. |
| 2010/0326914 A1 | 12/2010 | Drost et al. |
| 2011/0056384 A1 | 3/2011 | Kadota |
| 2011/0101549 A1 | 5/2011 | Miyauchi et al. |
| 2011/0138832 A1 | 6/2011 | Al-hadhrami et al. |
| 2011/0192579 A1 | 8/2011 | Sotokawa et al. |
| 2011/0223486 A1 | 9/2011 | Zhang et al. |
| 2011/0232485 A1 | 9/2011 | Ellsworth |
| 2011/0232633 A1 | 9/2011 | Lima |
| 2011/0259572 A1 | 10/2011 | Muratani et al. |
| 2011/0283720 A1 | 11/2011 | Martin |
| 2011/0308265 A1 | 12/2011 | Phannavong et al. |
| 2012/0000227 A1 | 1/2012 | Matsuura et al. |
| 2012/0016700 A1 | 1/2012 | Jabbour et al. |
| 2012/0023988 A1 | 2/2012 | Togano et al. |
| 2012/0031133 A1 | 2/2012 | Kuwabara et al. |
| 2012/0061045 A1 | 3/2012 | Huizing |
| 2012/0073791 A1 | 3/2012 | Dubois |
| 2012/0085112 A1 | 4/2012 | Wintemute |
| 2012/0106073 A1 | 5/2012 | Wu et al. |
| 2012/0125020 A1 | 5/2012 | Vandermeulen et al. |
| 2012/0125021 A1 | 5/2012 | Vandermeulen et al. |
| 2012/0125023 A1 | 5/2012 | Kopko et al. |
| 2012/0125031 A1 | 5/2012 | Vandermeulen et al. |
| 2012/0125405 A1 | 5/2012 | Vandermeulen et al. |
| 2012/0125581 A1 | 5/2012 | Allen et al. |
| 2012/0131934 A1 | 5/2012 | Vandermeulen et al. |
| 2012/0131937 A1 | 5/2012 | Vandermeulen et al. |
| 2012/0131938 A1 | 5/2012 | Vandermeulen et al. |
| 2012/0131939 A1 | 5/2012 | Vandermeulen et al. |
| 2012/0131940 A1 | 5/2012 | Vandermeulen et al. |
| 2012/0132513 A1 | 5/2012 | Vandermeulen et al. |
| 2012/0162918 A1 | 6/2012 | Thyni et al. |
| 2012/0167600 A1 | 7/2012 | Dunnavant |
| 2012/0168369 A1 | 7/2012 | Van Medevoort et al. |
| 2012/0180505 A1 | 7/2012 | Gerber et al. |
| 2012/0186281 A1 | 7/2012 | Vandermeulen et al. |
| 2012/0247132 A1 | 10/2012 | Lakdawala et al. |
| 2012/0298340 A1 | 11/2012 | Al-Otaibi |
| 2013/0056177 A1 | 3/2013 | Coutu et al. |
| 2013/0075066 A1 | 3/2013 | Reytblat |
| 2013/0186121 A1 | 7/2013 | Erb et al. |
| 2013/0199220 A1 | 8/2013 | Ma et al. |
| 2013/0240438 A1 | 9/2013 | Willis et al. |
| 2013/0244046 A1 | 9/2013 | Yaegar et al. |
| 2013/0248147 A1 | 9/2013 | Wintemute et al. |
| 2013/0283837 A1 | 10/2013 | Takahashi et al. |
| 2013/0340449 A1 | 12/2013 | Kozubal et al. |
| 2014/0054004 A1 | 2/2014 | LePoudre et al. |
| 2014/0054013 A1 | 2/2014 | Lepoudre et al. |
| 2014/0069134 A1 | 3/2014 | Grabon |
| 2014/0083648 A1 | 3/2014 | Wawryk |
| 2014/0125060 A1 | 5/2014 | Sahm |
| 2014/0138851 A1 | 5/2014 | Kim et al. |
| 2014/0150481 A1 | 6/2014 | Vandermeulen |
| 2014/0190037 A1 | 7/2014 | Erb et al. |
| 2014/0190198 A1 | 7/2014 | Slessman et al. |
| 2014/0223947 A1 | 8/2014 | Ranjan et al. |
| 2014/0242900 A1 | 8/2014 | Takada et al. |
| 2014/0245769 A1 | 9/2014 | Vandermeulen et al. |
| 2014/0250935 A1* | 9/2014 | Prochaska .......... F28B 9/06 62/271 |
| 2014/0260367 A1* | 9/2014 | Coutu .......... F24F 3/147 62/89 |
| 2014/0260369 A1* | 9/2014 | LePoudre .......... F24F 12/002 62/91 |
| 2014/0260373 A1 | 9/2014 | Gerber et al. |
| 2014/0260399 A1 | 9/2014 | Vandermeulen |
| 2014/0262125 A1 | 9/2014 | Erb et al. |
| 2014/0262144 A1 | 9/2014 | Erb et al. |
| 2014/0326433 A1 | 11/2014 | Kozubal |
| 2014/0340842 A1 | 11/2014 | Towner et al. |
| 2015/0068225 A1* | 3/2015 | Laughman .......... F24F 3/065 62/77 |
| 2015/0096714 A1 | 4/2015 | Dagley |
| 2015/0184876 A1 | 7/2015 | Vandermeulen et al. |
| 2015/0233588 A1 | 8/2015 | Betts et al. |
| 2015/0253018 A1 | 9/2015 | Eguchi et al. |
| 2015/0292754 A1 | 10/2015 | Mongar |
| 2015/0323203 A1 | 11/2015 | Gerber et al. |
| 2016/0054012 A1 | 2/2016 | Lepoudre et al. |
| 2016/0084512 A1 | 3/2016 | Erb et al. |
| 2016/0187010 A1 | 6/2016 | Vandermeulen |
| 2016/0209087 A1 | 7/2016 | Reytblat et al. |
| 2016/0290666 A1 | 10/2016 | Coutu et al. |
| 2016/0298865 A1 | 10/2016 | Gerber et al. |
| 2016/0327345 A1 | 11/2016 | Lowenstein |
| 2017/0241655 A1 | 8/2017 | Lepoudre et al. |
| 2018/0073753 A1 | 3/2018 | Lepoudre et al. |
| 2018/0128510 A1 | 5/2018 | Lepoudre et al. |
| 2018/0135880 A1 | 5/2018 | Ghadiri Moghaddam et al. |
| 2018/0187918 A1 | 7/2018 | Lepoudre et al. |
| 2019/0113247 A1 | 4/2019 | Lepoudre et al. |
| 2019/0212020 A1 | 7/2019 | Besant et al. |
| 2019/0346212 A1 | 11/2019 | Norman Erb et al. |
| 2020/0063995 A1 | 2/2020 | Lepoudre |
| 2020/0096212 A1 | 3/2020 | Lepoudre |
| 2020/0173672 A1 | 6/2020 | Coutu et al. |
| 2021/0231384 A1 | 7/2021 | Lepoudre et al. |
| 2021/0332993 A1 | 10/2021 | Coutu et al. |
| 2021/0396422 A1 | 12/2021 | Ghadiri Moghaddam et al. |
| 2022/0003436 A1 | 1/2022 | Besant et al. |
| 2022/0003437 A1 | 1/2022 | Lepoudre et al. |
| 2022/0333868 A1 | 10/2022 | Lepoudre |
| 2022/0333869 A1 | 10/2022 | Lepoudre |
| 2024/0027083 A1 | 1/2024 | Lepoudre |

FOREIGN PATENT DOCUMENTS

| | | |
|---|---|---|
| AU | 2014231672 B2 | 3/2018 |
| AU | 2015230799 B2 | 3/2018 |
| AU | 2013305427 B2 | 4/2018 |
| AU | 2014231681 B2 | 6/2018 |
| AU | 2013305428 B2 | 9/2018 |
| AU | 2014231668 B2 | 2/2019 |
| AU | 2014231667 B2 | 6/2019 |
| AU | 2017204552 B2 | 7/2019 |
| AU | 2018236791 B2 | 10/2020 |
| AU | 2018204774 B2 | 11/2020 |
| CA | 2283089 A1 | 11/2000 |
| CA | 122381 | 5/2009 |
| CA | 2801352 A1 | 12/2011 |
| CA | 2798928 A1 | 2/2012 |
| CA | 2843763 A1 | 3/2013 |
| CA | 2904224 A1 | 9/2014 |
| CA | 2901483 C | 4/2019 |
| CA | 2880353 C | 9/2020 |
| CA | 3034592 C | 2/2021 |
| CA | 2904224 C | 4/2022 |
| CA | 2901484 C | 7/2022 |
| CA | 2958480 C | 10/2022 |
| CH | 193732 A | 10/1937 |
| CN | 1163389 A | 10/1997 |
| CN | 1343292 A | 4/2002 |
| CN | 1456855 A | 11/2003 |
| CN | 1517610 A | 8/2004 |
| CN | 1518477 A | 8/2004 |
| CN | 1666081 A | 9/2005 |
| CN | 1711448 A | 12/2005 |
| CN | 2821506 Y | 9/2006 |
| CN | 101014807 | 8/2007 |
| CN | 200958820 Y | 10/2007 |
| CN | 101368754 A | 2/2009 |
| CN | 201203217 Y | 3/2009 |
| CN | 101405559 A | 4/2009 |
| CN | 101421580 A | 4/2009 |
| CN | 101469090 A | 7/2009 |
| CN | 101776406 A | 7/2010 |
| CN | 101900385 A | 12/2010 |
| CN | 101918777 A | 12/2010 |
| CN | 102076401 A | 5/2011 |
| CN | 201906567 U | 7/2011 |
| CN | 102149979 A | 8/2011 |

(56) References Cited

FOREIGN PATENT DOCUMENTS

| | | |
|---|---|---|
| CN | 102165268 A | 8/2011 |
| CN | 102232015 A | 11/2011 |
| CN | 102259570 | 11/2011 |
| CN | 102345909 | 2/2012 |
| CN | 102395419 A | 3/2012 |
| CN | 202202899 U | 4/2012 |
| CN | 102548727 A | 7/2012 |
| CN | 102549361 A | 7/2012 |
| CN | 102667350 A | 9/2012 |
| CN | 102713154 A | 10/2012 |
| CN | 102721133 | 10/2012 |
| CN | 102933931 A | 2/2013 |
| CN | 102939397 A | 2/2013 |
| CN | 103068246 A | 4/2013 |
| CN | 103069246 A | 4/2013 |
| CN | 103245018 A | 8/2013 |
| CN | 203116208 U | 8/2013 |
| CN | 103827595 | 5/2014 |
| CN | 104024748 | 9/2014 |
| CN | 104048434 A | 9/2014 |
| CN | 203893703 U | 10/2014 |
| CN | 104136855 A | 11/2014 |
| CN | 104541122 | 4/2015 |
| CN | 104583706 A | 4/2015 |
| CN | 103261801 B | 11/2015 |
| CN | 105121965 | 12/2015 |
| CN | 105121989 A | 12/2015 |
| CN | 105164474 A | 12/2015 |
| CN | 105164484 A | 12/2015 |
| CN | 105202795 A | 12/2015 |
| CN | 105283715 | 1/2016 |
| CN | 101512238 A | 8/2016 |
| CN | 106170660 A | 11/2016 |
| CN | 106471315 | 3/2017 |
| CN | 103827595 B | 4/2017 |
| CN | 105164484 B | 6/2017 |
| CN | 105121989 B | 9/2017 |
| CN | 107249715 A | 10/2017 |
| CN | 107300230 A | 10/2017 |
| CN | 107560482 A | 1/2018 |
| CN | 107850335 A | 3/2018 |
| CN | 107923647 A | 4/2018 |
| CN | 108027221 A | 5/2018 |
| CN | 109028519 A | 12/2018 |
| CN | 109073265 A | 12/2018 |
| CN | 110345803 A | 10/2019 |
| CN | 107300230 B | 11/2019 |
| CN | 107560482 B | 2/2020 |
| CN | 110753819 | 2/2020 |
| CN | 110785615 | 2/2020 |
| CN | 110809698 | 2/2020 |
| CN | 107249715 B | 11/2020 |
| CN | 107850335 B | 2/2021 |
| CN | 108027221 B | 3/2021 |
| CN | 110809698 B | 8/2021 |
| CN | 109073265 B | 9/2021 |
| CN | 107923647 B | 12/2021 |
| CN | 114935182 A | 8/2022 |
| DE | 10143092 A1 | 3/2003 |
| EP | 0448991 A2 | 10/1991 |
| EP | 0661502 A2 | 7/1995 |
| EP | 0678321 A2 | 10/1995 |
| EP | 1108575 A1 | 6/2001 |
| EP | 1347260 A1 | 9/2003 |
| EP | 2351639 A1 | 8/2011 |
| EP | 2397787 A2 | 12/2011 |
| EP | 2751493 B1 | 3/2018 |
| EP | 3314188 A1 | 5/2018 |
| EP | 2893283 B1 | 12/2018 |
| EP | 2972039 B1 | 12/2018 |
| EP | 2971993 B1 | 8/2019 |
| EP | 2971992 B1 | 1/2020 |
| EP | 3421921 B1 | 3/2020 |
| EP | 3183051 B1 | 4/2020 |
| EP | 3486577 B1 | 4/2020 |
| EP | 2972046 B1 | 6/2020 |
| EP | 3499168 B1 | 2/2021 |
| EP | 3314188 B1 | 5/2021 |
| EP | 3295089 B1 | 10/2021 |
| EP | 3295088 B1 | 1/2022 |
| EP | 3612770 B1 | 3/2023 |
| EP | 3612771 B1 | 3/2023 |
| FR | 2291457 A1 | 6/1976 |
| GB | 1354502 A | 6/1974 |
| GB | 2015384 A | 9/1979 |
| HK | 40009311 A1 | 6/2020 |
| HK | 4009311 B | 4/2021 |
| IN | 201717044889 A | 3/2018 |
| IN | 201717044890 A | 3/2018 |
| IN | 201817002765 A | 4/2018 |
| IN | 201817037404 A | 12/2018 |
| IN | 201917046207 | 1/2020 |
| IN | 201917046210 | 1/2020 |
| IN | 201917046215 | 1/2020 |
| IN | 531453 B | 4/2024 |
| JP | 6152594 A | 3/1986 |
| JP | 05157282 A | 6/1993 |
| JP | H09113167 A | 5/1997 |
| JP | 09196482 A | 7/1997 |
| JP | 10170177 A | 6/1998 |
| JP | 2004116419 A | 4/2004 |
| JP | 2004257588 A | 9/2004 |
| JP | 2008070046 A | 3/2008 |
| JP | 2009275955 A | 11/2009 |
| JP | 4870843 B1 | 11/2011 |
| KR | 100607204 B1 | 8/2006 |
| KR | 20110092773 A | 8/2011 |
| KR | 101528640 | 6/2015 |
| SG | 10201809840 | 12/2018 |
| SG | 11201807692 | 2/2020 |
| SG | 10201913923 | 3/2020 |
| TW | I271499 B | 1/2007 |
| WO | WO-9641107 A1 | 12/1996 |
| WO | WO-1996041107 A1 | 12/1996 |
| WO | WO-1999014535 A1 | 3/1999 |
| WO | WO-0135039 A1 | 5/2001 |
| WO | WO-0171260 A1 | 9/2001 |
| WO | WO-0201132 A2 | 1/2002 |
| WO | WO-03049835 A1 | 6/2003 |
| WO | WO-2004065875 A1 | 8/2004 |
| WO | WO-2005100243 A1 | 10/2005 |
| WO | WO-2008037079 A1 | 4/2008 |
| WO | WO-2008053367 A2 | 5/2008 |
| WO | WO-2008089484 A1 | 7/2008 |
| WO | WO-2009000974 A1 | 12/2008 |
| WO | WO-2009094032 A1 | 7/2009 |
| WO | WO-2009158030 A1 | 12/2009 |
| WO | WO-2010006968 A1 | 1/2010 |
| WO | WO-2011062808 A1 | 5/2011 |
| WO | 2011161547 | 12/2011 |
| WO | WO-2011150081 A2 | 12/2011 |
| WO | WO-2011161547 A3 | 12/2011 |
| WO | WO-2012018089 A1 | 2/2012 |
| WO | WO-2012042553 A1 | 4/2012 |
| WO | WO-2012050860 A1 | 4/2012 |
| WO | WO-2012087273 A1 | 6/2012 |
| WO | WO-2012097445 A1 | 7/2012 |
| WO | WO-2012167366 A1 | 12/2012 |
| WO | WO-2013029148 A1 | 3/2013 |
| WO | WO-2013094206 A1 | 6/2013 |
| WO | WO-2013107554 A1 | 7/2013 |
| WO | WO-2013192397 A1 | 12/2013 |
| WO | WO-2014029003 A1 | 2/2014 |
| WO | WO-2014029004 A1 | 2/2014 |
| WO | WO-2014107790 A1 | 7/2014 |
| WO | 2014138851 | 9/2014 |
| WO | WO-2014138846 A1 | 9/2014 |
| WO | WO-2014138847 A1 | 9/2014 |
| WO | WO-2014138859 A1 | 9/2014 |
| WO | WO-2014138860 A1 | 9/2014 |
| WO | WO-2014142277 A1 | 9/2014 |
| WO | 2015123659 | 8/2015 |
| WO | WO-2015192249 A1 | 12/2015 |
| WO | WO-2016026042 A1 | 2/2016 |

(56) References Cited

FOREIGN PATENT DOCUMENTS

| WO | WO-2016074077 A1 | 5/2016 |
|---|---|---|
| WO | 2016183667 | 11/2016 |
| WO | WO-2016183668 A1 | 11/2016 |
| WO | WO-2016207864 A1 | 12/2016 |
| WO | WO-2017152268 A1 | 9/2017 |
| WO | WO-2018191805 A1 | 10/2018 |
| WO | WO-2018191806 A1 | 10/2018 |
| WO | WO-2018191807 A1 | 10/2018 |

OTHER PUBLICATIONS

"International Application Serial No. PCT/CA2017/050478, International Preliminary Report on Patentability mailed Oct. 31, 2019", 7 pgs.
"International Application Serial No. PCT/CA2017/050479, International Preliminary Report on Patentability mailed Oct. 31, 2019", 6 pgs.
"International Application Serial No. PCT/CA2017/050480, International Preliminary Report on Patentability mailed Oct. 31, 2019", 7 pgs.
"Singaporean Application Serial No. 11201909648V, Voluntary Amendment filed Apr. 17, 2020", 10 pgs.
"Singaporean Application Serial No. 11201909681X, Voluntary Amendment filed Apr. 20, 2020", 12 pgs.
"Singaporean Application Serial No. 11201909695X, Voluntary Amendment filed Apr. 17, 2020", 12 pgs.
"European Application Serial No. 17905967.0, Response to Communication Pursuant to Rules 161 and 162 filed Jun. 5, 2020", 5 pgs.
"European Application Serial No. 17906408.4, Response to Communication Pursuant to Rules 161 and 162 filed Jun. 5, 2020", 5 pgs.
"European Application Serial No. 17906575.0, Response to Communication Pursuant to Rules 161 and 162 filed Jun. 5, 2020", 6 pgs.
"Singaporean Application Serial No. 11201909695X, Written Opinion dated Sep. 1, 2020", 6 pgs.
"Singaporean Application Serial No. 11201909648V, Written Opinion dated Sep. 1, 2020", 7 pgs.
"Singaporean Application Serial No. 11201909681X, Written Opinion dated Sep. 1, 2020", 6 pgs.
"European Application Serial No. 17906575.0, Extended European Search Report mailed Oct. 16, 2020", 8 pgs.
"Chinese Application Serial No. 201780092237.9, Office Action mailed Oct. 30, 2020", w/ English translation, 38 pgs.
"European Application Serial No. 17905967.0, Extended European Search Report mailed Nov. 5, 2020", 10 pgs.
"Chinese Application Serial No. 201780092236.4, Office Action mailed Nov. 11, 2020", w/ English machine translation, 11 pgs.
"Chinese Application Serial No. 201780092213.3, Office Action mailed Nov. 11, 2020", w/ English Translation, 32 pgs.
"European Application Serial No. 17906408.4, Extended European Search Report mailed Nov. 27, 2020", 7 pgs.
"Singaporean Application Serial No. 11201909681X, Response filed Jan. 29, 2021 to Written Opinion dated Sep. 1, 2020", 23 pgs.
"Singaporean Application Serial No. 11201909648V, Response filed Feb. 1, 2021 to Written Opinion dated Sep. 1, 2020", 24 pgs.
"Singaporean Application Serial No. 11201909695X, Response filed Feb. 1, 2021 to Written Opinion dated Sep. 1, 2020", 28 pgs.
"NREL's Energy-Saving Technology for Air Conditioning Cuts Peak Power Loads Without Using Harmful Refrigerants", National Renewable Energy Laboratory, Golden, CO, (Jul. 2012), 2 pgs.
Kozubal, Eric, "Seminar 14—Desiccant Enhanced Air Conditioning", NREL 2013 Winter Conference, Dallas, TX, (2013), 5 pgs.
"Energy Savings Potential and RD&D Opportunities for Non-Vapor Compression HVAC Technologies". (Mar. 1, 2014), 199.
"International Application Serial No. PCT/CA2017/050478, International Search Report mailed May 9, 2018", 3 pgs.
"International Application Serial No. PCT/CA2017/050478, Written Opinion mailed May 9, 2018", 5 pgs.
"International Application Serial No. PCT/CA2017/050479, International Search Report mailed Jan. 9, 2018", 3 pgs.
"International Application Serial No. PCT/CA2017/050479, Written Opinion mailed Jan. 9, 2018", 4 pgs.
"International Application Serial No. PCT/CA2017/050480, International Search Report mailed Jan. 11, 2018", 3 pgs.
"International Application Serial No. PCT/CA2017/050480, Written Opinion mailed Jan. 11, 2018", 5 pgs.
El-Dessouky, H T, et al., "A Novel air conditioning system Membrane Air Drying and Evaporative Cooling", Institution of Chemical Engineers Trans IChemE, vol. 78, Part A, Oct. 2000, (Oct. 2000), 999-1009.
Kassai, M, et al., "Performance investigation of liquid-to-air membrane energy exchanger under low solution/air heat capacity rates ratio conditions", Building services engineering research and technology vol. 36(5), (2015), 535-545.
"U.S. Appl. No. 16/606,708, Non Final Office Action mailed Jun. 22, 2021", 18 pgs.
"U.S. Appl. No. 16/606,708, Response filed Sep. 14, 2021 to Non Final Office Action mailed Jun. 22, 2021", 14 pgs.
"U.S. Appl. No. 16/606,716, Non Final Office Action mailed Sep. 17, 2021", 16 pgs.
"Chinese Application Serial No. 201780092213.3, Office Action mailed Aug. 6, 2021", with English translation, 28 pages.
"Chinese Application Serial No. 201780092213.3, Response filed May 26, 2021 to Office Action mailed Nov. 11, 2020", with English claims, 26 pages.
"Chinese Application Serial No. 201780092236.4, Response filed Apr. 14, 2021 to Office Action mailed Nov. 11, 2020", with English claims, 21 pages.
"Chinese Application Serial No. 201780092237.9, Office Action mailed Jul. 28, 2021", with English translation, 41 pages.
"Chinese Application Serial No. 201780092237.9, Response filed May 14, 2021 to Office Action mailed Oct. 30, 2020", with English claims, 35 pages.
"European Application Serial No. 17905967.0, Response filed Jun. 3, 2021 to Extended European Search Report mailed Nov. 5, 2020", 10 pgs.
"European Application Serial No. 17906408.4, Response filed Jun. 22, 2021 to Extended European Search Report mailed Nov. 27, 2020", 16 pgs.
"European Application Serial No. 17906575.0, Response filed May 13, 2021 to Extended European Search Report mailed Oct. 16, 2020", 21 pgs.
"Indian Application Serial No. 201917046207, First Examination Report mailed Sep. 20, 2021", 8 pgs.
"Indian Application Serial No. 201917046210, First Examination Report mailed Jun. 9, 2021", with English translation, 6 pages.
"Indian Application Serial No. 201917046215, First Examination Report mailed Sep. 9, 2021", 9 pgs.
Al-Sulaiman, et al., "Liquid Desiccant based two-stage evaporative cooling system using reverse osmosis (RO) process for regeneration", Applied Thermal Engineering, vol. 27, Issues 14-15, (Oct. 2007), 2449-2452.
"AAONAIRE Energy Recovery Units Users Information Manual", AAON, Inc., (Aug. 2006), 16 pgs.
"Advances in Desiccant-Based Dehumidification", American Standard, TRANE Engineers Newsletter, vol. 34-4, (2005), 8 pgs.
"U.S. Appl. No. 14/190,715, Response filed Jul. 20, 18 to Final Office Action mailed Feb. 20, 2018", 14 pgs.
"U.S. Appl. No. 10/048,797, Amendment and Response filed Apr. 29, 2003 to Non-Final Office mailed Mar. 11, 2003", 10 pgs.
"U.S. Appl. No. 10/048,797, Non-Final Office mailed Mar. 11, 2003", 4 pgs.
"U.S. Appl. No. 10/048,797, Notice of Allowance mailed May 13, 2003", 5 pgs.
"U.S. Appl. No. 13/350,902, Appeal Brief filed Apr. 4, 2014", 24 pgs.
"U.S. Appl. No. 13/350,902, Appeal Decision mailed Sep. 30, 2016", 6 pgs.
"U.S. Appl. No. 13/350,902, Examiner's Answer mailed Jun. 16, 2014", 17 pgs.
"U.S. Appl. No. 13/350,902, Final Office Action mailed Dec. 30, 2013", 13 pgs.

(56) References Cited

OTHER PUBLICATIONS

"U.S. Appl. No. 13/350,902, Non Final Office Action mailed Oct. 1, 2013", 13 pgs.
"U.S. Appl. No. 13/350,902, Notice of Allowance mailed Mar. 1, 2017", 7 pgs.
"U.S. Appl. No. 13/350,902, Notice of Allowance mailed Nov. 9, 2016", 9 pgs.
"U.S. Appl. No. 13/350,902, Reply Brief filed Jul. 8, 2014", 9 pgs.
"U.S. Appl. No. 13/350,902, Response filed Aug. 5, 2013 to Restriction Requirement mailed Jul. 23, 2013", 2 pgs.
"U.S. Appl. No. 13/350,902, Response filed Oct. 29, 2013 to Non Final Office Action mailed Oct. 1, 2013", 15 pgs.
"U.S. Appl. No. 13/350,902, Restriction Requirement mailed Jul. 23, 2013", 8 pgs.
"U.S. Appl. No. 13/449,598, Final Office Action mailed Feb. 4, 2016", 23 pgs.
"U.S. Appl. No. 13/449,598, Non Final Office Action mailed Apr. 24, 2015", 18 pgs.
"U.S. Appl. No. 13/449,598, Non Final Office Action mailed Aug. 27, 2015", 20 pgs.
"U.S. Appl. No. 13/449,598, Notice of Allowance mailed Mar. 10, 2017", 7 pgs.
"U.S. Appl. No. 13/449,598, Notice of Allowance mailed Jul. 6, 2017", 7 pgs.
"U.S. Appl. No. 13/449,598, Notice of Allowance mailed Nov. 4, 2016", 9 pgs.
"U.S. Appl. No. 13/449,598, Response filed Jan. 29, 2015 to Restriction Requirement mailed Jan. 5, 2015", 2 pgs.
"U.S. Appl. No. 13/449,598, Response filed Jul. 17, 2015 to Non Final Office Action mailed Apr. 24, 2015", 17 pgs.
"U.S. Appl. No. 13/449,598, Response filed Nov. 16, 2015 to Non Final Office Action mailed Aug. 27, 2015", 18 pgs.
"U.S. Appl. No. 13/449,598, Restriction Requirement mailed Jan. 5, 2015", 10 pgs.
"U.S. Appl. No. 13/702,596, Appeal Brief filed Jun. 15, 2015", 82 pgs.
"U.S. Appl. No. 13/702,596, Final Office Action mailed Jan. 30, 2015", 15 pgs.
"U.S. Appl. No. 13/702,596, Non Final Office Action mailed Oct. 30, 2014", 16 pgs.
"U.S. Appl. No. 13/702,596, Notice of Allowance mailed Oct. 1, 2015", 7 pgs.
"U.S. Appl. No. 13/702,596, Notice of Allowance mailed Nov. 25, 2015", 2 pgs.
"U.S. Appl. No. 13/702,596, Post Allowance Amendment filed Oct. 7, 2015", 13 pgs.
"U.S. Appl. No. 13/702,596, PTO Response to Rule 312 Communication mailed Oct. 19, 2015", 2 pgs.
"U.S. Appl. No. 13/702,596, Response filed Dec. 15, 2014 to Non Final Office Action mailed Oct. 30, 2014", 21 pgs.
"U.S. Appl. No. 13/797,062 , Appeal Decision mailed Jun. 18, 2021", 12 pgs.
"U.S. Appl. No. 13/797,062, Amendment and Response Under 37 C.F.R. 1.116 Filed Jan. 22, 2018 to Final Office Action mailed Feb. 24, 2016", 11 pgs.
"U.S. Appl. No. 13/797,062, Appeal Brief filed Mar. 25, 2020", 27 pgs.
"U.S. Appl. No. 13/797,062, Appeal Brief filed Jun. 9, 2016", 33 pgs.
"U.S. Appl. No. 13/797,062, Appeal Decision mailed Nov. 22, 2017", 15 pgs.
"U.S. Appl. No. 13/797,062, Final Office Action mailed Feb. 24, 2016", 29 pgs.
"U.S. Appl. No. 13/797,062, Final Office Action mailed Jul. 13, 2018", 22 pgs.
"U.S. Appl. No. 13/797,062, Final Office Action mailed Jul. 25, 2019", 50 pgs.
"U.S. Appl. No. 13/797,062, Non Final Office Action mailed Feb. 21, 2018", 21 pgs.
"U.S. Appl. No. 13/797,062, Non Final Office Action mailed May 7, 2015", 19 pgs.
"U.S. Appl. No. 13/797,062, Non Final Office Action mailed Sep. 25, 2015", 24 pgs.
"U.S. Appl. No. 13/797,062, Non Final Office Action mailed Dec. 28, 2018", 50 pgs.
"U.S. Appl. No. 13/797,062, Respnose filed Jun. 28, 2019 to Non Final Office Action mailed Jun. 28, 2019", 12 pgs.
"U.S. Appl. No. 13/797,062, Response filed Apr. 23, 2015 to Restriction Requirement mailed Mar. 13, 2015", 3 pgs.
"U.S. Appl. No. 13/797,062, Response filed Jul. 17, 2015 to Non Final Office Action mailed May 7, 2015", 16 pgs.
"U.S. Appl. No. 13/797,062, Response filed Nov. 30, 2015 to Non Final Office Action mailed Sep. 25, 2015", 16 pgs.
"U.S. Appl. No. 13/797,062, Response filed Dec. 13, 2018 to Final Office Action mailed Jul. 13, 2018", 12 pgs.
"U.S. Appl. No. 13/797,062, Response filed May 21, 2018 to Non Final Office Action mailed Feb. 21, 2018", 12 pgs.
"U.S. Appl. No. 13/797,062, Restriction Requirement mailed Mar. 13, 2015", 8 pgs.
"U.S. Appl. No. 13/797,152, Appeal Brief filed Jun. 9, 2016", 29 pgs.
"U.S. Appl. No. 13/797,152, Corrected Notice of Allowance mailed Mar. 9, 2017", 7 pgs.
"U.S. Appl. No. 13/797,152, Final Office Action mailed Feb. 25, 2016", 14 pgs.
"U.S. Appl. No. 13/797,152, Non Final Office Action mailed Aug. 25, 2015", 10 pgs.
"U.S. Appl. No. 13/797,152, Notice of Allowance mailed Mar. 9, 2017", 7 pgs.
"U.S. Appl. No. 13/797,152, Notice of Allowance mailed Jun. 27, 2017", 8 pgs.
"U.S. Appl. No. 13/797,152, Notice of Allowance mailed Oct. 31, 2016", 7 pgs.
"U.S. Appl. No. 13/797,152, Response file Nov. 20, 2015 to Non Final Office Action mailed Aug. 25, 2015", 12 pgs.
"U.S. Appl. No. 13/801,280, 312 Amendment filed Jun. 18, 2015", 8 pgs.
"U.S. Appl. No. 13/801,280, Non Final Office Action mailed Feb. 12, 2015", 7 pgs.
"U.S. Appl. No. 13/801,280, Notice of Allowance mailed May 19, 2015", 7 pgs.
"U.S. Appl. No. 13/801,280, PTO Response to 312 Amendment mailed Jul. 9, 2015", 2 pgs.
"U.S. Appl. No. 13/801,280, Response filed Jan. 7, 2015 to Restriction Requirement mailed Dec. 10, 2014", 1 pg.
"U.S. Appl. No. 13/801,280, Response filed Mar. 31, 2015 to Non Final Office Action mailed Dec. 10, 2014", 1 pg.
"U.S. Appl. No. 13/801,280, Response filed Mar. 31, 2015 to Non-Final Office Action mailed Feb. 12, 2015", 9 pgs.
"U.S. Appl. No. 13/801,280, Restriction Requirement mailed Dec. 10, 2014", 9 pgs.
"U.S. Appl. No. 14/171,951, Advisory Action mailed Nov. 10, 2016", 3 pgs.
"U.S. Appl. No. 14/171,951, Final Office Action mailed Jun. 28, 2016", 36 pgs.
"U.S. Appl. No. 14/171,951, Non Final Office Action mailed May 2, 2016", 35 pgs.
"U.S. Appl. No. 14/171,951, Notice of Allowability mailed Jul. 18, 2018", 2 pgs.
"U.S. Appl. No. 14/171,951, Notice of Allowance mailed Jan. 9, 2019", 6 pgs.
"U.S. Appl. No. 14/171,951, Notice of Allowance mailed Jan. 19, 2018", 5 pgs.
"U.S. Appl. No. 14/171,951, Notice of Allowance mailed Feb. 3, 2017", 5 pgs.
"U.S. Appl. No. 14/171,951, Notice of Allowance mailed May 23, 2018", 5 pgs.
"U.S. Appl. No. 14/171,951, Notice of Allowance mailed Jun. 8, 2017", 5 pgs.
"U.S. Appl. No. 14/171,951, Notice of Allowance mailed Oct. 3, 2017", 5 pgs.

(56) References Cited

OTHER PUBLICATIONS

"U.S. Appl. No. 14/171,951, Notice of Allowance mailed Nov. 6, 2019", 6 pgs.
"U.S. Appl. No. 14/171,951, Response filed Mar. 28, 2016 to Non Final Office Action mailed Jan. 5, 2016", 18 pgs.
"U.S. Appl. No. 14/171,951, Response filed Jun. 9, 2016 to Non Final Office Action mailed May 2, 2016", 24 pgs.
"U.S. Appl. No. 14/171,951, Response filed Oct. 28, 2016 to Final Office Action mailed Jun. 28, 2016", 15 pgs.
"U.S. Appl. No. 14/171,951, Response filed Dec. 3, 2015 to Restriction Requirement mailed Nov. 16, 2015", 6 pgs.
"U.S. Appl. No. 14/171,951, Response filed Dec. 15, 2016 to Advisory Action mailed Nov. 10, 2016", 16 pgs.
"U.S. Appl. No. 14/171,951, Restriction Requirement mailed Nov. 16, 2015", 13 pgs.
"U.S. Appl. No. 14/186,420, Notice of Allowance mailed Jan. 27, 2017", 7 pgs.
"U.S. Appl. No. 14/187,413 Response to Non-Final Office Action filed Jun. 2, 2020", 25 pgs.
"U.S. Appl. No. 14/187,413, Advisory Action mailed Nov. 10, 2016", 4 pgs.
"U.S. Appl. No. 14/187,413, Advisory Action mailed Dec. 17, 2018", 5 pgs.
"U.S. Appl. No. 14/187,413, Amendment and Response filed Nov. 30, 2018 to Final Office Action mailed Jul. 26, 2018", 19 pgs.
"U.S. Appl. No. 14/187,413, Appeal Decision mailed Mar. 10, 2022", 11 pgs.
"U.S. Appl. No. 14/187,413, Examiner's Answer mailed Jun. 11, 2021", 10 pgs.
"U.S. Appl. No. 14/187,413, Final Office Action mailed Jun. 15, 2020", 19 pgs.
"U.S. Appl. No. 14/187,413, Final Office Action mailed Jun. 27, 2017", 16 pgs.
"U.S. Appl. No. 14/187,413, Final Office Action mailed Jul. 26, 2018", 16 pgs.
"U.S. Appl. No. 14/187,413, Final Office Action mailed Jul. 28, 2016", 20 pgs.
"U.S. Appl. No. 14/187,413, Non Final Office Action mailed Feb. 8, 2017", 15 pgs.
"U.S. Appl. No. 14/187,413, Non Final Office Action mailed Mar. 17, 2016", 15 pgs.
"U.S. Appl. No. 14/187,413, Non Final Office Action mailed Jul. 31, 2019", 22 pgs.
"U.S. Appl. No. 14/187,413, Non Final Office Action mailed Dec. 18, 2017", 20 pgs.
"U.S. Appl. No. 14/187,413, Notice of Allowance mailed Mar. 29, 2022", 7 pgs.
"U.S. Appl. No. 14/187,413, Response filed Feb. 25, 2015 to Restriction Requirement mailed Feb. 16, 2016", 3 pgs.
"U.S. Appl. No. 14/187,413, Response filed May 26, 2016 to Non Final Office Action mailed Mar. 17, 2016", 15 pgs.
"U.S. Appl. No. 14/187,413, Response filed Jun. 8, 2017 to Non Final Office Action mailed Feb. 8, 2017", 15 pgs.
"U.S. Appl. No. 14/187,413, Response filed Oct. 28, 2016 to Final Office Action mailed Jul. 28, 2016", 17 pgs.
"U.S. Appl. No. 14/187,413, Response filed Nov. 27, 2017 to Final Office Action mailed Jun. 27, 2017", 14 pgs.
"U.S. Appl. No. 14/187,413, Response filed Dec. 21, 2016 to Final Office Action mailed Jul. 28, 2016 and Advisory Action mailed Nov. 10, 2016", 15 pgs.
"U.S. Appl. No. 14/187,413, Restriction Requirement mailed Feb. 16, 2016", 6 pgs.
"U.S. Appl. No. 14/190,715, Advisory Action mailed Aug. 16, 2018", 6 pgs.
"U.S. Appl. No. 14/190,715, Examiner Interview Summary mailed Oct. 31, 2018", 3 pgs.
"U.S. Appl. No. 14/190,715, Final Office Action mailed Feb. 20, 2018", 9 pgs.
"U.S. Appl. No. 14/190,715, Non Final Office Action mailed Aug. 10, 2017", 9 pgs.
"U.S. Appl. No. 14/190,715, Notice of Allowance mailed Mar. 4, 2019", 7 pgs.
"U.S. Appl. No. 14/190,715, Response filed Jul. 12, 2017 to Restriction Requirement mailed Apr. 12, 2017", 7 pgs.
"U.S. Appl. No. 14/190,715, Response filed Nov. 9, 2017 to Non Final Office Action mailed Aug. 10, 2017", 10 pgs.
"U.S. Appl. No. 14/190,715, Restriction Requirement mailed Apr. 13, 2017", 7 pgs.
"U.S. Appl. No. 14/192,019, Final Office Action mailed Jan. 10, 2019", 16 pgs.
"U.S. Appl. No. 14/192,019, Final Office Action mailed Nov. 28, 2017", 16 pgs.
"U.S. Appl. No. 14/192,019, Non Final Office Action mailed May 11, 2018", 16 pgs.
"U.S. Appl. No. 14/192,019, Non Final Office Action mailed May 19, 2017", 15 pgs.
"U.S. Appl. No. 14/192,019, Non Final Office Action mailed Jun. 25, 2019", 13 pgs.
"U.S. Appl. No. 14/192,019, Response filed Jun. 10, 2019 to Final Office Action mailed Jan. 20, 2019", 10 pgs.
"U.S. Appl. No. 14/192,019, Response filed Aug. 21, 2017 to Non Final Office Action mailed May 19, 2017", 13 pgs.
"U.S. Appl. No. 14/192,019, Response filed Sep. 11, 2018 to Non Final Office Action mailed May 11, 2018", 12 pgs.
"U.S. Appl. No. 14/192,019, Response filed Apr. 27, 2018 to Final Office Action mailed Nov. 28, 2017", 11 pgs.
"U.S. Appl. No. 14/804,953, Corrected Notice of Allowance mailed Jan. 25, 2018", 4 pgs.
"U.S. Appl. No. 14/804,953, Non Final Office Action mailed Sep. 15, 2016", 8 pgs.
"U.S. Appl. No. 14/804,953, Notice of Allowance mailed Feb. 27, 2017", 7 pgs.
"U.S. Appl. No. 14/804,953, Notice of Allowance mailed May 9, 2017", 7 pgs.
"U.S. Appl. No. 14/804,953, Notice of Allowance mailed Sep. 7, 2017", 7 pgs.
"U.S. Appl. No. 14/804,953, Response filed Dec. 15, 2016 to Non Final Office Action mailed Sep. 15, 2016", 7 pgs.
"U.S. Appl. No. 14/830,492, Corrected Notice of Allowability mailed Jun. 15, 2020", 2 pgs.
"U.S. Appl. No. 14/830,492, Final Office Action mailed Dec. 28, 2018", 9 pgs.
"U.S. Appl. No. 14/830,492, Non-Final Action mailed Mar. 15, 2018", 9 pgs.
"U.S. Appl. No. 14/830,492, Notice of Allowance mailed Feb. 27, 2020", 5 pgs.
"U.S. Appl. No. 14/830,492, Notice of Allowance mailed Sep. 24, 2019", 7 pgs.
"U.S. Appl. No. 14/830,492, Response filed Feb. 15, 2018 to Restriction Requirement mailed Dec. 15, 2017", 7 pgs.
"U.S. Appl. No. 14/830,492, Response filed Jun. 29, 2019 to Final Office Action mailed Dec. 28, 2018", 6 pgs.
"U.S. Appl. No. 14/830,492, Response filed Aug. 15, 2018 to Non Final Office Action mailed Mar. 15, 2018", 12 pgs.
"U.S. Appl. No. 14/830,492, Restriction Requirement mailed Dec. 15, 2017", 6 pgs.
"U.S. Appl. No. 14/957,795, Corrected Notice of Allowability mailed Feb. 1, 2019", 4 pgs.
"U.S. Appl. No. 14/957,795, Corrected Notice of Allowance mailed May 16, 2018", 4 pgs.
"U.S. Appl. No. 14/957,795, Final Office Action mailed Nov. 6, 2017", 17 pgs.
"U.S. Appl. No. 14/957,795, Non Final Office Action mailed Apr. 3, 2017", 19 pgs.
"U.S. Appl. No. 14/957,795, Notice of Allowance mailed Jan. 17, 2019", 7 pgs.
"U.S. Appl. No. 14/957,795, Notice of Allowance mailed Apr. 27, 2018", 8 pgs.
"U.S. Appl. No. 14/957,795, Notice of Allowance mailed Sep. 11, 2018", 9 pgs.
"U.S. Appl. No. 14/957,795, Response filed Apr. 3, 2018 to Final Office Action mailed Nov. 6, 2017", 11 pgs.

(56) References Cited

OTHER PUBLICATIONS

"U.S. Appl. No. 14/957,795, Response filed Aug. 3, 2017 to Non Final Office Action mailed Apr. 3, 2017", 17 pgs.
"U.S. Appl. No. 15/185,155, Corrected Notice of Allowability mailed May 15, 2019", 2 pgs.
"U.S. Appl. No. 15/185,155, Corrected Notice of Allowability mailed May 22, 2019", 2 pgs.
"U.S. Appl. No. 15/185,155, Examiner Interview Summary mailed Feb. 21, 2019", 3 pgs.
"U.S. Appl. No. 15/185,155, Final Office Action mailed Dec. 5, 2018", 11 pgs.
"U.S. Appl. No. 15/185,155, Non Final Office Action mailed Apr. 10, 2018", 13 pgs.
"U.S. Appl. No. 15/185,155, Notice of Allowance mailed Mar. 25, 2019", 7 pgs.
"U.S. Appl. No. 15/185,155, Notice of Allowance mailed Jul. 17, 2019", 8 pgs.
"U.S. Appl. No. 15/185,155, Response filed Aug. 6, 2018 to Non Final Office Action mailed Apr. 10, 2018", 10 pgs.
"U.S. Appl. No. 15/185,155, Response filed Mar. 5, 2019 to Final Office Action mailed Dec. 5, 2018", 9 pgs.
"U.S. Appl. No. 15/185,180, Final Office Action mailed Jul. 31, 2019", 15 pgs.
"U.S. Appl. No. 15/185,180, Non Final Office Action mailed Jan. 8, 2019", 14 pgs.
"U.S. Appl. No. 15/185,180, Notice of Allowance mailed Oct. 15, 2020", 6 pgs.
"U.S. Appl. No. 15/185,180, Response filed Nov. 19, 2018 to Restriction Requirement mailed Jun. 21, 2018", 9 pgs.
"U.S. Appl. No. 15/185,180, Response filed May 1, 2019 to Non Final Office Action mailed Jan. 8, 2019", 11 pgs.
"U.S. Appl. No. 15/185,180, Restriction Requirement mailed Jun. 21, 2018", 10 pgs.
"U.S. Appl. No. 15/574,201, Non Final Office Action mailed Jan. 15, 2020", 8 pgs.
"U.S. Appl. No. 15/574,201, Non Final Office Action mailed Jan. 26, 2021", 8 pgs.
"U.S. Appl. No. 15/574,201, Non Final Office Action mailed Jan. 29, 2019", 6 pgs.
"U.S. Appl. No. 15/574,201, Notice of Allowability mailed Jun. 18, 2021", 3 pgs.
"U.S. Appl. No. 15/574,201, Notice of Allowance mailed May 21, 2020", 5 pgs.
"U.S. Appl. No. 15/574,201, Notice of Allowance mailed Jun. 4, 2021", 5 pgs.
"U.S. Appl. No. 15/574,201, Notice of Allowance mailed Aug. 20, 2019", 7 pgs.
"U.S. Appl. No. 15/574,201, Notice of Allowance mailed Sep. 10, 2020", 6 pgs.
"U.S. Appl. No. 15/574,201, Response Filed Jan. 7, 2019 to Restriction Requirement mailed Sep. 5, 2018", 8 pgs.
"U.S. Appl. No. 15/574,201, Response filed May 15, 2020 to Non Final Office Action mailed Jan. 15, 2020", 13 pgs.
"U.S. Appl. No. 15/574,201, Response filed May 26, 2021 to Non Final Office Action mailed Jan. 26, 2021", 10 pgs.
"U.S. Appl. No. 15/574,201, Response filed Jul. 29, 2019 to Non-Final Office Action mailed Jan. 29, 2019", 12 pgs.
"U.S. Appl. No. 15/574,201, Restriction Requirement mailed Sep. 5, 2018", 6 pgs.
"U.S. Appl. No. 15/574,205, Corrected Notice of Allowability mailed Apr. 17, 2020", 2 pgs.
"U.S. Appl. No. 15/574,205, Non Final Office Action mailed Jun. 17, 2019", 3 pgs.
"U.S. Appl. No. 15/574,205, Non Final Office Action mailed Sep. 11, 2018", 6 pgs.
"U.S. Appl. No. 15/574,205, Notice of Allowance mailed Feb. 13, 2019", 6 pgs.
"U.S. Appl. No. 15/574,205, Notice of Allowance mailed Apr. 9, 2020", 5 pgs.
"U.S. Appl. No. 15/574,205, Notice of Allowance mailed Dec. 2, 2019", 5 pgs.
"U.S. Appl. No. 15/574,205, Response filed Jan. 11, 2019 to Non-Final Office Action mailed Sep. 11, 2018", 12 pgs.
"U.S. Appl. No. 15/574,205, Response filed Nov. 18, 2019 to Non-Final Office Action mailed Jun. 17, 2019", 8 pgs.
"U.S. Appl. No. 15/590,685, Advisory Action mailed Dec. 12, 2018", 3 pgs.
"U.S. Appl. No. 15/590,685, Examiner Interview Summary mailed Dec. 11, 2020", 3 pgs.
"U.S. Appl. No. 15/590,685, Final Office Action mailed Jun. 7, 2018", 12 pgs.
"U.S. Appl. No. 15/590,685, Final Office Action mailed Jun. 26, 2019", 14 pgs.
"U.S. Appl. No. 15/590,685, Non Final Office Action mailed Jan. 7, 2020", 15 pgs.
"U.S. Appl. No. 15/590,685, Non Final Office Action mailed Jan. 11, 2019", 13 pgs.
"U.S. Appl. No. 15/590,685, Non Final Office Action mailed Oct. 6, 2017", 11 pgs.
"U.S. Appl. No. 15/590,685, Notice of Allowance mailed Feb. 9, 2021", 6 pgs.
"U.S. Appl. No. 15/590,685, PTO Response to Rule 312 Communication mailed Apr. 27, 2021", 2 pgs.
"U.S. Appl. No. 15/590,685, Response filed Feb. 20, 2018 to Non Final Office Action mailed Oct. 6, 2017", 7 pgs.
"U.S. Appl. No. 15/590,685, Response filed Apr. 18, 2019 to NonFinal Office Action mailed Jan. 11, 2019", 11 pgs.
"U.S. Appl. No. 15/590,685, Response filed Nov. 30, 2018 to Final Office Action mailed Jun. 7, 2018", 10 pgs.
"U.S. Appl. No. 15/590,685, Response filed Dec. 19, 2019 to Final Office Action mailed Jun. 26, 2019", 11 pgs.
"U.S. Appl. No. 15/739,016, Corrected Notice of Allowability mailed Jul. 1, 2020", 2 pgs.
"U.S. Appl. No. 15/739,016, Non Final Office Action mailed Feb. 13, 2019", 6 pgs.
"U.S. Appl. No. 15/739,016, Notice of Allowance mailed Mar. 25, 2020", 5 pgs.
"U.S. Appl. No. 15/739,016, Notice of Allowance mailed Aug. 1, 2019", 6 pgs.
"U.S. Appl. No. 15/739,016, Notice of Allowance mailed Nov. 20, 2019", 7 pgs.
"U.S. Appl. No. 15/739,016, Response filed Jan. 28, 2019 to Restriction Requirement mailed Nov. 26, 2018", 8 pgs.
"U.S. Appl. No. 15/739,016, Restriction Requirement mailed Nov. 26, 2018", 5 pgs.
"U.S. Appl. No. 15/814,153, Corrected Notice of Allowability mailed May 13, 2021", 3 pgs.
"U.S. Appl. No. 15/814,153, Corrected Notice of Allowability mailed May 27, 2021", 3 pgs.
"U.S. Appl. No. 15/814,153, Corrected Notice of Allowability mailed Jul. 15, 2021", 2 pgs.
"U.S. Appl. No. 15/814,153, Non Final Office Action mailed Jul. 6, 2020", 12 pgs.
"U.S. Appl. No. 15/814,153, Non Final Office Action mailed Oct. 9, 2019", 16 pgs.
"U.S. Appl. No. 15/814,153, Notice of Allowance mailed Apr. 8, 2021", 10 pgs.
"U.S. Appl. No. 15/814,153, Response filed Jan. 6, 2021 to Non Final Office Action mailed Jul. 6, 2020", 12 pgs.
"U.S. Appl. No. 15/814,153, Response filed Apr. 9, 2020 to Non Final Office Action mailed Oct. 9, 2019", 15 pgs.
"U.S. Appl. No. 15/814,153, Response filed Jul. 15, 2019 to Restriction Requirement mailed May 15, 2019", 9 pgs.
"U.S. Appl. No. 15/814,153, Restriction Requirement mailed May 15, 2019", 6 pgs.
"U.S. Appl. No. 16/083,280, Corrected Notice of Allowability mailed Aug. 3, 2020", 2 pgs.
"U.S. Appl. No. 16/083,280, Corrected Notice of Allowability mailed Sep. 18, 2020", 2 pgs.
"U.S. Appl. No. 16/083,280, Non Final Office Action mailed Jan. 28, 2020", 6 pgs.

(56) References Cited

OTHER PUBLICATIONS

"U.S. Appl. No. 16/083,280, Notice of Allowance mailed Jun. 12, 2020", 5 pgs.
"U.S. Appl. No. 16/083,280, Response filed May 28, 2020 to Non Final Office Action mailed Jan. 28, 2020", 8 pgs.
"U.S. Appl. No. 16/351,046, Non Final Office Action mailed Dec. 21, 2020", 8 pgs.
"U.S. Appl. No. 16/431,397, Notice of Allowance mailed Dec. 10, 2021", 11 pgs.
"U.S. Appl. No. 16/431,397, Response filed Aug. 23, 2021 to Restriction Requirement mailed Jun. 23, 2021", 7 pgs.
"U.S. Appl. No. 16/431,397, Restriction Requirement mailed Jun. 23, 2021", 6 pgs.
"U.S. Appl. No. 16/431,397, Supplemental Notice of Allowability mailed Dec. 24, 2021", 2 pgs.
"U.S. Appl. No. 16/431,397, Supplemental Preliminary Amendment filed Aug. 2, 2019", 6 pgs.
"U.S. Appl. No. 16/606,708, Appeal Brief filed Dec. 28, 2022", 30 pgs.
"U.S. Appl. No. 16/606,708, Corrected Notice of Allowability mailed May 1, 2023", 2 pgs.
"U.S. Appl. No. 16/606,708, Corrected Notice of Allowability mailed Nov. 27, 2023", 2 pgs.
"U.S. Appl. No. 16/606,708, Final Office Action mailed Mar. 15, 2022", 20 pgs.
"U.S. Appl. No. 16/606,708, Non Final Office Action mailed Sep. 23, 2021", 20 pgs.
"U.S. Appl. No. 16/606,708, Notice of Allowance mailed Apr. 19, 2023", 8 pgs.
"U.S. Appl. No. 16/606,708, Notice of Allowance mailed Aug. 9, 2023", 8 pgs.
"U.S. Appl. No. 16/606,708, Response filed Jan. 24, 2022 to Non Final Office Action mailed Sep. 23, 2021", 14 pages.
"U.S. Appl. No. 16/606,708, Response filed May 16, 2022 to Final Office Action mailed Mar. 15, 2022", 14 pgs.
"U.S. Appl. No. 16/606,716, Appeal Brief filed Sep. 6, 2022", 25 pgs.
"U.S. Appl. No. 16/606,716, Appeal Decision mailed Jul. 2, 2024", 8 pgs.
"U.S. Appl. No. 16/606,716, Examiner's Answer mailed Oct. 28, 2022", 11 pgs.
"U.S. Appl. No. 16/606,716, Final Office Action mailed Feb. 4, 2022", 15 pgs.
"U.S. Appl. No. 16/606,716, Response filed Jan. 18, 2022 to Non Final Office Action mailed Sep. 17, 2021", 13 pgs.
"U.S. Appl. No. 16/606,716, Response filed May 4, 2022 to Final Office Action mailed Feb. 4, 2022", 20 pgs.
"U.S. Appl. No. 16/784,822, Final Office Action mailed Jul. 26, 2022", 7 pgs.
"U.S. Appl. No. 16/784,822, Non Final Office Action mailed Mar. 14, 2022", 9 pgs.
"U.S. Appl. No. 16/784,822, Notice of Allowance mailed Nov. 9, 2022", 5 pgs.
"U.S. Appl. No. 16/784,822, Response filed Feb. 28, 2022 to Restriction Requirement mailed Dec. 27, 2021", 6 pgs.
"U.S. Appl. No. 16/784,822, Response filed Jul. 11, 2022 to Non Final Office Action mailed Mar. 14, 2022", 9 pgs.
"U.S. Appl. No. 16/784,822, Response filed Oct. 25, 2022 to Final Office Action mailed Jul. 26, 2022", 5 pgs.
"U.S. Appl. No. 16/784,822, Restriction Requirement mailed Dec. 27, 2021", 6 pgs.
"U.S. Appl. No. 16/784,822, Supplemental Preliminary Amendment filed Feb. 14, 2020", 6 pgs.
"U.S. Appl. No. 17/168,928, Response filed Feb. 27, 2023 to Restriction Requirement mailed Nov. 25, 2022", 8 pgs.
"U.S. Appl. No. 17/168,928, Restriction Requirement mailed Nov. 25, 2022", 9 pgs.
"U.S. Appl. No. 17/168,928, Supplemental Preliminary Amendment filed Aug. 12, 2021", 5 pages.

"U.S. Appl. No. 17/231,634, Corrected Notice of Allowability mailed Feb. 10, 2023", 2 pgs.
"U.S. Appl. No. 17/231,634, Notice of Allowance mailed Jan. 11, 2023", 8 pgs.
"U.S. Appl. No. 17/305,681, Preliminary Amendment filed Oct. 15, 2021".
"U.S. Appl. No. 17/345,852 Preliminary Amendment Filed with Application", 3 pgs.
"U.S. Appl. No. 17/345,852 Supplemental Preliminary Amendment", 6 pgs.
"U.S. Appl. No. 17/345,852, Non Final Office Action mailed Feb. 23, 2023", 12 pgs.
"U.S. Appl. No. 17/855,344 Preliminary Amendment Filed with Application", 7 pgs.
"U.S. Appl. No. 17/855,344, Advisory Action mailed Nov. 28, 2023", 3 pgs.
"U.S. Appl. No. 17/855,344, Examiner Interview Summary mailed Jan. 24, 2024", 2 pgs.
"U.S. Appl. No. 17/855,344, Examiner Interview Summary mailed Sep. 1, 2023", 2 pgs.
"U.S. Appl. No. 17/855,344, Final Office Action mailed Apr. 24, 2024", 19 pgs.
"U.S. Appl. No. 17/855,344, Final Office Action mailed Jul. 17, 2023", 13 pgs.
"U.S. Appl. No. 17/855,344, Non Final Office Action mailed Jan. 9, 2024", 9 pgs.
"U.S. Appl. No. 17/855,344, Non Final Office Action mailed Jan. 27, 2023", 15 pgs.
"U.S. Appl. No. 17/855,344, Response filed Mar. 29, 2024 to Non Final Office Action mailed Jan. 9, 2024", 8 pgs.
"U.S. Appl. No. 17/855,344, Response filed Jun. 27, 2023 to Non Final Office Action mailed Jan. 27, 2023", 13 pgs.
"U.S. Appl. No. 17/855,344, Response filed Nov. 17, 2023 to Final Office Action mailed Jul. 17, 2023", 15 pgs.
"U.S. Appl. No. 17/855,413, Non Final Office Action mailed Jan. 27, 2023", 15 pgs.
"Australian Application Serial No. 2011268661, First Examiner Report mailed Sep. 24, 2014", 5 pgs.
"Australian Application Serial No. 2011268661, Response filed Jul. 20, 2015 to First Examiner Report mailed Sep. 24, 2014", 8 pgs.
"Australian Application Serial No. 2011268661, Response filed Sep. 2023, 15 to Second Examiner Report mailed Aug. 18, 2015", 5 pgs.
"Australian Application Serial No. 2011268661, Second Examiner Report mailed Aug. 18, 2015", 6 pgs.
"Australian Application Serial No. 2012208921, First Examiner Report mailed Jun. 2, 2016", 7 pgs.
"Australian Application Serial No. 2012304223, First Examiner Report mailed Aug. 5, 2016", 4 pgs.
"Australian Application Serial No. 2012304223, Response filed Feb. 16, 2017 to First Examiner Report mailed Aug. 5, 2016", 25 pgs.
"Australian Application Serial No. 2013305427, Examination Report mailed Mar. 3, 2017", 4 pgs.
"Australian Application Serial No. 2013305427, Response filed Oct. 10, 2017 to Examination Report mailed Mar. 3, 2017", 30 pgs.
"Australian Application Serial No. 2013305428, Office Action mailed May 30, 2017", 5 pgs.
"Australian Application Serial No. 2013305428, Response filed May 15, 2018 to Office Action mailed May 30, 2017", 23 pgs.
"Australian Application Serial No. 2014231667, First Examination Report mailed Apr. 5, 2018", 4 pgs.
"Australian Application Serial No. 2014231667, Response filed Jan. 15, 2019 to Subsequent Examiners Report mailed Aug. 29, 2018", 12 pgs.
"Australian Application Serial No. 2014231667, Response filed Jul. 20, 2018 to First Examination Report mailed Apr. 5, 2018", 19 pgs.
"Australian Application Serial No. 2014231667, Subsequent Examiners Report mailed Aug. 29, 2018", 4 pgs.
"Australian Application Serial No. 2014231668, First Examination Report mailed Dec. 6, 2017", 6 pgs.

(56) References Cited

OTHER PUBLICATIONS

"Australian Application Serial No. 2014231668, Response filed Mar. 14, 2018 to First Examination Report mailed Dec. 6, 2017", 31 pgs.
"Australian Application Serial No. 2014231668, Subsequent Examiners Report mailed Apr. 5, 2018", 3 pgs.
"Australian Application Serial No. 2014231672, First Examiners Report mailed Jul. 14, 2017", 4 pgs.
"Australian Application Serial No. 2014231672, Response filed Oct. 9, 2017 to First Examiners Report mailed Jul. 14, 2017", 24 pgs.
"Australian Application Serial No. 2014231680, First Examiners Report mailed Aug. 4, 2017", 4 pgs.
"Australian Application Serial No. 2014231681, First Examiners Report mailed Jul. 12, 2017", 4 pgs.
"Australian Application Serial No. 2014231681, Response filed Jan. 30, 2018 to Subsequent Examiners Report mailed Sep. 26, 2017", 15 pgs.
"Australian Application Serial No. 2014231681, Response filed Apr. 26, 2018 to Subsequent Examiners Report mailed Mar. 13, 2018", 3 pgs.
"Australian Application Serial No. 2014231681, Response filed Sep. 15, 2017 to First Examiners Report mailed Jul. 12, 2017", 9 pgs.
"Australian Application Serial No. 2014231681, Subsequent Examiners Report mailed Mar. 13, 2018", 4 pgs.
"Australian Application Serial No. 2014231681, Subsequent Examiners Report mailed Sep. 26, 2017", 4 pgs.
"Australian Application Serial No. 2015230799, First Examiner Report mailed Mar. 27, 2017", 10 pgs.
"Australian Application Serial No. 2015230799, Response filed Feb. 16, 2018 to First Examiner Report mailed Mar. 27, 2017", 24 pgs.
"Australian Application Serial No. 2015306040, First Examination Report mailed Nov. 8, 2019", 14 pgs.
"Australian Application Serial No. 2016265882, First Examination Report mailed Aug. 5, 2020", 4 pgs.
"Australian Application Serial No. 2016265883, First Examination Report mailed Sep. 22, 2020", 4 pgs.
"Australian Application Serial No. 2016281963, First Examination Report mailed Oct. 15, 2020", 5 pgs.
"Australian Application Serial No. 2017204552, First Examination Report mailed Oct. 9, 2018", 3 pgs.
"Australian Application Serial No. 2017228937, First Examination Report mailed Jan. 6, 2022", 3 pgs.
"Australian Application Serial No. 2018202342, First Examination Report mailed Jun. 17, 2019", 5 pgs.
"Australian Application Serial No. 2018202342, Response filed Aug. 1, 2019 to First Examination Report mailed Jun. 17, 2019", 17 pgs.
"Australian Application Serial No. 2018202342, Subsequent Examiners Report mailed Aug. 23, 2019", 4 pgs.
"Australian Application Serial No. 2018204774, First Examination Report mailed Jul. 18, 2019", 4 pgs.
"Australian Application Serial No. 2018204774, Response filed May 28, 2020 to First Examination Report mailed Jul. 18, 2019", 14 pgs.
"Australian Application Serial No. 2018226496, First Examination Report mailed Jul. 25, 2019", 4 pgs.
"Australian Application Serial No. 2018236791, First Examination Report mailed Mar. 2, 2020", 3 pgs.
"Australian Application Serial No. 2018236791, Response filed Jun. 9, 2020 to First Examination Report mailed Mar. 2, 2020", 12 pgs.
"Australian Application Serial No. 2018236791, Voluntary Amendment filed Dec. 3, 2018", 8 pgs.
"Australian Application Serial No. 2019201063, First Examination Report mailed Aug. 6, 2019", 7 pgs.
"Australian Application Serial No. 2019250148, First Examination Report mailed Nov. 23, 2020", 5 pgs.
"Canadian Application Serial No. 2,801,352, Office Action mailed Jul. 4, 2017", 3 pgs.
"Canadian Application Serial No. 2,801,352, Office Action mailed Aug. 2, 2018", 3 pgs.
"Canadian Application Serial No. 2,801,352, Office Action mailed Aug. 15, 2016", 3 pgs.
"Canadian Application Serial No. 2,801,352, Response filed Jan. 29, 2019 to Office Action mailed Aug. 2, 2018", 12 pgs.
"Canadian Application Serial No. 2,801,352, Response filed Feb. 8, 2017 to Office Action mailed Aug. 15, 2016", 89 pgs.
"Canadian Application Serial No. 2,801,352, Response filed Dec. 18, 2017 to Office Action mailed Jul. 4, 2017", 8 pgs.
"Canadian Application Serial No. 2,843,763, Office Action mailed Dec. 4, 2014", 3 pgs.
"Canadian Application Serial No. 2,843,763, Response filed May 12, 2015 to Office Action mailed Dec. 4, 2014", 31 pgs.
"Canadian Application Serial No. 2,880,350 Examiner's Rule 86 2 Requisition mailed Jun. 20, 2022", 3 pgs.
"Canadian Application Serial No. 2,880,350, Examiner's Rule 30(2) Requisition mailed May 01, 2019", 4 pgs.
"Canadian Application Serial No. 2,880,350, Response filed Oct. 6, 2022 to Examiner's Rule 86 2 Requisition mailed Jun. 20, 2022", 25 pgs.
"Canadian Application Serial No. 2,880,350, Response filed Oct. 28, 2020 to Examiner's Rule 30(2) Requisition mailed May 1, 2019", 36 pgs.
"Canadian Application Serial No. 2,880,350, Voluntary Amendment filed Apr. 29, 2021", 7 pgs.
"Canadian Application Serial No. 2,880,353, Office Action mailed Apr. 29, 19", 4 pgs.
"Canadian Application Serial No. 2,880,353, Response filed Oct. 29, 2019 to Office Action mailed Apr. 29, 2019", 28 pgs.
"Canadian Application Serial No. 2,901,483, Office Action mailed Jul. 19, 2017", 3 pgs.
"Canadian Application Serial No. 2,901,483, Office Action mailed Nov. 23, 2016", 4 pgs.
"Canadian Application Serial No. 2,901,483, Response filed Jan. 16, 2018 to Office Action mailed Jul. 19, 2017", 28 pgs.
"Canadian Application Serial No. 2,901,483, Response filed May 23, 2017 to Office Action mailed Nov. 23, 2016", 40 pgs.
"Canadian Application Serial No. 2,901,484, Office Action mailed Apr. 27, 2021", 4 pgs.
"Canadian Application Serial No. 2,901,484, Office Action mailed Jun. 5, 2020", 6 pgs.
"Canadian Application Serial No. 2,901,484, Office Action mailed Dec. 11, 2019", 6 pgs.
"Canadian Application Serial No. 2,901,484, Response filed Apr. 7, 2020 to Office Action mailed Dec. 11, 2019", 25 pgs.
"Canadian Application Serial No. 2,901,484, Response filed Aug. 26, 2021 to Office Action mailed Apr. 27, 2021", 9 pgs.
"Canadian Application Serial No. 2,901,484, Response filed Sep. 29, 2020 to Office Action mailed Jun. 5, 2020", 20 pgs.
"Canadian Application Serial No. 2,901,492, Office Action mailed Jan. 29, 2020", 4 pgs.
"Canadian Application Serial No. 2,901,495, Office Action mailed Jan. 29, 2020", 4 pgs.
"Canadian Application Serial No. 2,901,495, Response filed May 13, 21 to Office Action mailed Jan. 29, 2020", 23 pgs.
"Canadian Application Serial No. 2,904,224, Office Action mailed Jan. 3, 2020", 4 pgs.
"Canadian Application Serial No. 2,904,224, Response filed May 11, 2021 to Office Action mailed Jan. 3, 2020", 36 pgs.
"Canadian Application Serial No. 2,958,480, Office Action mailed Sep. 16, 2021", 4 pgs.
"Canadian Application Serial No. 2,958,480, Response filed Jan. 17, 2022 to Office Action mailed Sep. 16, 2021", 12 pgs.
"Canadian Application Serial No. 2,986,055, Office Action mailed Dec. 12, 2022", 5 pgs.
"Canadian Application Serial No. 2,986,058, Office Action mailed Jul. 27, 2022", 3 pgs.
"Canadian Application Serial No. 3,016,808, Non Final Office Action mailed Mar. 9, 2022", 3 pgs.

(56) References Cited

OTHER PUBLICATIONS

"Canadian Application Serial No. 3,016,808, Response filed Jul. 11, 2022 to Non Final Office Action mailed Mar. 9, 2022", w/o Claims, 2 pgs.
"Canadian Application Serial No. 3,016,808, Voluntary Amendment mailed Feb. 11, 2022.", 31 pgs.
"Canadian Application Serial No. 3,034,592, Office Action mailed Mar. 17, 2020", 5 pgs.
"Canadian Application Serial No. 3,034,592, Response filed Jul. 14, 2020 to Office Action mailed Mar. 17, 2020", 20 pgs.
"Canadian Application Serial No. 3,046,529, Office Action mailed Mar. 5, 2020", 4 pgs.
"Canadian Application Serial No. 3,046,529, Office Action mailed Sep. 18, 2019", 6 pgs.
"Canadian Application Serial No. 3,046,529, Response Filed Aug. 26, 2021 to Office Action mailed Mar. 5, 2020", 15 pgs.
"Canadian Application Serial No. 3,046,529, Response filed Nov. 14, 2019 to Office Action mailed Sep. 18, 2019", 9 pgs.
"Canadian Application Serial No. 3,060,323, Examiners Rule 86(2) Report mailed Sep. 13, 2023", 3 pgs.
"Canadian Application Serial No. 3,060,323, Response filed Jan. 11, 2024 to Examiners Rule 86(2) Report mailed Sep. 13, 2023", 20 pgs.
"Canadian Application Serial No. 3,060,328, Examiners Rule 86(2) Report mailed Jun. 23, 2023", 3 pgs.
"Canadian Application Serial No. 3,060,328, Response filed Oct. 5, 2023 to Examiners Rule 86(2) Report mailed Jun. 12, 2023", 21 pgs.
"Canadian Application Serial No. 3,060,332, Examiners Rule 86(2) Report mailed Jun. 13, 2023", 4 pgs.
"Canadian Application Serial No. 3,060,332, Response filed Oct. 10, 2023 to Examiners Rule 86(2) Report mailed Jun. 13, 2023", 31 pgs.
"Canadian Application Serial No. 3,167,769, Examiners Rule 86(2) Requisition mailed Jan. 13, 2023", 4 pgs.
"Canadian Application Serial No. 3129123 Examiner's Rule 86 2 Report mailed Nov. 25, 2022", 3 pgs.
"Canadian Application Serial No. 3148296, Examiners Rule 86(2) Requisition mailed Dec. 9, 2022", 3 pgs.
"Canadian Application Serial No. 3148296, Voluntary Amendment filed Jun. 30, 2022", 17 pgs.
"Chapter 8—Heating, Ventilating, and Air Conditioning (HVAC) Demonstration", HVAC Demonstration, (published prior to Feb. 21, 2014), 16 pgs.
"Chinese Application Serial No. 201280006006.9, Office Action mailed Feb. 2, 2016", w/ English Summary, 19 pgs.
"Chinese Application Serial No. 201280006006.9, Response filed Apr. 8, 2016 to Office Action mailed Feb. 2, 2016", w/ English Translation of Claims, 64 pgs.
"Chinese Application Serial No. 201280006006.9, Voluntary Amendment filed Apr. 14, 2014", w/ English Translation of Claims, 83 pgs.
"Chinese Application Serial No. 201180031103.9, Office Action mailed Feb. 11, 2015", w/ English Translation, 16 pgs.
"Chinese Application Serial No. 201180031103.9, Office Action mailed Jun. 13, 2014", w/ English Translation, 19 pgs.
"Chinese Application Serial No. 201180031103.9, Office Action mailed Sep. 9, 2015", w/ English Translation, 7 pgs.
"Chinese Application Serial No. 201180031103.9, Office Action mailed Nov. 6, 2015", w/ English Translation, 5 pgs.
"Chinese Application Serial No. 201180031103.9, Response filed Apr. 27, 2015 to Office Action mailed Feb. 11, 2015", w/ English Translation, 15 pgs.
"Chinese Application Serial No. 201180031103.9, Response filed Sep. 26, 2014 to Office Action mailed Jun. 13, 2014", w/ English Translation, 12 pgs.
"Chinese Application Serial No. 201180031103.9, Response filed Sep. 29, 2015 to Office Action mailed Sep. 9, 2015", w/ English Translation, 78 pgs.
"Chinese Application Serial No. 201280006006.9, Office Action mailed May 13, 2015", w/ English Translation, 7 pgs.
"Chinese Application Serial No. 201280006006.9, Office Action mailed Aug. 15, 2016", w/ English Translation, 18 pgs.
"Chinese Application Serial No. 201280006006.9, Response filed Sep. 28, 2015 to Office Action mailed May 13, 2015", w/ English Translation of Claims, 71 pgs.
"Chinese Application Serial No. 201280006006.9, Response filed Dec. 30, 2016 to Office Action mailed Aug. 15, 2016", w/ English Translation of Claims, 69 pgs.
"Chinese Application Serial No. 201280042778.8, Office Action mailed Feb. 3, 2016", w/ English Translation, 9 pgs.
"Chinese Application Serial No. 201280042778.8, Office Action mailed Sep. 7, 2016", w/ English Translation of Claims, 17 pgs.
"Chinese Application Serial No. 201280042778.8, Response filed May 25, 2016 to Office Action mailed Feb. 3, 2016", w/ English Translation, 11 pgs.
"Chinese Application Serial No. 201280042778.8, Response filed Nov. 16, 2016 to Office Action mailed Sep. 7, 2016", w/ English Translation, 44 pgs.
"Chinese Application Serial No. 201380042926.0, Decision of Reexamination—Upholding Decision of Rejection mailed Mar. 15, 2019", w/ English Translation, 18 pgs.
"Chinese Application Serial No. 201380042926.0, Decision of Rejection mailed Jan. 5, 2018", w/ English Claims, 11 pgs.
"Chinese Application Serial No. 201380042926.0, Notice of Reexamination mailed Aug. 23, 2018", w/ English Machine Translation, 18 pgs.
"Chinese Application Serial No. 201380042926.0, Office Action mailed Feb. 26, 2016", w/ English Translation, 15 pgs.
"Chinese Application Serial No. 201380042926.0, Office Action mailed May 11, 2017", W/ English Translation, 13 pgs.
"Chinese Application Serial No. 201380042926.0, Office Action mailed Sep. 28, 2016", w/ English Translation, 12 pgs.
"Chinese Application Serial No. 201380042926.0, Request for Reexamination filed Apr. 20, 2018 to Decision of Rejection mailed Jan. 5, 2018", w/ English claims, 52 pgs.
"Chinese Application Serial No. 201380042926.0, Response filed Feb. 13, 2017 to Office Action mailed Sep. 28, 2016", w/ English Translation of Amended Claims, 56 pgs.
"Chinese Application Serial No. 201380042926.0, Response filed Jul. 7, 2016 to Office Action mailed Feb. 26, 2016", w/ English Translation of Claims, 40 pgs.
"Chinese Application Serial No. 201380042926.0, Response filed Sep. 26, 2017 to Office Action mailed May 11, 2017", w/ English Translation of Claims (not amended), 13 pgs.
"Chinese Application Serial No. 201380042926.0, Response filed Dec. 7, 2018 to Notice of Reexamination mailed Aug. 23, 2018", w/ English Translation, 15 pgs.
"Chinese Application Serial No. 201380044484.3, Examiner Interview Summary Jan. 3, 2018", w/ English Translation, 1 pg.
"Chinese Application Serial No. 201380044484.3, Office Action mailed Jan. 13, 2017", w/ English Translation, 16 pgs.
"Chinese Application Serial No. 201380044484.3, Office Action mailed Mar. 28, 2016", w/ English Translation, 16 pgs.
"Chinese Application Serial No. 201380044484.3, Office Action mailed Jul. 31, 2017", w/ English Translation, 21 pgs.
"Chinese Application Serial No. 201380044484.3, Response filed Jan. 3, 2018 to Examiner Interview Summary Jan. 3, 2018", w/ English claims, 53 pgs.
"Chinese Application Serial No. 201380044484.3, Response filed Mar. 28, 2017 to Office Action mailed Jan. 13, 2017", w/ English Translation of Claims, 58 pgs.
"Chinese Application Serial No. 201380044484.3, Response filed Oct. 12, 2016 to Office Action mailed Mar. 28, 2016", w/ English Translation of Claims, 54 pgs.
"Chinese Application Serial No. 201380044484.3, Response filed Oct. 12, 2017 to Office Action mailed Jul. 31, 2017", w/ English Translation of Claims, 54 pgs.
"Chinese Application Serial No. 201480014783.7, Office Action mailed Mar. 26, 2018", w/ English Translation, 16 pgs.
"Chinese Application Serial No. 201480014783.7, Office Action mailed Jun. 30, 2017", w/ English Translation, 19 pgs.

(56) References Cited

OTHER PUBLICATIONS

"Chinese Application Serial No. 201480014783.7, Response filed Jun. 11, 2018 to Office Action mailed Mar. 26, 2018", w/ English claims, 18 pgs.
"Chinese Application Serial No. 201480014783.7, Response filed Nov. 10, 2017 to Office Action mailed Jun. 30, 2017", w/ English Claims, 48 pgs.
"Chinese Application Serial No. 201480015355.6, Decision of Rejection mailed Mar. 18, 2019", w/ English Translation, 7 pgs.
"Chinese Application Serial No. 201480015355.6, Office Action mailed Jun. 14, 2018", w/ English Translation, 16 pgs.
"Chinese Application Serial No. 201480015355.6, Office Action mailed Oct. 13, 2017", w/ English Translation, 18 pgs.
"Chinese Application Serial No. 201480015355.6, Office Action mailed Nov. 28, 2016", w/ English Translation, 16 pgs.
"Chinese Application Serial No. 201480015355.6, Response filed Feb. 28, 2018 to Office Action mailed Oct. 13, 2017", w/ English claims, 36 pgs.
"Chinese Application Serial No. 201480015355.6, Response filed Jun. 13, 2017 to Office Action mailed Nov. 28, 2016", w/ English Translation of Claims, 36 pgs.
"Chinese Application Serial No. 201480015355.6, Response filed Dec. 4, 2018 to Office Action mailed Jun. 14, 2018", w/ English claims, 16 pgs.
"Chinese Application Serial No. 201480015422.4, Office Action mailed Nov. 1, 2016", w/ English Translation, 13 pgs.
"Chinese Application Serial No. 201480015422.4, Response filed May 12, 2017 to Office Action mailed Nov. 1, 2016", w/ English Translation of Claims, 47 pgs.
"Chinese Application Serial No. 201480015766.5, Office Action mailed Oct. 19, 2016", w/ English Translation, 9 pgs.
"Chinese Application Serial No. 201480015766.5, Response filed Jan. 20, 2017 to Office Action mailed Oct. 19, 2016", w/ English Translation of Claims, 52 pgs.
"Chinese Application Serial No. 201480016150.X, Office Action mailed Jun. 19, 2017", w/ English Translation, 22 pgs.
"Chinese Application Serial No. 201480016150.X, Response filed Nov. 2, 2017 to Office Action mailed Jun. 19, 2017", w/ English Claims, 82 pgs.
"Chinese Application Serial No. 201580053421.3, Office Action mailed Sep. 17, 2019", w/ English Translation, 31 pgs.
"Chinese Application Serial No. 201680038134.X, Office Action mailed Apr. 7, 2020", with English translation, 29 pages.
"Chinese Application Serial No. 201680038134.X, Office Action mailed Jul. 8, 2019", w/ English Translation, 30 pgs.
"Chinese Application Serial No. 201680038134.X, Response filed Jan. 23, 2020 to Office Action mailed Jul. 8, 2019", with English claims, 32 pages.
"Chinese Application Serial No. 201680038134.X, Response filed Aug. 24, 2020 to Office Action mailed Apr. 7, 2020", with English claims, 24 pages.
"Chinese Application Serial No. 201680038134.X, Response to Examiner Telephone Interview filed Oct. 20, 2020", with English claims, 26 pages.
"Chinese Application Serial No. 201680038135.4, Office Action mailed Apr. 8, 2021", with English Machine Translation, 7 pages.
"Chinese Application Serial No. 201680038135.4, Office Action mailed Jun. 28, 2020", with English translation, 25 pages.
"Chinese Application Serial No. 201680038135.4, Office Action mailed Aug. 26, 2019", w/ English Translation, 23 pgs.
"Chinese Application Serial No. 201680038135.4, Response filed Mar. 10, 2020 to First Office Action mailed Aug. 26, 2019", with English claims, 12 pages.
"Chinese Application Serial No. 201680038135.4, Response filed Nov. 13, 2020 to Office Action mailed Jun. 28, 2020", with current English claims, claims not amended in response filed, 8 pages.
"Chinese Application Serial No. 201680048895.3, Office Action mailed Apr. 15, 2020", with English translation, 12 pages.
"Chinese Application Serial No. 201680048895.3, Office Action mailed Apr. 17, 2019", w/ English Translation, 33 pgs.
"Chinese Application Serial No. 201680048895.3, Response filed Aug. 31, 2020 to Office Action mailed Apr. 15, 2020", with English claims, 25 pages.
"Chinese Application Serial No. 201680048895.3, Response filed Nov. 4, 2019 to Office Action mailed Apr. 17, 2019", with English claims, 29 pages.
"Chinese Application Serial No. 201680048895.3, Response to Examiner Telephone Interview filed Oct. 22, 2020", with English claims, 22 pages.
"Chinese Application Serial No. 201710339973.1, Office Action mailed Apr. 26, 2019", w/ English Translation, 9 pgs.
"Chinese Application Serial No. 201710339973.1, Response filed Jul. 3, 2019 to Office Action mailed Apr. 26, 2019", w/ English Claims, 14 pgs.
"Chinese Application Serial No. 201710708143.1, Office Action mailed Aug. 16, 2019", w/ English Translation, 10 pgs.
"Chinese Application Serial No. 201710708143.1, Office Action mailed Dec. 29, 2018", w/ English Translation, 9 pgs.
"Chinese Application Serial No. 201710708143.1, Response filed Apr. 29, 2019 to Office Action mailed Dec. 29, 2018", w/ English Claims, 10 pgs.
"Chinese Application Serial No. 201710708143.1, Response filed Sep. 27, 2019 to Office Action mailed Aug. 16, 2019", with English claims, 10 pages.
"Chinese Application Serial No. 201780027034.1, Office Action mailed Mar. 5, 2021", with English translation, 7 pages.
"Chinese Application Serial No. 201780027034.1, Office Action mailed Apr. 13, 2020", with English translation, 35 pages.
"Chinese Application Serial No. 201780027034.1, Response filed Oct. 28, 2020 to Office Action mailed Apr. 13, 2020", with English claims, 46 pages.
"Chinese Application Serial No. 201780027034.1, Response filed Oct. 28, 2020 to Office Action mailed Apr. 13, 2020", with English claims, 39 pages.
"Chinese Application Serial No. 201780092213.3, Decision of Rejection mailed Dec. 30, 2021", with machine English translation, 19 pages.
"Chinese Application Serial No. 201780092213.3, Notice of Reexamination mailed Feb. 5, 2024", With English Machine Translation, 3 pgs.
"Chinese Application Serial No. 201780092213.3, Notice of Reexamination mailed Oct. 27, 2023", With English machine translation, 27 pgs.
"Chinese Application Serial No. 201780092213.3, Response filed Oct. 21, 2021 to Office Action mailed Aug. 6, 2021", with English claims, 13 pages.
"Chinese Application Serial No. 201780092213.3, Response Filed Apr. 14, 2022 to Decision of Rejection mailed Dec. 30, 2021", With English machine translation, 14 pgs.
"Chinese Application Serial No. 201780092237.9, Decision of Rejection mailed Jan. 21, 2022", with Concise Statement of Relevance, 12 pages.
"Chinese Application Serial No. 201780092237.9, Response filed Oct. 12, 2021 to Office Action mailed Jul. 28, 2021", with English claims, 16 pages.
"Chinese Application Serial No. 201810432187.0, Office Action mailed Jan. 16, 2020", with English translation, 12 pages.
"Chinese Application Serial No. 201910516006.7, Office Action mailed Mar. 1, 2021", with English Summary, 9 pages.
"Chinese Application Serial No. 201910516006.7, Office Action mailed Jul. 2, 2020", with English translation, 16 pages.
"Chinese Application Serial No. 201910516006.7, Response filed Jan. 18, 2021 to Office Action mailed Jul. 2, 2020", with English claims, 21 pages.
"Chinese Application Serial No. 201910516006.7, Voluntary Amendment filed Feb. 10, 2020", with English claims, 15 pages.
"Chinese Application Serial No. 202210506642.3, Office Action mailed Sep. 12, 2023", w/ English Translation, 73 pgs.
"Chinese Application Serial No. 202210506642.3, Voluntary Amendment filed Dec. 13, 2022", w/ English Claims, 40 pgs.
"Dehumidification Solutions", Des Champs Laboratories, Inc., (2001), 18 pgs.

(56) References Cited

OTHER PUBLICATIONS

"Desi-WringerTM Precision Desiccant Dehumidification Systems", Des Champs Technologies, (2007), 12 pgs.
"Energy Recovery—Fresh In Air Quality", SEMCO Inc., (published before Apr. 12, 2012), 131 pgs.
"European Application Serial No. 11797695.1, Communication Pursuant to Article 94(3) EPC mailed Jan. 12, 2022", 7 pgs.
"European Application Serial No. 11797695.1, Communication Pursuant to Article 94(3) EPC mailed Aug. 24, 2018", 5 pgs.
"European Application Serial No. 11797695.1, Communication Pursuant to Article 94(3) EPC mailed Nov. 19, 2020", 5 pgs.
"European Application Serial No. 11797695.1, Extended European Search Report mailed Jan. 25, 2016", 11 pgs.
"European Application Serial No. 11797695.1, Partial Supplementary European Search Report mailed Oct. 7, 2015", 6 pgs.
"European Application Serial No. 11797695.1, Response filed Jan. 9, 19 to Communication Pursuant to Article 94(3) EPC mailed Aug. 24, 2018", 11 pgs.
"European Application Serial No. 11797695.1, Response filed Mar. 26, 2021 to Communication Pursuant to Article 94(3) EPC mailed Nov. 19, 2020", 3 pgs.
"European Application Serial No. 11797695.1, Response filed Jul. 20, 2022 to Communication Pursuant to Article 94(3) EPC mailed Jan. 12, 2022", 10 pgs.
"European Application Serial No. 11797695.1, Response filed Aug. 22, 2016 to Office Action mailed Feb. 11, 2016", 9 pgs.
"European Application Serial No. 12736074.1, Extended European Search Report mailed Jul. 13, 2015", 8 pgs.
"European Application Serial No. 12736074.1, Response filed Oct. 2, 2015 to Extended European Search Report mailed Jul. 13, 2015", 10 pgs.
"European Application Serial No. 12827918.9, Extended European Search Report mailed Jul. 6, 2015", 6 pgs.
"European Application Serial No. 12827918.9, Response filed Sep. 28, 2015 to Extended European Search Report mailed Jul. 6, 2015", 8 pgs.
"European Application Serial No. 13830357.3, Extended European Search Report mailed Jun. 8, 2016", 5 pgs.
"European Application Serial No. 13830357.3, Response filed Dec. 23, 2016 to Extended European Search Report mailed Jun. 8, 2016", 11 pgs.
"European Application Serial No. 13830940.6, Extended European Search Report mailed Jul. 4, 2016", 5 pgs.
"European Application Serial No. 13830940.6, Response filed Jan. 16, 2017 to Communication Pursuant to Rules 70(2) and 70a(2) EPC mailed Jul. 21, 2016", 1 pg.
"European Application Serial No. 14764192.2, Extended European Search Report mailed Oct. 27, 2016", 7 pgs.
"European Application Serial No. 14764192.2, Response filed Jan. 30, 2017 to Extended European Search Report mailed Oct. 27, 2016", 19 pgs.
"European Application Serial No. 14764192.2, Response filed Apr. 13, 2016 to Communication Pursuant Rules 161(2) and 162 EPC mailed Nov. 19, 2015", 9 pgs.
"European Application Serial No. 14764305.0, Communication Pursuant to Article 94(3) EPC Feb. 14, 2019", 4 pgs.
"European Application Serial No. 14764305.0, Extended European Search Report mailed Apr. 4, 2017", 8 pgs.
"European Application Serial No. 14764305.0, Response filed Apr. 13, 2016 to Communication Pursuant to Article 94(3) EPC mailed Oct. 8, 2015", 10 pgs.
"European Application Serial No. 14764305.0, Response filed Jun. 21, 2019 to Communication Pursuant to Article 94(3) EPC Feb. 14, 2019", 24 pgs.
"European Application Serial No. 14764305.0, Response filed Oct. 31, 2017 to Extended European Search Report mailed Apr. 4, 2017", 7 pgs.
"European Application Serial No. 14764318.3, Extended European Search Report mailed Mar. 15, 2017", 10 pgs.
"European Application Serial No. 14764318.3, Response filed Jan. 28, 2016 to Communication pursuant to Rules 161(1) and 162 EPC mailed Nov. 19, 2015", 17 pgs.
"European Application Serial No. 14764318.3, Response filed Oct. 10, 2017 to Extended European Search Report mailed Mar. 15, 2017", 11 pgs.
"European Application Serial No. 14764713.5, Communication pursuant to Article 94(3) EPC mailed Dec. 18, 2018", 3 pgs.
"European Application Serial No. 14764713.5, Extended European Search Report mailed Dec. 9, 2016", 6 pgs.
"European Application Serial No. 14764713.5, Response filed Jan. 28, 2016 to Communication pursuant to Rules 161(1) and 162 EPC mailed Dec. 2, 2015", 9 pgs.
"European Application Serial No. 14764713.5, Response filed Jun. 28, 2019 to Communication pursuant to Article 94(3) EPC mailed Dec. 18, 2018", 8 pgs.
"European Application Serial No. 14764713.5, Response filed Jul. 13, 2017 to Extended European Search Report mailed Dec. 9, 2016", 9 pgs.
"European Application Serial No. 14765396.8, Communication Pursuant to Article 94(3) EPC mailed Dec. 5, 2018", 4 pgs.
"European Application Serial No. 14765396.8, Extended European Search Report mailed Oct. 28, 2016", 6 pgs.
"European Application Serial No. 14765396.8, Office Action mailed Nov. 20, 2015", 2 pgs.
"European Application Serial No. 14765396.8, Response filed Jan. 29, 2016 to Office Action mailed Nov. 20, 2015", 12 pgs.
"European Application Serial No. 14765396.8, Response filed May 23, 2019 to Communication Pursuant to Article 94(3) EPC mailed Dec. 5, 2018", 16 pgs.
"European Application Serial No. 14765396.8, Response filed May 25, 2017 to Extended European Search Report mailed Oct. 28, 2016", 5 pgs.
"European Application Serial No. 15834201.4, Extended European Search Report mailed Mar. 16, 2018", 8 pgs.
"European Application Serial No. 15834201.4, Response filed Oct. 9, 2017 to Communication Pursuant to Rules 161(2) and 162 EPC mailed Mar. 29, 2017", 15 pgs.
"European Application Serial No. 15834201.4, Response filed Oct. 15, 2018 to Extended European Search Report mailed Mar. 16, 2018", 17 pgs.
"European Application Serial No. 16795581.4, Extended European Search Report mailed Feb. 12, 2019", 9 pgs.
"European Application Serial No. 16795581.4, Response filed Aug. 6, 2018 to Communication Pursuant to Rules 161(2) and 162 EPC mailed Jan. 26, 2018", 16 pgs.
"European Application Serial No. 16795581.4, Response filed Sep. 11, 2019 to Extended European Search Report mailed Feb. 12, 2019", 14 pgs.
"European Application Serial No. 16795582.2, Extended European Search Report mailed Nov. 20, 2018", 8 pgs.
"European Application Serial No. 16795582.2, Response filed Jun. 17, 2019 to Extended European Search Report mailed Nov. 20, 2018", 16 pgs.
"European Application Serial No. 16795582.2, Response filed Jul. 17, 2018 to Communication Pursuant to Rules 161(2) and 162 EPC mailed Jan. 8, 2018", 12 pgs.
"European Application Serial No. 16813836.0, Communication Pursuant to Article 94(3) EPC mailed Mar. 24, 2020", 5 pgs.
"European Application Serial No. 16813836.0, Extended European Search Report mailed Mar. 25, 2019", 9 pgs.
"European Application Serial No. 16813836.0, Partial Supplementary European Search Report mailed Dec. 5, 2018", 11 pgs.
"European Application Serial No. 16813836.0, Response filed Aug. 3, 2020 to Communication Pursuant to Article 94(3) EPC mailed Mar. 24, 2020", 8 pgs.
"European Application Serial No. 16813836.0, Response filed Aug. 21, 2018 to Communication Pursuant to Rules 161(2) and 162 EPC mailed Feb. 13, 2018", 37 pgs.
"European Application Serial No. 16813836.0, Response to Extended European Search Report mailed Mar. 25, 2019", 11 pgs.
"European Application Serial No. 17762365.9, Communication Pursuant to Article 94(3) EPC mailed Dec. 9, 2021", 6 pgs.

(56) References Cited

OTHER PUBLICATIONS

"European Application Serial No. 17762365.9, Extended European Search Report mailed Oct. 17, 2019", 8 pgs.
"European Application Serial No. 17762365.9, Response filed Apr. 19, 2022 to Communication Pursuant to Article 94(3) EPC mailed Dec. 9, 2021", 29 pgs.
"European Application Serial No. 17762365.9, Response filed Apr. 25, 2019 to Communication Pursuant to Rules 161 and 162 mailed Oct. 16, 2018", 12 pgs.
"European Application Serial No. 17762365.9, Response filed May 15, 2020 to Extended European Search Report mailed Oct. 17, 2019", 13 pgs.
"European Application Serial No. 17906575.0, Communication Pursuant to Article 94(3) EPC mailed Oct. 31, 2022", 4 pgs.
"European Application Serial No. 17906575.0, Response filed Mar. 8, 2023 to Communication Pursuant to Article 94(3) EPC mailed Oct. 31, 2022", 17 pgs.
"European Application Serial No. 18153408.2, Communication Pursuant to Rule 55 EPC mailed May 17, 2018", 2 pgs.
"European Application Serial No. 18153408.2, Extended European Search Report mailed Dec. 4, 2018", 5 pgs.
"European Application Serial No. 18153408.2, Response filed Jul. 2, 2019 to Extended European Search Report mailed Dec. 4, 2018", 12 pgs.
"European Application Serial No. 18160812.6, Communication Pursuant to Article 94(3) EPC mailed Nov. 19, 2020", 4 pgs.
"European Application Serial No. 18160812.6, Extended European Search Report mailed Feb. 11, 2019", 6 pgs.
"European Application Serial No. 18160812.6, Response filed Mar. 2, 2021 to Communication Pursuant to Article 94(3) EPC mailed Nov. 19, 2020", 2 pgs.
"European Application Serial No. 18160812.6, Response filed Aug. 6, 2019 to Extended European Search Report mailed Feb. 11, 2019", 23 pgs.
"European Application Serial No. 18211142.7, Extended European Search Report mailed Apr. 11, 2019", 6 pgs.
"European Application Serial No. 18211142.7, Response filed Aug. 8, 2019 to Extended European Search Report mailed Apr. 11, 2019", 10 pgs.
"European Application Serial No. 18214518.5, Extended European Search Report mailed Apr. 17, 2019", 5 pgs.
"European Application Serial No. 18214518.5, Response filed Jul. 16, 2019 to Extended European Search Report mailed Apr. 17, 2019", 3 pgs.
"European Application Serial No. 20180081.0, Extended European Search Report mailed Sep. 28, 2020", 7 pgs.
"European Application Serial No. 20180081.0, Response filed Apr. 20, 2021 to Extended European Search Report mailed Sep. 28, 2020", 11 pgs.
"European Application Serial No. 21154403.6, Extended European Search Report mailed Apr. 26, 2021", 8 pgs.
"European Application Serial No. 21154403.6, Response filed Dec. 9, 2021 to Extended European Search Report mailed Apr. 26, 2021", 15 pgs.
"European Application Serial No. 21212796.3, Extended European Search Report mailed Aug. 1, 2022", 11 pgs.
"European Application Serial No. 23155095.5, Extended European Search Report mailed Mar. 31, 2023", 11 pgs.
"European Application Serial No. 23155095.5, Response filed Dec. 12, 2023 to Extended European Search Report mailed Mar. 31, 2023", 12 pgs.
"Indian Application Serial No. 201717044889, First Examination Report dated Dec. 17, 2020", with English translation, 6 pages.
"Indian Application Serial No. 201717044889, Response filed Jun. 14, 2021 to First Examination Report dated Dec. 17, 2020", with English translation, 82 pages.
"Indian Application Serial No. 201717044890, First Examination Report mailed Oct. 23, 2020", with English translation, 6 pages.
"Indian Application Serial No. 201817002765, First Examination Report mailed Dec. 24, 2019", with English translation, 6 pages.
"Indian Application Serial No. 201817002765, Response filed Sep. 24, 2020 to First Examination Report mailed Dec. 24, 2019", with English translation, 30 pages.
"Indian Application Serial No. 201817037404, First Examination Report mailed Feb. 19, 2021", with English translation, 7 pages.
"Indian Application Serial No. 201817037404, Response filed Aug. 16, 2021 to First Examination Report mailed Feb. 19, 2021", 24 pgs.
"Indian Application Serial No. 201917046207, Hearing Notice mailed Dec. 26, 2023", 3 pgs.
"Indian Application Serial No. 201917046207, Response filed Jul. 20, 2022 to First Examination Report mailed Sep. 20, 2021", 34 pgs.
"Indian Application Serial No. 201917046210, Response filed Oct. 4, 2021 to First Examination Report mailed Jun. 9, 2021", 26 pgs.
"Indian Application Serial No. 201917046215, Hearing Notice mailed Jan. 11, 2024", 3 pgs.
"Indian Application Serial No. 201917046215, Hearing Notice mailed Feb. 2, 2024", 3 pgs.
"Indian Application Serial No. 201917046215, Hearing Notice mailed Feb. 20, 2024", 3 pgs.
"Indian Application Serial No. 201917046215, Response filed Mar. 31, 2022 to First Examination Report mailed Sep. 9, 2021", 50 pgs.
"Indian Application Serial No. 201917046215, Written Submission filed Mar. 15, 2024", 154 pgs.
"International Application Serial No. PCT/CA2012/000055, International Preliminary Report on Patentability mailed Aug. 1, 2013", 9 pgs.
"International Application Serial No. PCT/CA2012/000055, International Search Report mailed May 24, 2012", 4 pgs.
"International Application Serial No. PCT/CA2012/000055, Invitation to Pay Add'l Fees and Partial Search Report Mailed Mar. 23, 2012", 2 pgs.
"International Application Serial No. PCT/CA2012/000055, Written Opinion mailed May 24, 2012", 7 pgs.
"International Application Serial No. PCT/CA2012/00055, International Preliminary Report on Patentability mailed Aug. 1, 2013", 9 pgs.
"International Application Serial No. PCT/CA2012/00055, International Search Report mailed May 24, 2012", 4 pgs.
"International Application Serial No. PCT/CA2012/00055, Written Opinion mailed May 24, 2012", 7 pgs.
"International Application Serial No. PCT/CA2012/000749, International Search Report mailed Oct. 26, 2012", 3 pgs.
"International Application Serial No. PCT/CA2012/000749, Written Opinion mailed Oct. 26, 2012", 5 pgs.
"International Application Serial No. PCT/CA2013/000608, International Preliminary Report on Patentability mailed Mar. 5, 2015", 7 pgs.
"International Application Serial No. PCT/CA2013/000608, International Search Report mailed Sep. 23, 2013", 3 pgs.
"International Application Serial No. PCT/CA2013/000608, Written Opinion mailed Sep. 23, 2013", 5 pgs.
"International Application Serial No. PCT/CA2013/000609, International Preliminary Report on Patentability mailed Mar. 5, 2015", 7 pgs.
"International Application Serial No. PCT/CA2013/000609, International Search Report mailed Sep. 17, 2013", 3 pgs.
"International Application Serial No. PCT/CA2013/000609, Written Opinion mailed Sep. 17, 2013", 5 pgs.
"International Application Serial No. PCT/CA2013/000964, International Search Report mailed Feb. 7, 2014", 3 pgs.
"International Application Serial No. PCT/CA2013/000964, Written Opinion mailed Feb. 7, 2014", 6 pgs.
"International Application Serial No. PCT/CA2014/000048, International Preliminary Report on Patentability mailed Sep. 24, 2015", 8 pgs.
"International Application Serial No. PCT/CA2014/000048, International Search Report mailed Apr. 29, 2014", 3 pgs.
"International Application Serial No. PCT/CA2014/000048, Written Opinion mailed Apr. 29, 2014", 6 pgs.
"International Application Serial No. PCT/CA2014/000083, International Preliminary Report on Patentability mailed Sep. 24, 2015", 9 pgs.

(56) References Cited

OTHER PUBLICATIONS

"International Application Serial No. PCT/CA2014/000083, International Search Report mailed May 14, 2014", 3 pgs.
"International Application Serial No. PCT/CA2014/000083, Written Opinion mailed May 14, 2014", 7 pgs.
"International Application Serial No. PCT/CA2014/000148, International Preliminary Report on Patentability mailed Sep. 24, 2015", 5 pgs.
"International Application Serial No. PCT/CA2014/000148, International Search Report mailed May 9, 2014", 4 pgs.
"International Application Serial No. PCT/CA2014/000148, Written Opinion mailed May 9, 2014", 3 pgs.
"International Application Serial No. PCT/CA2014/000169, International Preliminary Report on Patentability mailed Sep. 24, 2015", 8 pgs.
"International Application Serial No. PCT/CA2014/000169, International Search Report mailed May 27, 2014", 3 pgs.
"International Application Serial No. PCT/CA2014/000169, Written Opinion mailed May 27, 2014", 6 pgs.
"International Application Serial No. PCT/CA2014/000171, International Preliminary Report on Patentability mailed Sep. 24, 2015", 7 pgs.
"International Application Serial No. PCT/CA2014/000171, International Search Report mailed May 27, 2014", 3 pgs.
"International Application Serial No. PCT/CA2014/000171, Written Opinion mailed May 27, 2014", 5 pgs.
"International Application Serial No. PCT/CA2015/050570, International Search Report mailed Sep. 1, 2015", 5 pgs.
"International Application Serial No. PCT/CA2015/050570, Written Opinion mailed Sep. 1, 2015", 4 pgs.
"International Application Serial No. PCT/CA2015/050787, International Search Report mailed Nov. 4, 2015", 3 pgs.
"International Application Serial No. PCT/CA2015/050787, Written Opinion mailed Nov. 4, 2015", 3 pgs.
"International Application Serial No. PCT/CA2016/050252, International Preliminary Report on Patentability mailed Nov. 30, 2017", 6 pgs.
"International Application Serial No. PCT/CA2016/050252, International Search Report mailed May 26, 2016", 3 pgs.
"International Application Serial No. PCT/CA2016/050252, Written Opinion mailed May 26, 2016", 4 pgs.
"International Application Serial No. PCT/CA2016/050507, International Preliminary Report on Patentability mailed Nov. 30, 2017", 5 pgs.
"International Application Serial No. PCT/CA2016/050507, International Search Report mailed Jul. 21, 2016", 3 pgs.
"International Application Serial No. PCT/CA2016/050507, Written Opinion mailed Jul. 21, 2016", 3 pgs.
"International Application Serial No. PCT/CA2017/050180, International Preliminary Report on Patentability mailed Sep. 20, 2018", 6 pgs.
"International Application Serial No. PCT/CA2017/050180, International Search Report mailed Apr. 26, 2017", 3 pgs.
"International Application Serial No. PCT/CA2017/050180, Written Opinion mailed Apr. 26, 2017", 4 pgs.
"International Application Serial No. PCT/IB2011/002145, International Preliminary Report on Patentability mailed Jan. 10, 2013", 13 pgs.
"International Application Serial No. PCT/IB2011/002145, International Search Report mailed Feb. 15, 2012", 7 pgs.
"International Application Serial No. PCT/IB2011/002145, Written Opinion mailed Feb. 15, 2012", 11 pgs.
"International Application Serial No. PCT/IB2016/053799, International Preliminary Report on Patentability mailed Jan. 4, 2018", 8 pgs.
"International Application Serial No. PCT/IB2016/053799, International Search Report mailed Aug. 26, 2016", 3 pgs.
"International Application Serial No. PCT/IB2016/053799, Written Opinion mailed Aug. 26, 2016", 6 pgs.

"International Application Serial No. PCT/US00/02956, International Preliminary Report on Patentability dated Jul. 9, 2001", 3 pgs.
"International Application Serial No. PCT/US00/02956, International Search Report mailed Nov. 8, 2000", 1 pg.
"Machine Translation of JP 09113167 A", Espacenet Patent Translate, [Online] Retrieved from the internet: <URL: https://worldwide.espacenet.com/publicationDetails/description?CC=JP&NR=H09113167A&KC=A&FT=D&ND=3&date=19970502&DB=&locale=en_EP>, (retrieved Dec. 24, 2018), 7 pgs.
"Meeting Programs", ASHRAE Technical Committee, (1997-2001), 13 pgs.
"Munters PFC Polymer Fluid Cooler", Munters Corp., (Sep. 2015), 2 pgs.
"Oasis PFC Polymer Fluid Cooler Product Information", Munters Corp., (Nov. 2013), 12 pgs.
"Plane plate membrane contactor prototypes", University of Genoa, (Published prior to Mar. 28, 2013), 1 pg.
"Singapore Application Serial No. 11201710777Y, Office Action mailed Jan. 31, 2019", in English, 7 pgs.
"Singapore Application Serial No. 11201710777Y, Response filed Jul. 1, 2019 to Office Action mailed Jan. 31, 2019", in English, 31 pgs.
"Singaporean Application Serial No. 11201709404P, Response filed Jul. 22, 2019 to Written Opinion mailed Feb. 22, 2019", in English, 62 pgs.
"Singaporean Application Serial No. 11201709404P, Written Opinion mailed Feb. 22, 2019", in English, 8 pgs.
"Singaporean Application Serial No. 11201909648V, Response filed Jan. 25, 2022 to Written Opinion dated Aug. 2025, 21", 16 pgs.
"Singaporean Application Serial No. 11201909695X, Response Filed Jan. 26, 2022 to Written Opinion mailed Aug. 26, 2021", W/out English Claims, 6 pgs.
"Translation of CN 201906567 U", Espacenet Patent Translate, [Online] Retrieved from the internet: <URL: http://translationportal.epo.org/emtp/translate/?ACTION=description-retrieval&COUNTRY=CN&ENGINE=google&FORMAT=docdb&KIND=U&LOCALE=en_EP&NUMBER=201906567&OPS=ops.epo.org/3.2&SRCLANG=zh&TRGLANG=en>, (Feb. 2, 2018), 4 pgs.
"Two-Wheel Desiccant Dehumidification System—Technology for Dehumidification and Improving Indoor Air Quality", Federal Technology Alert, (Apr. 1997), 24 pgs.
Abdel-Salam, Mohamed R.H., et al., "Design and testing of a novel 3-fluid liquid-to-air membrane energy exchanger (3-fluid LAMEE)", International Journal of Heat and Mass Transfer 92, (2016), 312-329.
Abdel-Salam, Mohamed R. H., et al., "Experimental Study of Effects of Phase-Change Energy and Operating Parameters on Performances of Two-Fluid and Three-Fluid Liquid-to- Air Membrane Energy Exchangers", ASHRAE Transactions, vol. 122, Part 1, (Jan. 2016), 134-145.
Abdel-Salam, Mohamed R. H., et al., "Performance testing of 2-fluid and 3-fluid liquid-to-air membrane energy exchangers for HVAC applications in cold-dry climates", International Journal of Heat and Mass Transfer, 106, (2017), 12 pgs.
Abdel-Salam, Mohamed R.H., et al., "Performance Testing of a Novel 3-Fluid Liquid-to-Air Membrane Energy Exchanger (3-Fluid LAMEE) for HVAC Applications", 28th Intl. Conference on Efficiency, Cost, Optimization, Simulation and Environmental Impact of Energy Systems (ECOS), Pau, France, (Jun. 30, 2015), 12 pgs.
Abdel-Salam, Mohamed R. H., et al., "Performance testing of a novel 3-fluid liquid-to-air membrane energy exchanger (3-fluid LAMEE) under desiccant solution regeneration operating conditions", International Journal of Heat and Mass Transfer, 95, (2015), 14 pgs.
Acker, William, "Industrial Dehumidification: Water Vapor Load Calculations And System Descriptions", HPAC Heating/Piping/Air Conditioning, (Mar. 1999), 49-59.
Bellia, L., et al., "Air Conditioning Systems With Desiccant Wheel for Italian Climates", International Journal on Architectural Science, vol. 1 No. 4, (2000), 193-213.
Bergero, Stefano, et al., "On the performances of a hybrid air-conditioning system in different climatic conditions", Energy 36(8), (2011), 13 pgs.

(56) References Cited

OTHER PUBLICATIONS

Bergero, Stefano, et al., "Performance analysis of a liquid desiccant and membrane contactor hybrid air-conditioning system", Energy and Buildings 42, (2010), 11 pgs.
Chant, Eileen E., et al., "A Steady-State Simulation Of An Advanced Desiccant-Enhanced Cooling And Dehumidification System", ASHRAE Transactions: Research, (Jul. 1992), 339-347.
Coad, William J., "Conditioning Ventilation Air for Improved Performance and Air Quality", HPAC Heating/Piping/Air Conditioning, (Sep. 1999), 6 pgs.
Diblasio, Robert, "Desiccants in Hospitals - Conditioning A Research Facility", Engineered Systems, (Sep. 1995), 4 pgs.
Downing, et al., "Operation and Maintenance for Quality Indoor Air", Proc. of the 7th Symposium On Improving Building Systems in Hot and Humid Climates, Ft. Worth, TX, (Oct. 9, 1990), 5 pgs.
Downing, Chris, "Humidity Control - No. Place Like Home", Engineered Systems, (1996), 4 pgs.
Erb, Blake, et al., "Experimental Measurements of a Run-Around Membrane Energy Exchanger (RAMEE) with Comparison to a Numerical Model", ASHRAE Transactions, vol. 115, Part 2, (2009), 689-705.
Fischer, J., et al., "Active Desiccant Dehumidification Module Integration With Rooftop Packaged HVAC Units - Final Report Phase 3B", Oak Ridge National Laboratory, Final Report: Phase 3B, (Mar. 2002), 36 pgs.
Fischer, John C., "Optimizing IAQ, Humidity Control, and Energy Efficiency In School Environments Through The Application Of Desiccant-Based Total Energy Recovery Systems", IAQ Atlanta: Paths to Better Building Environments/Environmental Effects on Heath and Productivity, (1996), 16 pgs.
Harriman, III, et al., "Dehumidification and Cooling Loads From Ventilation Air", ASHRAE Journal, (Nov. 1997), 7 pgs.
Harriman, III, et al., "Evaluating Active Desiccant Systems For Ventilating Commercial Buildings", ASHRAE Journal, (Oct. 1999), 7 pgs.
Harriman, III, et al., "New Weather Data For Energy Calculations", ASHRAE Journal, (Mar. 1999), 7 pgs.
Jeong, et al., "Energy Conservation Benefits of a Dedicated Outdoor Air System with Parallel Sensible Cooling By Ceiling Radiant Panels", ASHRAE Transactions; vol. 109. Part 2, (2003), 10 pgs.
Karniadakis, George E., et al., "Minimum-dissipation transport enhancement by flow destabilization: Reynolds' analogy revisited", J. Fluid Mech vol. 192, (1988), 365-391.
Kosar, Douglas R., et al., "Dehumidification Issues of Standard 62-1989", ASHRAE Journal, (Mar. 1998), 71-75.
Larson, Michael D., et al., "The elastic and moisture transfer properties of polyethylene and polypropylene membranes for use in liquid-to-air energy exchangers", Journal of Membrane Science 302, (2007), 14 pgs.
Larson, Michael David, et al., "The Performance of Membranes in a Newly Proposed Run-Around Heat and Moisture Exchanger", MS Thesis in Mechanical Engineering, University of Saskatchewan, Saskatoon, Canada, [Online] Retrieved from the internet: <URL: http://libran.usask.ca/theses/available/etd-12192006-094159/urnestricted/Larson Thesis.pdf>, (Dec. 2006), 177 pgs.
Lepoudre, P., et al., "Channel Flow with Sinusoidal Screen Insert", Dept. of Mech Engineering, Univ. of Saskatchewan, Proceedings of the 19th Annual Conference of the CFD Society of Canada, Montreal, (Apr. 2011), 6 pgs.
Mahmud, Khizir, "Design and Performance Testing of Counter-Cross-Flow Run-Around Membrane Energy Exchanger System", MS Thesis in Mechanical Engineering, University of Saskatchewan, Saskatoon, Canada, [Online] Retrieved form the internet: < URL: http://libranusask.ca/theses/ available/ etd-09092009-223833/ umestricted/KhizirMahmud2009-Sep-28a.pdf>, (Sep. 2009), 168 pgs.
Mahmud, Khizir, et al., "Performance testing of a counter-cross-flow run-around membrane energy exchanger (RAMEE) system for HVAC applications", Energy and Buildings, 42, (2010), 9 pgs.

McGahey, Kevin, et al., "Desiccants: Benefits for the Second Century of Air Conditioning", Proceedings of the 10th Symposium On Improving Building Systems In Hot and Humid Climates, Ft. Worth, Texas, (May 14, 1996), 9 pgs.
McGahey, Kevin, "New Commercial Applications For Desiccant-Based Cooling", ASHRAE Journal, (Jul. 1998), 41-45.
Mumma, Stanley A., et al., "Achieving Dry Outside Air in an Energy-Efficient Manner", ASHRAE Transactions 2001, vol. 107, Part 1, (2001), 8 pgs.
Mumma, Stanley A., "Dedicated Outdoor Air-Dual Wheel System Control Requirements", ASHRAE Transactions, vol. 107, Part 1, (2001), 9 pgs.
Mumma, Stanley A., et al., "Extension of the Multiple Spaces Concept of Ash Rae Standard 62 to Include Infiltration, Exhaust/ Exfiltration, Interzonal Transfer, and Additional Short-Circuit Paths", ASHRAE Transactions: Symposia, (1998), 1232-1241.
Mumma, Stanley A, "Overview of Integrating Dedicated Outdoor Air Systems With Parallel Terminal Systems", ASHRAE Transactions vol. 107, Part 1, (2001), 7 pgs.
Nimmo, B. G., et al., "DEAC: Desiccant Enhancement of Cooling-Based Dehumidification", ASHRAE Transactions: Symposia, (1993), 842-848.
Philip, Lepoudre, et al., "U.S. Appl. No. 15/574,205", Specification, (Nov. 15, 2017), 32 pgs.
Philip, Lepoudre, et al., "U.S. Appl. No. 15/574,205", Drawings, (Nov. 15, 2017), 9 pgs.
Philip, Lepoudre, et al., "U.S. Appl. No. 15/574,205", Claims, (Nov. 15, 2017), 5 pgs.
Qin, C. K., et al., "Engine-driven Desiccant-assisted Hybrid Air-conditioning System", 23rd World Gas Conference, Amsterdam, (2006), 15 pgs.
Ryan, K., et al., "Three-dimensional transition in the wake of bluff elongated cylinders", J. Fluid Mech., vol. 538, (2005), 29 pgs.
Scofield, C. Mike, et al., "HVAC Design for Classrooms: Divide and Conquer", Heating/Piping/Air Conditioning, (May 1993), 53-59.
Sevigny, Scoot P., et al., "Air Handling Unit Direct Digital Control System Retrofit To Provide Acceptable Indoor Air Quality And Global Energy Optimization", Energy Engineering, vol. 94, No. 5, (1997), 24-43.
Shank, Kurt M., et al., "Selecting the Supply Air Conditions for a Dedicated Outdoor Air System Working in Parallel with Distributed Sensible Cooling Terminal Equipment", ASHRAE Transactions, vol. 107, Part 1, (2001), 10 pgs.
Smith, Christopher S., et al., "Outdoor Air, Heat Wheels and JC Penny: A New Approach to Retail Ventilation", Proc. of the 11th Symposium On Improving Building Systems In Hot and Humid Climates, Ft. Worth, Texas, (Jun. 2, 1998), 1 pg.
Smith, James C., "Schools Resolve IAQ/Humidity Problems with Desiccant Preconditioning", Heating/Piping/Air Conditioning, (Apr. 1996), 6 pgs.
Sonin, Ain A., et al., "Optimization of Flow Design in Forced Flow Electrochemical Systems, with Special Application to Electrodialysis", Ind. Eng. Chem, Process Des. Develop vol. 13, No. 3, (1974), 8 pgs.
Swails, James F., et al., "A Cure for Growing Pains", Consulting Specifying Engineer, [Online] Retrieved from the internet: <URL: https://www.csemag.com>, (Jun. 1997), 4 pgs.
Turpin, Joanna, "Dehumidification: The Problem No One Wants To Talk About", [Online] Retrieved from the internet: <URL: http// www.esmagazine.com/copyrighVde12c1c879ba8010VgnVCM1 00000f932a8c0_?>, (Apr. 5, 2000), 6 pgs.
Vali, Alireza, "Modeling a Run-Around Heat and Moisture Exchanger Using Two Counter/Cross Flow Exchangers", MS Thesis in Mechanical Engineering, University of Saskatchewan, Saskatoon, Canada, [Online] Retrieved from the internet: <URL: http://library.usask.ca/ theses/mailable/etd-06032009-15-J.6-J.-1./unrestricted/Vali. AlirezaThesis.pdf>, (2009), 193 pgs.
Vali, Alireza, et al., "Numerical model and effectiveness correlations for a run-around heat recovery system with combined counter and cross flow exchangers", International Journal of Heat and Mass Transfer 52, (2009), 14 pgs.

(56) References Cited

OTHER PUBLICATIONS

Woods, J, et al., "Desiccant Enhanced Evaporative Air Conditioning: Parametric Analysis and Design", 2nd International Conference on Building Energy and Environment (COBEE), (Oct. 2012), 10 pgs.

Yborra, Stephen C., "Field Evaluation of Desiccant-Integrated HVAC Systems: A Review of Case Studies in Multiple Commercial/Institutional Building Types", Proc. of the 11th Symposium On Improving Building Systems In Hot and Humid Climates, Ft. Worth, Texas, (Jun. 2, 1998), 10 pgs.

U.S. Appl. No. 17/855,344, filed Jun. 30, 2022, Evaporate Cooling System With Liquid-To-Air Membrane Energy Exchanger.

U.S. Appl. No. 18/481,032, filed Oct. 4, 2023, Desiccant Enhanced Evaporative Cooling Systems And Methods.

U.S. Appl. No. 18/821,672, filed Aug. 30, 2024, Water Recovery In Desiccant Enhanced Evaporative Cooling Systems.

\* cited by examiner

SYSTEMS AND METHODS FOR MANAGING CONDITIONS IN ENCLOSED SPACE

CLAIM OF PRIORITY

This application is a U.S. National Stage Filing under 35 U.S.C. § 371 from International Patent Application No. PCT/CA2017/050478, titled "SYSTEMS AND METHODS FOR MANAGING CONDITIONS IN ENCLOSED SPACE," filed on Apr. 18, 2017 and published as WO 2018/191805 A1 on Oct. 25, 2018, the benefit of priority of which is claimed hereby, and which is incorporated by reference herein in its entirety.

DESCRIPTION OF DRAWINGS

In the drawings, which are not necessarily drawn to scale, like numerals may describe similar components in different views. Like numerals having different letter suffixes may represent different instances of similar components, sub-components of a larger logical or physical system, or the like. The drawings illustrate generally, by way of example, but not by way of limitation, various examples described in the present disclosure.

DETAILED DESCRIPTION

Figure 1:
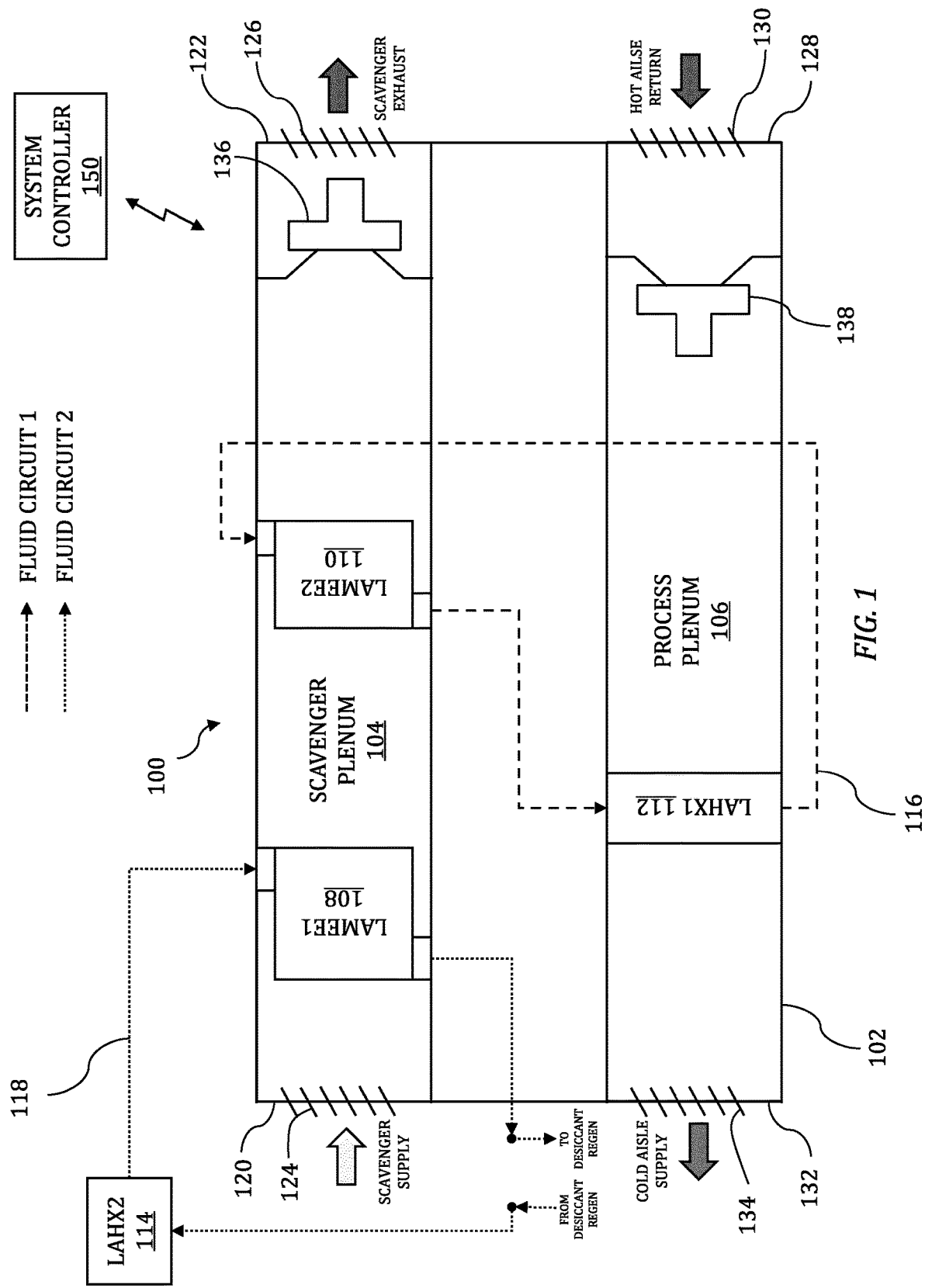
FIG. 1 schematically depicts an example conditioning system in accordance with this disclosure.

The inventor(s) recognize, among other things, an opportunity for improved performance in providing cooling to an enclosed space by employing a liquid desiccant conditioning module to lower the relative humidity of a scavenger (or outdoor) air stream before supplying the scavenger air to an indirect evaporative cooler, which indirectly and sensibly cools the process (or supply) air supplied to the enclosed space. Such systems with a liquid desiccant dryer can meet a discharge cooling set point temperature (for product/process cooling or for comfort cooling applications) over a larger range of inlet working air temperatures and humidity levels than other types of systems and potentially for any inlet working air conditions. In some cases, the water collected in the liquid desiccant dryer module exceeds the water needed in the evaporative cooler, thus potentially substantially reducing or eliminating large amounts of water usage typical of various types of heating and cooling systems.

Comfort cooling of residential, commercial and institutional buildings is predominantly done using vapor-compression cooling equipment. Many process applications, such as data centers, also use mechanical cooling for primary or supplemental cooling. In most of these applications the required cooling temperature is moderate (for example, in a range from about 50 degrees Fahrenheit to about 85 degrees Fahrenheit). Vapor-compression mechanical cooling equipment can produce high cooling capacities, operate reliably and can have acceptable cost due to mass production of compressors, exchangers and other components. However, these systems require significant amounts of high grade energy (usually electricity) to operate. For example, some studies have estimated that about 15% of the total annual US domestic electricity production is consumed by air conditioning units. Moreover, it has been estimated that about ⅓ of the peak electricity demand in hot summer months is driven by air conditioning units, leading, in some cases, to issues with power grid loading and stability.

The production of electricity remains carbon intensive, so electricity driven cooling systems can contribute to carbon dioxide ($CO_2$) emissions and potentially to other issues like global warming and climate change. In addition, thermoelectric power production requires relatively large amounts of water for cooling, and the US average water consumption (evaporated water) for combined thermoelectric and hydroelectric power production is about 2 gallons/kWh. In fact, it has been estimated that the water consumed to produce the electricity required by an EER 11 air conditioner is about equivalent to the water consumed by a good efficiency evaporative cooling system producing an equivalent amount of cooling. However, evaporative cooling systems consume far less electricity.

Vapor-compression systems also typically require synthetic refrigerants operating at high pressures. The deployment of large quantities of refrigerants in air conditioning and refrigeration systems can result in safety, health and environmental issues, including, for example ozone depletion caused by chlorofluorocarbon (CFC) refrigerants. Modern high efficiency refrigerants such as hydrofluorocarbons (HFCs) may have very high global warming potential and are being phased out of use. Additionally, proposed replacement hydrofluoro-olefins (HFO) refrigerants and refrigerant mixtures may still have modestly high global warming potential (GWP) and are flammable, potentially toxic and expensive. Thus, there is a challenge in discovering or designing direct replacement refrigerant options for new and already installed vapor-compression systems, which has the desired properties in terms of efficiency, stability, flammability, toxicity, and environmental impact.

Evaporative cooling systems are used successfully in many applications, especially in dry climates. Direct evaporative coolers are generally considered simple and efficient, but can lead to indoor humidity problems. Indirect evaporative coolers generally address the humidity issue, but may operate at lower wet bulb efficiencies. Dew-point evaporative coolers can deliver lower cooling temperatures than conventional direct or indirect evaporative systems and can maintain cooling power to higher outdoor wet bulb temperatures. However, all evaporative cooling technologies lose cooling performance as the working air humidity rises and may not be able to be used in humid climates without supplemental (usually vapor-compression) cooling equipment.

The water usage efficiency of evaporative cooling systems also varies widely depending on the system design and control characteristics. The water usage of evaporative coolers can be a significant perceived or real problem. For example, large scale data centers can consume surprisingly large quantities of potable water, and in locations where evaporative cooling works best (dry climates), the water demand may not be sustainable.

Absorption chillers have been employed for comfort and process cooling, especially when waste heat is available. Absorption chiller systems have been commercialized for larger scale applications and may be an alternative to mechanical cooling in integrated building designs where the required technical and maintenance support is available. Single-effect absorptions chillers have a COP<1, so significant quantities of heat are required to drive the system. Current absorption chiller designs are intended to replace electric chillers and deliver comparable cooling temperatures (for example, 40° F.-50° F.). However, this may require the use of specialized materials (alloy metals), vacuum vessels, multiple heat exchangers, relatively high grade heat input for the generator, control methods to prevent crystallization, etc. Higher efficiency double and triple effect designs are increasingly complex and expensive. The complexity, cost and maintenance requirements of absorption systems may limit their widespread acceptance as an alternative to mechanical cooling, especially in lighter load commercial and residential applications.

There remains an urgent need for alternative cooling technologies for comfort conditioning applications which can largely replace mechanical cooling. The growing awareness of environmental impacts, electricity consumption and increasing regulatory pressure on refrigerants are pressing challenges for current HVAC cooling equipment. This need was identified and articulated in the U.S. Department of Energy BTO report in 2014 titled "Energy Savings Potential and RD&D Opportunities for Non-Vapor-Compression HVAC Technologies."

One of the most promising technologies identified in this DOE report was desiccant enhanced evaporative cooling systems. However, there is a need for a commercially viable design which meets requirements for first cost, ongoing operation costs, performance, reliability, size/weight restrictions, etc., while avoiding the creation of any new resource utilization problems such as excessive water or natural gas consumption.

The ideal system design would have good cooling performance and compactness, make use of low cost materials, and avoid the use of any environmentally harmful or toxic substances. From a thermodynamic perspective, the system should operate near atmospheric pressures with low grade heat input, employ moderate temperature changes and exchange fluxes to minimize irreversibility in the system and improve second law efficiency. Comfort conditioning only requires low grade cooling, and an exergy analysis can illustrate how wasteful it may be to use precious high grade energy sources such as electricity to drive cooling equipment. Currently this is most clearly evident in data center applications, where operators want to maximize the utilization of available electricity supplies for running computing equipment (an appropriate use of electricity) and minimize electricity consumption by cooling equipment.

In one example, a system for controlling conditions in an enclosed space includes a scavenger plenum, a process plenum, a first liquid-to-air membrane energy exchanger (LAMEE1), a second LAMEE (LAMEE2), a first liquid-to-air heat exchanger (LAHX1), and a second LAHX (LAHX2). The process plenum is configured to direct scavenger air from a scavenger inlet to a scavenger outlet. The process plenum is configured to direct process air from a process inlet to a process outlet. The process inlet receives heated air from the space and the process outlet supplies cooled air to the space. LAMEE1 is arranged inside the scavenger plenum. LAMEE1 is configured to use a first fluid flowing there through to reduce the humidity of the scavenger air. A first concentration of water in the first fluid at a fluid inlet of LAMEE1 is lower than a second concentration of water in the first fluid at a fluid outlet of LAMEE1. LAMEE2 is arranged inside the scavenger plenum downstream of LAMEE1. LAMEE2 is configured to use the scavenger air to evaporatively cool a second fluid flowing through LAMEE2. A temperature of the second fluid at a fluid outlet of LAMEE2 is lower than a temperature of the second fluid at a fluid inlet of LAMEE2. LAHX1 is arranged inside the process plenum. LAHX1 is configured to directly and sensibly cool the process air being directed through the process plenum using a third fluid flowing through LAHX1. LAHX2 is in fluid communication with LAMEE1 and is configured to receive and cool the first fluid using outdoor air.

FIG. 1 depicts an example conditioning system 100. Conditioning system 100 is configured to condition the air in an enclosed space like a data center. Conditioning system 100 is what is sometimes referred to as a 100% recirculation system, which generally means that the air within the enclosed space recirculates through the conditioning system (in this case through one portion of the system, for example, the process side of the system) in a continuous cycle of being cooled by the system to a target supply air temperature, supplied to the space, heated by elements in the space (for example, computers, servers, and other electronics), and returned to the system for cooling. Although not shown or described in detail, the conditioning system can include a make-up air unit or system, to continuously or periodically refresh the air within the space. With the addition of make-up air, in some cases, humidification and/or dehumidification units may be employed to control the humidity of the air in the enclosed space.

In FIG. 1, conditioning system 100 includes system cabinet 102, scavenger plenum 104, process plenum 106, LAMEE1 108, LAMEE2 110, LAHX1 112, LAHX2 114 and first fluid circuit 116 and second fluid circuit 118. Scavenger plenum 104 includes inlet 120 and outlet 122. Associated and generally collocated with each of inlet 120 and outlet 122 are dampers 124, 126, respectively. Process plenum 106 includes inlet 128, with which is associated and collocated damper 130, and outlet 132, which is associated and collocated damper 134. Conditioning system 100 also includes a liquid desiccant regeneration system, which is configured to regenerate desiccant leaving LAMEE1 108, which has been diluted by water from the scavenger air, and, in some cases, to supply the water removed from the desiccant to other components, including, for example, LAMEE2 110.

Although not shown in FIG. 1, in some examples, scavenger plenum 104 could also include a bypass inlet and bypass damper disposed between LAMEE1 108 and LAMEE2 110. In such situations, system 100 to could be configured to close damper 124 at inlet 120 and open the bypass damper to bypass LAMEE1 108 and direct the scavenger air (for example, outdoor air) in through the damper inlet and through LAMEE2 110.

Air from the enclosed space enters system 100 through process inlet 128. The air entering system 100 has been heated in the enclosed space and requires cooling to a target supply air temperature, which is generally determined based on the amount and characteristics of equipment housed in the enclosed space, for example, computing, networking, data storage and other equipment. Air is supplied to the enclosed space from system 100 through process outlet 132. This supply air is cooled by system 100 and is transported into the space at or within an acceptable tolerance of the target supply air temperature.

Scavenger plenum 104 and the scavenger air flowing there through can be a plenum that transports outdoor air (OA) from inlet 120 through/by LAMEE1 108 and LAMEE2 110, and then exhausts the increased enthalpy OA air through scavenger outlet 122. The scavenger and process plenums 104 and 106 are sealed from one another such that the scavenger and process air streams do not intermix with one another (other than ordinary leakage between the two plenums, if collocated).

Scavenger plenum 104 and process plenum 106 are defined by partitioned sub-sections of the interior space of cabinet 102, as is schematically depicted in FIG. 1. In other examples, scavenger and process plenums 104 and 106 can be separate from and mounted within system cabinet 102 of system 100. Although some components of example systems in accordance with this disclosure are schematically depicted as outside of the overall system cabinet and/or outside of the two separate plenums, at least in some examples all of the cooling/conditioning components of example system(s) are located within a single system enclosure, which can be conveniently packaged, transported, and installed. In such cases, the scavenger and process inlets and outlets can be connected directly to or indirectly via appropriate ducting or other fluid flow conduit to additional scavenger air supply and exhaust flow paths and to additional enclosed space supply and return flow paths. Additionally, one or more of the components depicted within cabinet 102 and/or plenums 104 and 106 can be located external to and/or separate from such enclosures. Additionally, plenums may located and/or packaged separate from one another instead of sharing a common cabinet. Moreover, example systems in accordance with this disclosure can be employed in combination with other heating, cooling, humidification, dehumidification, recovery, regeneration and other components or systems located within or otherwise along these additional scavenger and process air flow paths.

Example conditioning systems in accordance with this disclosure include liquid to air membrane energy exchangers (LAMEEs), which are configured to transfer heat and moisture between a liquid and an air stream to condition the temperature and humidity of the air and/or to condition the liquid flowing through the LAMEE. In an example, the membrane in a LAMEE can be a non-porous film having selective permeability for water, but not for other constituents that may be present in the liquid. Many different types of liquids can be used in combination with the non-porous membrane, including, for example, water, liquid desiccants, glycols. In an example, the membrane in the LAMEE can be semi-permeable or vapor permeable, and generally anything in a gas phase can pass through the membrane and generally anything in a liquid phase cannot pass through the membrane. In an example, the membrane in the LAMEE can be micro-porous such that one or more gases can pass through the membrane. In an example, the membrane can be a selectively-permeable membrane such that some constituents, but not others, can pass through the membrane. It is recognized that the LAMEEs included in the conditioning systems disclosed herein can use any type of membrane suitable for use with devices that are the same or equivalent to a LAMEE.

LAMEE1 108 can be used to lower the enthalpy of and dehumidify the scavenger air flowing through scavenger plenum 104. LAMEE1 108 can also collect water, which can be employed in/by other components of conditioning system 100 or other such systems in accordance with this disclosure. The water collection rate/capacity of LAMEE1 108 can exceed the evaporation rate of LAMEE2 110 (or another type of evaporative cooler), which can make operation of conditioning system 100, or at least operation of LAMEE2 independent of additional/external water sources. Additionally, because LAMEE1 108 can effectively operate in a variety of ambient conditions using a liquid desiccant at temperatures (for example, on the order of 35 degrees Celsius) that are higher than the outdoor ambient dry bulb temperature, cooling/heat rejection of the desiccant exiting LAMEE1 can occur in an air cooler (for example, a polymer fluid cooler or PFC) using only outdoor air.

LAMEE1 108 of conditioning system 100 can function to remove water from the scavenger air using a liquid desiccant to decrease the humidity of the scavenger air and thereby lower the wet bulb temperature. The temperature of the scavenger air passing through LAMEE1 108 may be lowered modestly, but the decrease in humidity and associated effect of lowering wet bulb temperature can significantly increase the cooling capacity of LAMEE2 110 (configured to operate as an evaporative cooler) and thereby improve and expand the efficiency with which and the conditions under which system 100 can meet the target supply air temperature for a data center or other enclosed space.

The cooling fluid circulating through LAMEE1 108 and/or LAMEE2 110 can include water, liquid desiccant, glycol, other hygroscopic fluids, other evaporative liquids, and/or combinations thereof. In an example, the cooling fluid employed in and flowing through LAMEE1 108 is a liquid desiccant that is a high concentration salt solution. The presence of salt can sanitize the cooling fluid to prevent microbial growth. In addition, the desiccant salt can affect the vapor pressure of the solution and allow the cooling fluid to either release or absorb moisture from the air. The concentration of the liquid desiccant can be adjusted for control purposes to control the amount of cooling and/or dehumidification of the scavenger air or cooling fluid within/passing through/by LAMEE1 108.

In an example, the cooling fluid employed in and flowing through LAMEE2 110 is water and, in some cases, the water flowing through LAMEE2 110 or a portion thereof is water removed from the scavenger air by LAMEE1 108. LAMEE2 110 can include a water inlet and a water outlet for passing water through the exchanger. In other cases, other types of evaporative cooling fluids, including those listed above, can be used in combination with or as an alternative to water for LAMEE2 110 and other such examples in accordance with this disclosure.

In one example, a liquid desiccant, for example a salt solution desiccant flows into LAMEE1 108 via a liquid inlet and out of LAMEE1 108 via a liquid outlet. The scavenger air enters scavenger plenum 104 and flows through LAMEE1 108 via air inlets and outlets thereof. As the scavenger air flows by the liquid desiccant, separated by the membrane(s) employed in LAMEE1 108, water in the scavenger air condenses through the membrane into the liquid desiccant. The scavenger air exiting LAMEE1 108 can have a lower temperature and/or a lower humidity than the scavenger air entering LAMEE1, and, as a result, the enthalpy and the wet bulb temperature of the scavenger air are decreased. The reduced wet bulb temperature scavenger air flows out of LAMEE1 108 downstream through scavenger plenum 104 into LAMEE2 110.

LAMEE2 110 of conditioning system 100 can recirculate a cooling fluid, including an evaporative fluid to reduce the temperature of the cooling fluid by evaporating water from the fluid into the scavenger air passing through LAMEE2. LAMEE2 110 can operate as an evaporative cooler, using the cooling potential in both the scavenger air and the cooling fluid (for example, water) to reject heat. Although the examples disclosed include LAMEE2 configured as an evaporative cooler in the scavenger plenum 104, in other examples, different types of evaporative cooling devices can be employed, including, for example, a wetted media direct evaporative cooler. In an example, LAMEE2 110 can use a flexible polymer membrane, which is vapor permeable, to separate the scavenger air and water or other fluid flowing through LAMEE2. Relative to other systems/devices, the water flow rate and air flow rate through LAMEE2 110 may not be limited by concerns such as droplet carryover at high face velocities. In addition, LAMEE2 110 can operate with water flow rates that enable the transport of thermal energy into the cooler similar to a cooling tower, and the elevated inlet water temperatures can boost the evaporative cooling power of LAMEE2.

LAMEE2 110 can be referred to herein as an evaporative cooler and/or an evaporative cooler LAMEE. As scavenger air flows through LAMEE2 110, the water, or both the scavenger air and the water, can be cooled to temperatures approaching the entering air wet bulb (WB) temperature, as a portion of the water flowing through LAMEE2 evaporates into the scavenger air. The scavenger air exiting LAMEE2 110 can pass through scavenger fan 136 and exit scavenger plenum 104 at the outlet thereof as exhaust.

Due to the evaporative cooling process in LAMEE2 110, a temperature of the water at the outlet of the exchanger can be less than a temperature of the water at the inlet. In other words, the water flowing through the LAMEE2 110 is cooled by the device between the inlet and the outlet. The reduced-temperature, or "cooled" water from LAMEE2 110 can be used to provide cooling to process air flowing through/by LAHX1 112.

LAMEE1 108 can be referred to as a dehumidification LAMEE and/or desiccant driven dehumidification LAMEE. As noted above, LAMEE2 110 can be referred to as an evaporative cooler LAMEE. As shown in FIG. 1, dehumidification LAMEE1 108 is arranged upstream of evaporative cooler LAMEE2 110 in scavenger plenum 104 to reduce the humidity of the scavenger air prior to evaporative cooling in the evaporative cooler LAMEE2. Pre-drying the scavenger air boosts the cooling potential in system 100 by lowering the wet bulb temperature of the scavenger air and thereby lowering the ideal and actual cooling limits of evaporative cooler LAMEE2 110. Dehumidification LAMEE1 108 may also pre-cool the scavenger air. Desiccant driven dehumidification may allow cooling of the process air by system 100 to even lower temperatures with modest amounts of additional energy input.

Dehumidification LAMEE1 108 may be similar in construction to evaporative cooler LAMEE2 110. However, dehumidification LAMEE1 108 can employ a different cooling fluid than evaporative cooler LAMEE2 110. For example, the desiccant fluid flowing through LAMEE1 108 may be a lithium chloride solution, while the cooling (or "evaporative") fluid flowing through LAMEE2 110 may be pure water or water of a relatively high purity.

Example conditioning system 100 also includes two liquid-to-air heat exchangers, LAHX1 112 and LAHX2 114, which generally exchange heat between a cooling fluid flowing through the exchanger and air flowing over/by the exchanger. LAHX1 112 is arranged in process plenum 106 and is the cooling component in conditioning system 100 that ultimately directly and sensibly cools the process air from the enclosed space.

LAHX1 110 can be a variety of types of liquid-to-air exchangers, including, for example, cooling coils. Cooling coils are commonly formed of coiled copper tubes embedded in a matrix of fins. A variety of particular configurations, capacities, etcetera can be employed in examples according to this disclosure. Other example LAHXs that can be used include micro-channel heat exchangers. The cooling fluid circulating through one or both of LAHX1 110 and LAHX2 112 can include water, liquid desiccant, glycol, other hygroscopic fluids, other evaporative liquids, and/or combinations thereof. Additionally, the cooling fluid flowing through LAHX1 112 can be the same as or different than the cooling fluid flowing through LAMEE2 110, as described in more detail with other examples in accordance with this disclosure.

LAHX2 114 is configured to cool the liquid desiccant exiting LAMEE1 108 and return the desiccant to the fluid inlet of LAMEE1. As noted above, in some examples, the inlet temperature threshold (or set point) of LAMEE1 108 can be higher than the outdoor air dry bulb temperature. In at least some such cases, LAHX2 114 can cool the liquid desiccant to the inlet temperature threshold of LAMEE1 108 using only outdoor air in a sensible cooling process. In some cases, however, a combination of outdoor air and some kind of evaporative cooling augmentation (for example, adiabatic cooling or water sprays) may be employed in LAHX2 114 to cool the liquid desiccant exiting LAMEE1 108.

LAHX1 112 can be a variety of types of fluid cooling components and/or liquid-to-air exchangers. In one example, LAHX1 110 is a polymer fluid cooler (PFC), which is configured to employ outdoor air to cool the liquid desiccant exiting LAMEE1 108 to a target inlet desiccant temperature. Such a PFC can be, for example, a PolyCoil polymeric heat exchanger from Cesaroni Technology Inc. of Gormley, Ontario in Canada. Additional details and examples of the types of components employed as LAHX1 110 (or another similar component in other examples according to this disclosure) is illustrated in and described with reference to FIGS. 7 and 8.

Referring again to FIG. 1, conditioning system 100 also includes scavenger fan (or fan array) 136 and process fan (or fan array) 138, which drive the scavenger air and the process air, respectively, through system 100. Example conditioning system 100 and other example systems in accordance with this disclosure can include more or fewer fans than shown in the example of FIG. 1. Moreover, the fans can be located in different locations within the system 100 relative to what is shown in FIG. 1. For example, one or both of scavenger fan 136 and process fan 138 can be configured as a single fan or multiple fans, including a fan array, such as, for example, FANWALL® Systems provided by Nortek Air Solutions of O'Fallon, Missouri. Although not shown in the figures, example conditioning systems in accordance with this disclosure can include one or more filters disposed at a variety of locations in one or both of scavenger plenum 104 and process plenum 106.

In the example of FIG. 1, scavenger fan 136 is arranged inside scavenger plenum 104 downstream of LAMEE2 110. In this position, at least some of the heat generated by scavenger fan 136 is exhausted out of scavenger plenum 104 through scavenger outlet 122, which is just downstream of scavenger fan 136. Process fan 138 is arranged inside process plenum 106 upstream of LAHX1 112. In this position, some heat generated by process fan 138 can be removed by LAHX1 112. In other examples, scavenger fan 136 can be located at different positions within/along scavenger plenum 104 and process fan 138 can be located at different positions within/along process plenum 106.

In the example of FIG. 1, conditioning system 100 includes first fluid circuit 116 and second fluid circuit 118. Fluid circuits employed in examples according to this disclosure, including first and second fluid circuits 116 and 118 can include a number of different interconnected conduits or fluid flow pathways, as well as other cooling fluid related components, including, for example, valves, pumps, tanks or other storage vessels, etc. Each of first and second fluid circuits 116 and 118 can be thought of as including multiple interconnected fluid flow branches or could also be characterized as including multiple fluid circuits.

First and second fluid circuits 116 and 118 are structured and configured to transport one or more cooling fluids (or more generally "heat transfer" fluids) among the components of system 100. In the example of FIG. 1, first fluid circuit 116 transports a first cooling fluid among LAMEE1 108 and LAHX2 114. Second fluid circuit 118 transports a second cooling fluid among LAMEE2 110 and LAHX 112. As noted above, in one example, first fluid circuit 116 transports a salt solution liquid desiccant among LAMEE1 108 and LAHX2 114 and second fluid circuit 118 transports water among LAMEE2 110 and LAHX 112.

Conditioning system 100 also includes system controller 150. System controller 150 can include hardware, software, and combinations thereof to implement the functions attributed to the controller herein. System controller 150 can be an analog, digital, or combination analog and digital controller including a number of components. As examples, controller 150 can include ICB(s), PCB(s), processor(s), data storage devices, switches, relays, etcetera. Examples of processors can include any one or more of a microprocessor, a controller, a digital signal processor (DSP), an application specific integrated circuit (ASIC), a field-programmable gate array (FPGA), or equivalent discrete or integrated logic circuitry.

Storage devices, in some examples, are described as a computer-readable storage medium. In some examples, storage devices include a temporary memory, meaning that a primary purpose of one or more storage devices is not long-term storage. Storage devices are, in some examples, described as a volatile memory, meaning that storage devices do not maintain stored contents when the computer is turned off. Examples of volatile memories include random access memories (RAM), dynamic random access memories (DRAM), static random access memories (SRAM), and other forms of volatile memories known in the art. The data storage devices can be used to store program instructions for execution by processor(s) of controller 150. The storage devices, for example, are used by software, applications, algorithms, as examples, running on and/or executed by controller 150. The storage devices can include short-term and/or long-term memory, and can be volatile and/or non-volatile. Examples of non-volatile storage elements include magnetic hard discs, optical discs, floppy discs, flash memories, or forms of electrically programmable memories (EPROM) or electrically erasable and programmable (EEPROM) memories.

System controller 150 can be configured to communicate with conditioning system 100 and components thereof via various wired or wireless communications technologies and components using various public and/or proprietary standards and/or protocols. For example, a power and/or communications network of some kind may be employed to facilitate communication and control between controller 150 and conditioning system 100. In one example, system controller 150 may communicate with conditioning system 100 via a private or public local area network (LAN), which can include wired and/or wireless elements functioning in accordance with one or more standards and/or via one or more transport mediums. In one example, system 100 can be configured to use wireless communications according to one of the 802.11 or Bluetooth specification sets, or another standard or proprietary wireless communication protocol. Data transmitted to and from components of system 100, including controller 150, can be formatted in accordance with a variety of different communications protocols. For example, all or a portion of the communications can be via a packet-based, Internet Protocol (IP) network that communicates data in Transmission Control Protocol/Internet Protocol (TCP/IP) packets, over, for example, Category 5, Ethernet cables or over an 802.11 or Bluetooth wireless connection.

System controller 150 can include one or more programs, circuits, algorithms or other mechanisms for controlling the operation of conditioning system 100. For example, system controller 150 can be configured to modulate the speed of scavenger and process fans 136 and 138 and/or control actuation of valves, pumps, etc. in one or both of first fluid circuit 116 and second fluid circuit 118. System controller 150 can also be configured to operate system 100 in multiple conditioning (for example, cooling) modes. For example, system controller 150 can also be configured to operate system 100 in an evaporative mode in which LAMEE1 108 is deactivated, damper 124 is closed, a bypass damper (in scavenger plenum 104 between LAMEE1 108 and LAMEE2 110) is opened, and cooling fluid is circulated through a run-around loop defined by first fluid circuit 116 from the outlet of LAHX1 112 to the inlet of LAMEE2 110, through LAMEE2 110, from the outlet of LAMEE2 110 to the inlet of LAHX1 112, and through LAHX1 112 back to the outlet thereof. Additionally, system controller 150 can also be configured to operate system 100 in a desiccant enhanced evaporation mode in which LAMEE1 108 is activated, damper 124 is opened, the bypass damper is closed, and cooling fluid is circulated by first fluid circuit 116 among all of LAMEE1 108 and LAHX1 112.

Although not shown in detail in the example of FIG. 1, conditioning system 100 can also include one or more components to recover the fluid flowing through LAHX1 112 before returning to LAMEE2 110 and/or one or more components to regenerate the liquid desiccant flowing through LAMEE1 108. In the case of regeneration of liquid desiccant flowing through LAMEE1 108, in some examples, the regeneration circuit and components can be configured to regenerate less than 100% of the desiccant in each cycle through LAMEE1 and LAHX2.

In some examples according to this disclosure, an important feature/advantage of employing LAMEE1 (versus some other type of liquid desiccant device) is the relatively high desiccant flow rate that is possible through such example LAMEEs in accordance with this disclosure. Due to the high flow rates through the desiccant dryer LAMEE, even though the desiccant may pick up heat in LAMEE1 (in addition to moisture) the flow rates are such that the increase in temperature is tolerable without additional desiccant cooling such as requiring an additional cooling flowing through the same exchanger to cool the desiccant. The control of desiccant temperature is important in such systems, because, for a given desiccant salt concentration, the capacity of the desiccant to absorb moisture degrades as the desiccant temperature increases. Maintaining relatively high flow rates through the desiccant dryer LAMEE is assisted by only regenerating a portion of the total flow between LAMEE1 and LAHX2. Examples of such components or systems are described in more detail with reference to the examples of FIGS. 2 and 4.

Figure 2:
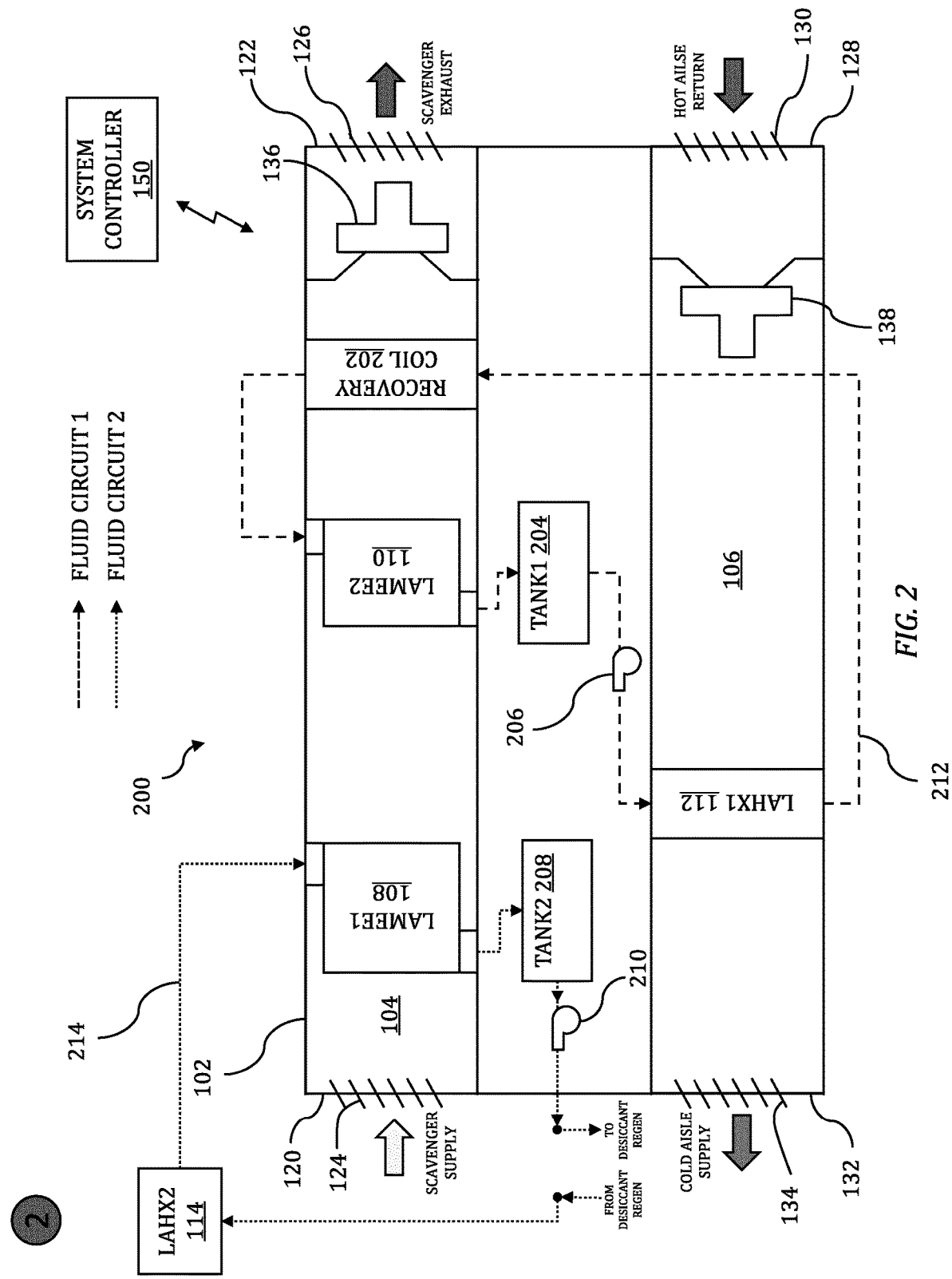
FIG. 2 depicts another example conditioning system in accordance with this disclosure.

FIG. 2 depicts another example conditioning system 200 in accordance with this disclosure. As is apparent from FIG. 2, conditioning system 200 shares many of the components and functions of example conditioning system 100 of FIG. 1. For example, conditioning system 200 includes system cabinet 102, scavenger plenum 104, process plenum 106, LAMEE1 108, LAMEE2 110, LAHX1 112, and LAHX2 114. Scavenger plenum 104 includes inlet 120 and outlet 122, and dampers 124 and 126, which are associated and generally collocated with each of inlet 116 and outlet 118. Process plenum 106 includes inlet 128, with which is associated and collocated damper 130, and outlet 132, which is associated and collocated damper 134. Conditioning system 200 also includes scavenger fan 136, process fan 138, and system controller 150. Conditioning system 200 includes a liquid desiccant regeneration system, which is configured to regenerate desiccant leaving LAMEE1 108, which has been diluted by water from the scavenger air, and, in some cases, to supply the water removed from the desiccant to other components, including, for example, LAMEE2 110.

In addition to the components in common with conditioning system 100, conditioning system 200 includes recovery coil 202, first storage tank 204 and first pump 206, and second storage tank 208 and second pump 210. Recovery coil 202 can include a number of different types of devices configured to use the air flowing out of LAMEE2 110 in scavenger plenum 104 to cool down the fluid returning from LAHX1 112 to LAMEE2. In one example, recovery coil 202 is one of a number of different types of LAHX devices.

The fluid exiting LAHX1 112 will be at an increased-temperature or "heated," because the rejected heat from the process air has been picked up by the fluid. The fluid can therefore be transported to recovery coil 202 in scavenger plenum 104, which cools the fluid before it returns to LAMEE2 110. Recovery coil 202 can cool the fluid using the cooling potential of the scavenger air. The scavenger air exiting LAMEE2 110 can be relatively cool and additional sensible heat from the cooling fluid can therefore be rejected into the scavenger air. One reason for the amount of energy still available in the scavenger air after going through LAMEE2 110 is that LAMEE2 cools the water or other fluid by increasing the humidity of the scavenger air versus substantially increasing the temperature of the air. In this sense, system 200 uses the latent heat transfer capacity of the scavenger air to cool a cooling fluid (for example, water) that is used to sensibly cool the process air and uses the sensible heat transfer capacity of the scavenger air to cool the fluid after it has picked up heat from the process air.

Therefore, one advantage of conditioning system 200 is the ability to use the scavenger air as a working fluid to cool down and recover the cooling fluid flowing through LAMEE2 110. Recovery coil 202 or an equivalent device can be relatively inexpensive, simple in construction and maintenance, thus potentially simplifying and reducing the cost and complexity of at least some example conditioning systems and methods in accordance with this disclosure. Moreover, recovery coil 202 may provide a number of advantages related to water usage efficiency over systems not including such a component. For example, inclusion of recovery coil 202 may make a true economizer operating mode possible in which no evaporative conditioning takes place and fluid is transported in a run around loop between recovery coil 202 and LAHX1 112. Additionally, the recovery coil 202 can increase the water efficiency of evaporative modes by increasing the temperature of the scavenger exhaust air.

In the example of conditioning system 200 of FIG. 2, first storage tank 204 and first pump 206 are included in and connected to first fluid circuit 212. First fluid circuit 212 can be similar in structure and function to first fluid circuit 116 of FIG. 1, except that first fluid circuit 212 includes tank 204 and pump 206 and associated couplings to incorporate these components into the circuit. Second storage tank 208 and second pump 210 are included in and connected to second fluid circuit 214. Second fluid circuit 214 can be similar in structure and function to second fluid circuit 118 of FIG. 1, except that second fluid circuit 214 includes tank 208 and pump 210 and associated couplings to incorporate these components into the circuit.

Storage tank 204 can be employed to store fluid cooled by LAMEE2 110. Although not shown in FIG. 2, tank 204 can include a make-up valve and a drain valve to maintain the fluid level and hardness level inside the tank. Tank 204 can include one or more temperature sensors in or around the tank to monitor a temperature of the fluid stored therein. In an example, the control scheme for conditioning system 200 can be based, in part, on a measured temperature of the fluid in tank 204 compared to a set point temperature. In an example, the set point temperature can be pre-determined based on an estimated cooling load from the enclosed space or a temperature required by the equipment of occupants of the enclosed space (for example, computing, networking, etc. equipment in a data center). The set point water temperature can also vary during operation of conditioning system 100, based in part on conditions in the enclosed space (for example, operation of the data center like periodic processing or data storage load variations).

Pump 206, which can be controlled by system controller 150, pumps the cooled fluid from storage tank 204 into LAHX1 112, by which LAHX1 112 cools the process air supplied to the enclosed space. After the fluid provides cooling to the process air, the fluid can be recirculated back to LAMEE2 110 (including through recovery coil 202).

Fluid circuit 212 can include a number of different interconnected conduits or fluid flow pathways, as well as other cooling fluid related components. Fluid circuit 212 can be thought of as including multiple interconnected fluid flow branches or could also be characterized as including multiple fluid circuits. In any event, fluid circuit 212 is structured and configured to transport one or more cooling fluids (or more generally "heat transfer" fluids) among the cooling components of system 200. In the example of FIG. 2, fluid circuit 212 transports cooling fluid, for example, water among LAMEE2 110, LAHX1 112, and recovery coil 202, stores the fluid in tank 204 and transports the fluid to LAHX1 112 from tank 204 using pump 206.

Storage tank 208 can be employed to store fluid that is used by LAMEE1 108 to dehumidify the scavenger air and to thereby lower the enthalpy/wet bulb temperature of the scavenger air to boost the cooling capacity of the evaporative cooler LAMEE2 110. Tank 208 can include one or more temperature sensors in or around the tank to monitor a temperature of the fluid stored therein. In an example, the control scheme for conditioning system 200 can be based, in part, on a measured temperature of the fluid in tank 208 compared to a set point temperature. In an example, the set point temperature can be pre-determined based on, inter alia, an estimated cooling load from the enclosed space. The set point temperature for the fluid flowing through LAMEE1 108 can also vary during operation of conditioning system 200, based in part on conditions in the enclosed space (for example, operation of the data center like periodic processing or data storage load variations). In an example, the temperature of the fluid entering LAMEE1 108 can be controlled by modulating the capacity of LAHX2 114.

Pump 210, which can be controlled by system controller 150, pumps the fluid from storage tank 208 to LAHX2 114, which cools the fluid using outdoor air and returns the cooled fluid to the fluid inlet of LAMEE1 108. Fluid circuit 214 can include a number of different interconnected conduits or fluid flow pathways, as well as other cooling fluid related components. Fluid circuit 214 can be thought of as including multiple interconnected fluid flow branches or could also be characterized as including multiple fluid circuits. In any event, fluid circuit 214 is structured and configured to transport one or more fluids among the select components of system 200. In the example of FIG. 2, fluid circuit 214 transports a fluid, for example, a liquid desiccant among LAMEE1 108 and LAHX2 114, stores the fluid in tank 208 and transports the fluid to LAHX2 114 from tank 208 using pump 210.

System controller 150 can be structured and operate in association with conditioning system 200 in a manner similar to that described with reference to conditioning system 100 of FIG. 1. For example, controller 150 can be communicatively connected to system 200, can control operation of components thereof, and can operate the system in multiple modes, including, for example, modes similar to the evaporation mode and the desiccant enhanced evaporation mode described above with reference to the example of FIG. 1. Additionally, system controller 150 can operate system 200 in a true economizer mode by transmitting a cooling fluid in a runaround loop between recovery coil 202 and LAHX1 112. In this true economizer mode, LAMEE1 108 and LAMEE2 110 (or another evaporative cooler in place of LAMEE2) are deactivated and the scavenger air sensibly cools the cooling fluid and the cooling fluid sensibly cools the process air.

Figure 3:
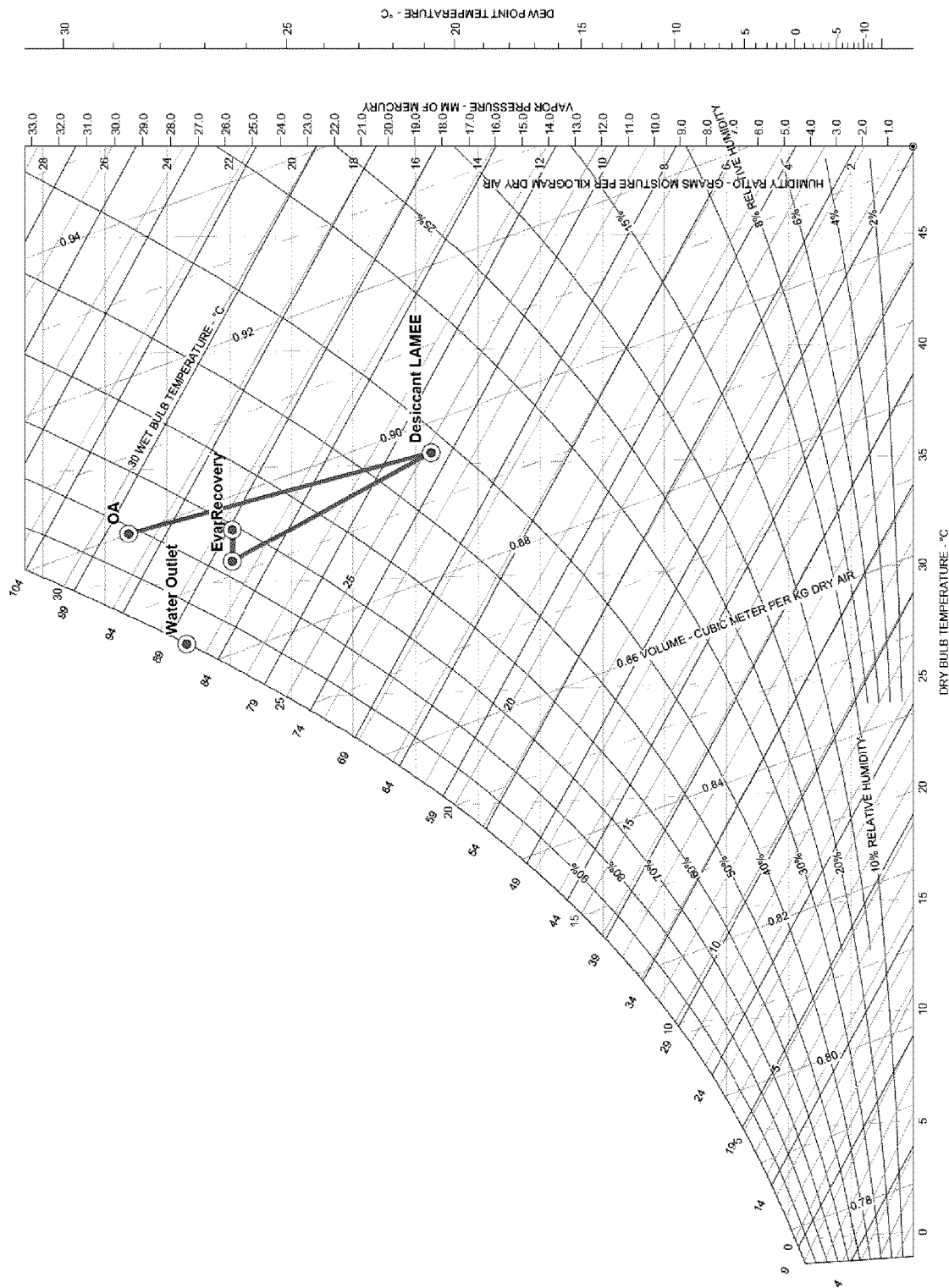
FIG. 3 is a psychometric process diagram for a theoretical system substantially similar to example system of FIG. 2.

FIG. 3 is a psychometric process diagram for a theoretical system substantially similar to example system 200 of FIG. 2. The psychometric process diagram illustrates the conditions of a modeled conditioning system and, in particular, conditions of the working fluid(s) thereof at different components of the system and/or at different points during operation. The process diagram depicted in FIG. 3 was created using various numerical, analytical, algorithmic, etc. methods, tools, etc. to estimate the physical characteristics of a system in accordance with this disclosure when operated under certain initial conditions.

The example modeled system is operated at ambient conditions including outdoor air dry bulb temperature of approximately 32.2 degrees Celsius, outdoor air wet bulb temperature of 29.4 degrees Celsius and relative humidity of 81.6%. Additionally, the altitude of the modeled system is sea level (0 meters), the barometric pressure is approximately 760 mm Hg, and the atmospheric pressure is approximately 101.325 kPa. The liquid desiccant employed in LAMEE1 is a lithium chloride solution with a salt concentration of approximately 38% and a target fluid inlet temperature of 35 degrees Celsius. The target set-point temperature for the process air supplied to the enclosed space from the outlet of the process plenum is approximately 30 degrees Celsius. The characteristic values associated with the process diagram of FIG. 3 are as follows:

| 1. Air Condition and Flow Rate at Scavenger Inlet 120 | | | | | | | | | | |
|---|---|---|---|---|---|---|---|---|---|---|
| Air Flow (Standard) (L/s) | Dry bulb (° C.) | Wet Bulb (° C.) | Relative Humidity (%) | Humidity Ratio (g/kg) | Specific Volume (cu · m/kg) | Enthalpy (kJ/kg) | Dew Point (° C.) | Density (kg/cu · m) | Vapor Pressure (mm Hg) | Absolute Humidity (g/cu · m) |
| 14.159 | 32.222 | 29.444 | 81.6 | 25.23 | 0.900 | 96.906 | 28.667 | 1.1394 | 29.4898 | 28.037 |
| Energy Change of Air across LAMEE1 108 | | | | | | | | | | |
| Start Point Name | Total Energy (W) | Sensible Energy (W) | Latent Energy (W) | Moisture Difference (kg/hr) | Sensible Heat Ratio | Enthalpy/ Humidity Ratio (kJ/kg/g/kg) | | | | |
| Inlet 120 | −365,991 | 57,615 | −423,606 | −595.7 | −0.157 | N/A | | | | |
| 2. Air Condition Leaving LAMEE1 108 | | | | | | | | | | |
| Air Flow (Standard) (L/s) | Dry bulb (° C.) | Wet Bulb (° C.) | Relative Humidity (%) | Humidity Ratio (g/kg) | Specific Volume (cu · m/kg) | Enthalpy (kJ/kg) | Dew Point (° C.) | Density (kg/cu · m) | Vapor Pressure (mm Hg) | Absolute Humidity (g/cu · m) |
| 14,159 | 35.500 | 24.867 | 42.4 | 15.50 | 0.896 | 75.384 | 20.772 | 1.1336 | 18.3994 | 17.303 |
| Energy Chang of Air across LAMEE2 110 | | | | | | | | | | |
| Start Point Name | Total Energy (W) | Sensible Energy (W) | Latent Energy (W) | Moisture Difference (kg/hr) | Sensible Heat Ratio | Enthalpy/ Humidity Ratio (kJ/kg/g/kg) | | | | |

| | | | | | | | | | |
|---|---|---|---|---|---|---|---|---|---|
| LAMEE1 | 197,590 | −81,791 | 279,381 | 391.9 | −0.414 | | N/A | | |

3. Air Condition Leaving LAMEE2 110

| Air Flow (Standard) (L/s) | Dry bulb (° C.) | Wet Bulb (° C.) | Relative Humidity (%) | Humidity Ratio (g/kg) | Specific Volume (cu · m/kg) | Enthalpy (kJ/kg) | Dew Point (° C.) | Density (kg/ cu.m) | Vapor Pressure (mm Hg) | Absolute Humidity (g/cu · m) |
|---|---|---|---|---|---|---|---|---|---|---|
| 14,159 | 30.900 | 27.425 | 76.8 | 21.90 | 0.891 | 87.003 | 26.339 | 1.1465 | 25.7358 | 24.571 |

4. Air Condition Leaving Recovery Coil 202

| Air Flow (Standard) (L/s) | Dry bulb (° C.) | Wet Bulb (° C.) | Relative Humidity (%) | Humidity Ratio (g/kg) | Specific Volume (cu · m/kg) | Enthalpy (kJ/kg) | Dew Point (° C.) | Density (kg/ cu · m) | Vapor Pressure (mm Hg) | Absolute Humidity (g/cu · m) |
|---|---|---|---|---|---|---|---|---|---|---|
| 14,159 | 32.300 | 27.748 | 70.9 | 21.90 | 0.895 | 88.467 | 26.339 | 1.1413 | 25.7358 | 24.458 |

Energy Chang of Air across Recovery Coil 202

| Start Point Name | Total Heating (kW) | Total Energy (W) | Sensible Energy (W) | Latent Energy (W) | Moisture Difference (kg/hr) | Sensible Heat Ratio | Enthalpy/ Humidity Ratio (kJ/kg/g/kg) |
|---|---|---|---|---|---|---|---|
| LAMEE2 | 24.9 | 24,892 | 24,892 | 0 | 0.0 | 1.000 | N/A |

5. Fluid Outlet of LAMEE2 110 Temperature (° C.)

| |
|---|
| 27.400 |

Referring to the psychometric process diagram of FIG. 3, the scavenger air, which in this example is outdoor air, enters the cooling system scavenger plenum via a scavenger inlet at a dry bulb temperature of 32.2 degrees Celsius, a wet bulb temperature of 29.4 degrees Celsius and has a relative humidity of 81.6%. After passing through LAMEE1, the enthalpy of the scavenger air has been markedly reduced and the scavenger air is at a dry bulb temperature of approximately 35.5 degrees Celsius, a wet bulb temperature of 24.9 degrees Celsius and has a relative humidity of 42.4%. After passing through LAMEE2, the scavenger air is at a dry bulb temperature of about 31 degrees Celsius, at a wet bulb temperature of 27.4 degrees Celsius, and has a relatively humidity of 76.8%.

Additionally, the process diagram of FIG. 3 illustrates that as the scavenger air passes through the recovery coil, the air sensibly cools the fluid flowing through the recovery coil and thus the scavenger air humidity ratio remains nearly unchanged, while the dry bulb temperature is increased as the scavenger air is sensibly heated by the fluid being circulated through the recovery coil. Finally, the temperature of the cooling fluid supplied from the outlet of LAMEE2 in the scavenger plenum to the inlet of LAHX1 in the process plenum is approximately 27.4 degrees Celsius, which, in this example, is sufficient for LAHX1 to sensibly cool the process air to a target set-point temperature for the enclosed space of approximately 30 degrees Celsius.

A target temperature of the fluid at the fluid outlet of LAMEE2 110 may be determined using the target set-point temperature for the enclosed space and the efficiency of LAHX1 112. The target set-point temperature for the enclosed space may be a known, constant, which is prescribed by desired conditions in the space. For example, in a data center, the target set-point temperature may be a temperature at or below which the computer, networking, data storage, etc. components in the data center need to be maintained for proper operation. Similarly, the efficiency of LAHX1 112 will be a value or range that is known and that is prescribed by the particular cooling component employed as LAHX1 112. Thus, the temperature of the fluid at the fluid outlet of LAMEE2 110, $T_{LAMEE2\_fluid\_outlet}$, can be determined by subtracting a known constant, A, which accounts for the inefficiency of LAHX1 112, from the target set-point temperature of the space, $T_{space}$, as follows:

$$T_{LAMEE2\_fluid\_outlet} = T_{space} - A \quad (1)$$

In the foregoing formula, "A" is sometimes referred to as the approach temperature, i.e. how close the air temperature, $T_{space}$, coming out of the coil approaches the inlet water temperature, $T_{LAMEE2\_fluid\_outlet}$. This term can be used at the design stage. However, in operation, the system would typically use a feedback control loop to maintain the leaving air temperature, $T_{space}$. The water temperature would be, for example, dynamically modulated to hold $T_{space}$ at a target value.

Referring again to FIG. 2, conditioning system 200 includes a liquid desiccant regeneration system, which is fluidically connected to LAMEE1 108 via second fluid circuit 214. The liquid desiccant regeneration system can take a number of different specific forms and is generally configured to regenerate diluted desiccant leaving LAMEE1 108 and, in some cases, to supply the water removed from the desiccant to other components, including, for example, LAMEE2 110. Thus, desiccant at a target concentration can be returned to LAMEE1 108 for use thereby/therein and water removed from the scavenger air by LAMEE1 can be supplied to a component that employs water to some useful effect(s) like replacing/supplying the water consumed in LAMEE2 110.

In general, example liquid desiccant regeneration systems can include thermally driven brine concentration systems. For example, a vacuum membrane distillation system could be employed, a byproduct of which is distilled water. In one example, a vacuum membrane distillation system from memsys GmbH of Germany. Other types of regenerations systems that are electrically or mechanically driven can also be used in examples according to this disclosure.

Figure 4:
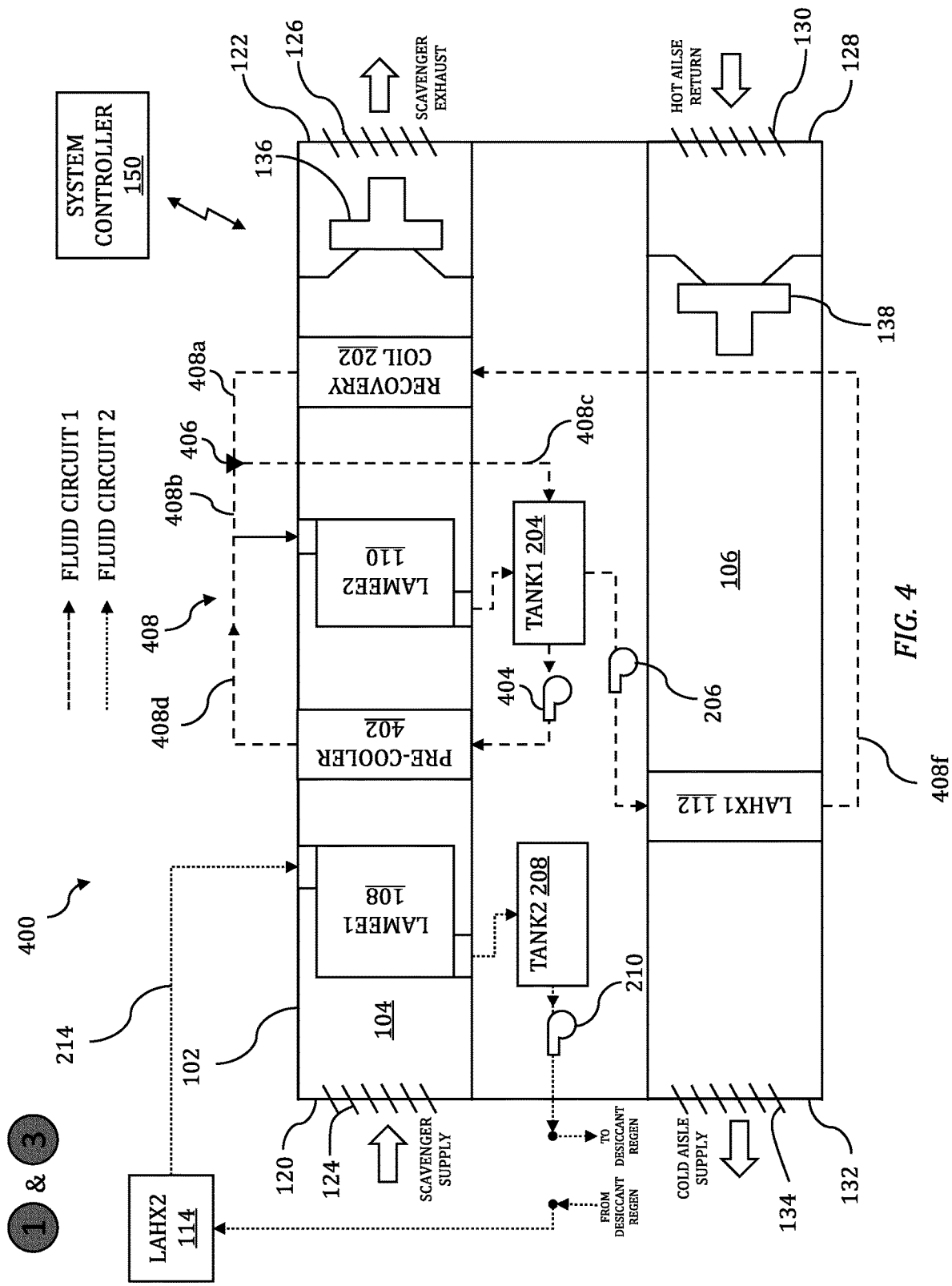
FIG. 4 depicts another example conditioning system.

Liquid desiccant regeneration systems can be employed in any examples in accordance with this disclosure, both to reconstitute a liquid desiccant used in a dehumidifying LAMEE and also to extract water removed from the scavenger air for some useful effect elsewhere in the same or a different system. FIG. 4 depicts another example conditioning system 400. Conditioning system 400 shares many of the components and functions of example conditioning system 200 of FIG. 2, and adds pre-cooler 402, pump 404 and valve 406, which are incorporated into and interconnected with the system via first fluid circuit 408. Thus, example conditioning system 400 includes LAMEE1 108 to lower the enthalpy/wet bulb temperature of the incoming scavenger air (for example, outdoor air) using a liquid desiccant, pre-cooler 402 to sensibly cool the dehumidified scavenger air from LAMEE1 before it flows through/by LAMEE2 110, LAMEE2 110 to cool a fluid for use by LAHX1 112 to directly and sensibly cool the process return air to be supplied back to the enclosed space, and recovery coil 202 to cool the fluid flowing out of LAHX1 112 before it is returned to the inlet of LAMEE2. Conditioning system 400 also includes a liquid desiccant regeneration system, which is configured to regenerate desiccant leaving LAMEE1 108, which has been diluted by water from the scavenger air, and, in some cases, to supply the water removed from the desiccant to other components, including, for example, LAMEE2 110.

In FIG. 4, conditioning system 400 includes system cabinet 102, scavenger plenum 104, process plenum 106, LAMEE1 108, LAMEE2 110, LAHX1 112, LAHX2 114 and recovery coil 202. Scavenger plenum 104 includes inlet 120 and outlet 122, and associated and generally collocated with each of inlet 120 and outlet 122 are dampers 124 and 126, respectively. Process plenum 106 includes inlet 128, with which is associated and collocated with damper 130, and outlet 132, which is associated and collocated with damper 134. Conditioning system 400 also includes scavenger fan 136, process fan 138, system controller 150, tanks 204 and 208 and associated pumps 206 and 210, and second fluid circuit 214.

Pre-cooler 402 of conditioning system 400 is arranged in scavenger plenum 104 between LAMEE1 108 and LAMEE2 110. Pre-cooler 402 can be, for example, a cooling coil that is configured to condition the scavenger air and/or the fluid flowing through the pre-cooler before it enters LAMEE2 110. In some examples, a filter (not shown) can be arranged inside scavenger plenum 104 and/or process plenum 106 near the air inlet.

In the example of FIG. 4, a branch of first fluid circuit 408 can transport water (or another heat transfer fluid) from tank 204 to the inlet of pre-cooler 402. The cooling fluid flowing through pre-cooler 402 is transported via fluid circuit 408 from the outlet of the pre-cooler to the inlet of LAMEE2 110 (and, in some cases, mixed with fluid exiting recovery coil 202).

First fluid circuit 408 of system 400 also includes valve 406. A branch 408a of first fluid circuit 408 transports cooling fluid cooled by recovery coil 202 out of the fluid outlet of the recovery coil to valve 406. Depending upon the state of valve 406, the fluid flowing through branch 408a either can flow through branch 408b to the inlet of LAMEE2 110 or can flow through branch 408c into tank 204. Branch 408d of fluid circuit 408 transports fluid from the outlet of pre-cooler 402 and intermixes with the fluid flowing through branch 408b (from valve 406), before flowing to the inlet of LAMEE2 110. Branch 408e transports fluid from tank 204 to the fluid inlet of LAHX1 112 in process plenum 106. Finally, branch 408f transports fluid from the outlet of LAHX1 112 in process plenum 106 to the inlet of recovery coil 202 in scavenger plenum 104.

In at least some cases, pre-cooler 402 can be effective when the temperature of the water entering the pre-cooler 402 is lower than the entering air (air leaving LAMEE1 if this device is operating and not bypassed) dry bulb temperature. Conditioning system 400 can be used in typical summer conditions as well as extreme summer conditions when the outdoor air can be very hot and humid. Pre-cooler 402 can function to depress the scavenger air dry bulb temperature, thus pre-cooling the scavenger air passing through the pre-cooler and heating the water in the pre-cooler 402. The scavenger air and the water can then pass through LAMEE2 110, as described above, in which case evaporation occurs and water (or other fluid) or both the air and water can be cooled to a temperature approaching the wet bulb temperature of the scavenger air leaving the pre-cooler, which is lower than the wet bulb temperature entering the pre-cooler. After passing through LAMEE2 110, the scavenger air can then pass through recovery coil 202 and thereby cool the heated fluid received by recovery coil 202 from LAHX1 112.

Conditioning system 400 can allow for a plurality of operating modes and selection of the mode can depend, for example, on the outdoor air conditions and a cooling load for the system. When the outdoor air is relatively cold (for example, at or below a threshold temperature), conditioning system 400 can operate in a first mode, an economizer mode. In this first example mode of operation, LAMEE1 108, pre-cooler 402 and LAMEE2 110 are all deactivated and/or bypassed from air and/or fluid flow. Recovery coil 202 in scavenger plenum 104 and LAHX1 112 in process plenum 106 are coupled such that the cooling fluid, for example, water circulates through the recovery coil and LAHX1 in a closed loop.

In a second operating mode, which can also be referred to as an adiabatic mode, the cooling fluid, for example, water continues to travel in a closed loop through recovery coil 202 in scavenger plenum 104 and LAHX1 112 in process plenum 106. LAMEE2 110 is engaged to adiabatically cool the incoming scavenger air before it goes through the recovery coil. In one example employing this or a similar adiabatic mode, water or another heat transfer fluid is pumped through LAMEE2 110 in a closed circuit, independent of the water or other fluid circuit transporting water among recovery coil 202 and LAHX1 112. LAMEE1 108 and pre-cooler 402 can be deactivated and/or bypassed from air and/or fluid flow in this second example mode of operation. LAMEE1 may also be actuated to pre-dry the air before it is adiabatically cooled in LAMEE2.

In a third operating mode, which can also be referred to as an evaporation mode, the water or other fluid flowing out of the outlet of recovery coil 202 is directed into the fluid inlet of LAMEE2 110, for example by activation or deactivation of valve 406. LAMEE2 110 cools the water to a set point temperature. The water flowing from the fluid outlet of LAMEE2 110 is transported to the fluid inlet of LAHX1 112 (for example, via tank1 204). In this mode, LAMEE2 110, recovery coil 202 and LAHX1 112 are all in the process water (or other fluid) circuit, while LAMEE1 108 and pre-cooler 402 are deactivated and/or bypassed from air and/or fluid flow in this second example mode of operation.

In a fourth operating mode, which can also be referred to as an enhanced or super evaporation mode, LAMEE1 108 and/or pre-cooler 402 are activated to lower the enthalpy of the scavenger air stream. Pre-cooler 402 may use some of the cold process water in tank1 204, or be supplied by another cold water source. In some examples, pre-cooler 402 and LAMEE1 108 may be staged on separately/sequentially, defining additional modes of operation.

Figure 5:
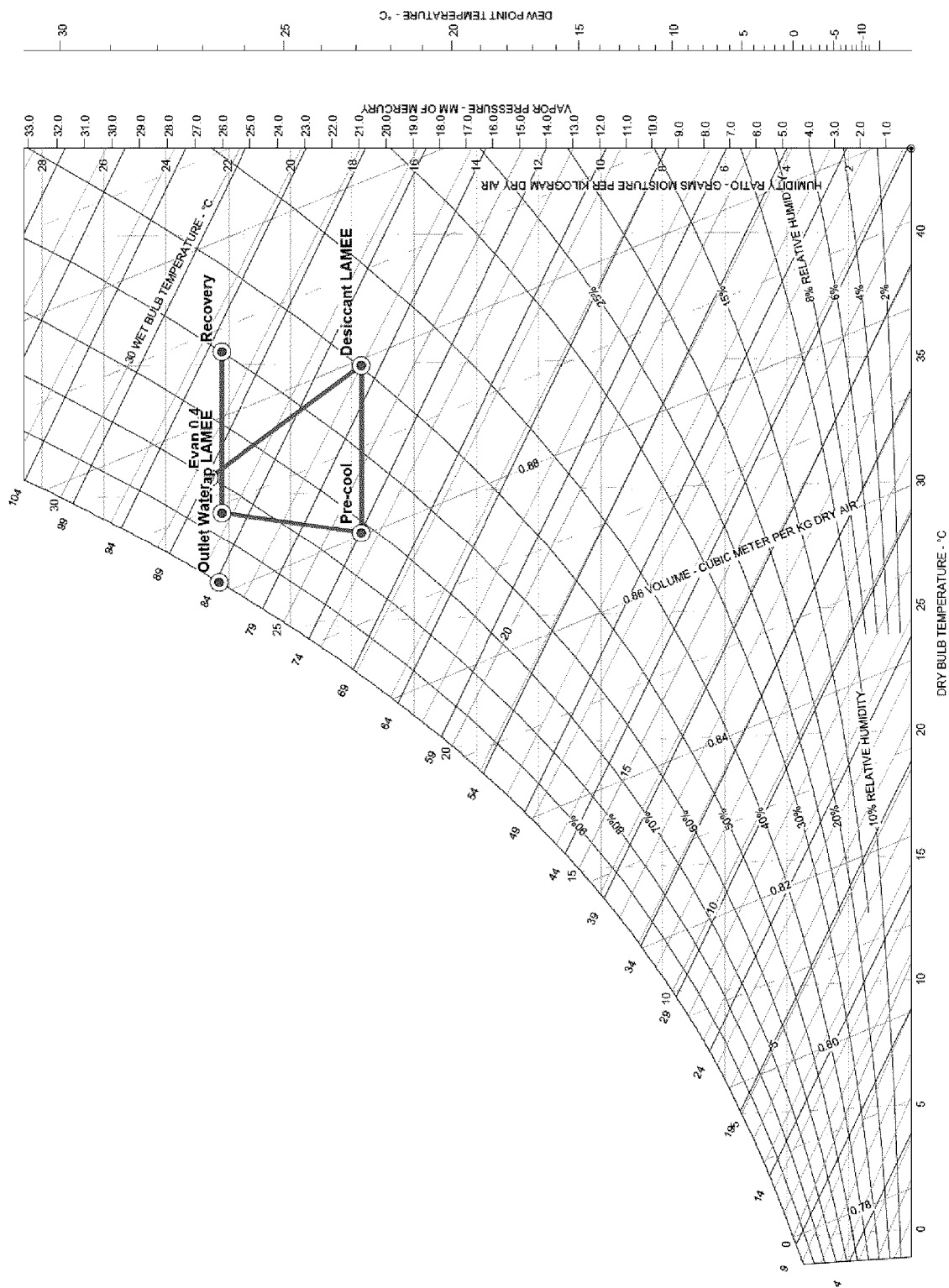
FIG. 5 is a psychometric process diagram for a theoretical system substantially similar to example system of FIG. 4.

FIG. 5 is a psychometric process diagram for a theoretical system substantially similar to example system 400 of FIG. 4. The psychometric process diagram illustrates the conditions of the example modeled system and, in particular, conditions of the working fluid(s) thereof at different components of the system and/or at different points during operation. The process diagram depicted in FIG. 5 was created using various numerical, analytical, algorithmic, etc. methods, tools, etc. to estimate the physical characteristics of a system in accordance with this disclosure when operated under certain initial conditions.

The example modeled system is operated at ambient conditions including outdoor air dry bulb temperature of approximately 30.7 degrees Celsius, outdoor air wet bulb temperature of 27.7 degrees Celsius and relative humidity of 80%. Additionally, the altitude of the modeled system is 16 meters, the barometric pressure is approximately 758.56 mm Hg, and the atmospheric pressure is approximately 101.133 kPa. The liquid desiccant employed in LAMEE1 is a lithium chloride solution with a salt concentration of approximately 32% and a target fluid inlet temperature of 35 degrees Celsius. The target set-point temperature for the process air supplied to the enclosed space from the outlet of the process plenum is 85 degrees Fahrenheit. The characteristic values associated with the process diagram of FIG. 5 are as follows:

| 1. Air Condition and Flow Rate at Scavenger Inlet 120 | | | | | | | | | | |
|---|---|---|---|---|---|---|---|---|---|---|
| Air Flow (Standard) (L/s) | Dry bulb (° C.) | Wet Bulb (° C.) | Relative Humidity (%) | Humidity Ratio (g/kg) | Specific Volume (cu · m/kg) | Enthalpy (kJ/kg) | Dew Point (° C.) | Density (kg/ cu · m) | Vapor Pressure (mm Hg) | Absolute Humidity (g/cu · m) |
| 14,159 | 30.667 | 27.722 | 80.0 | 22.60 | 0.893 | 88.549 | 26.822 | 1.1448 | 26.4790 | 25.300 |

| 2. Air Condition Leaving LAMEE1 108 | | | | | | | | | | |
|---|---|---|---|---|---|---|---|---|---|---|
| Air Flow (Standard) (L/s) | Dry bulb (° C.) | Wet Bulb (° C.) | Relative Humidity (%) | Humidity Ratio (g/kg) | Specific Volume (cu · m/kg) | Enthalpy (kJ/kg) | Dew Point (° C.) | Density (kg/ cu · m) | Vapor Pressure (mm Hg) | Absolute Humidity (g/cu · m) |
| 14,159 | 34.900 | 26.001 | 49.8 | 17.70 | 0.899 | 80.410 | 22.861 | 1.1322 | 20.9035 | 19.692 |

| Energy Change of Air across LAMEE1 108 | | | | | | |
|---|---|---|---|---|---|---|
| Start Point Name | Total Energy (W) | Sensible Energy (W) | Latent Energy (W) | Moisture Difference (kg/hr) | Sensible Heat Ratio | Enthalpy/Humidity Ratio (kJ/kg/g/kg) |
| Inlet 120 | −138,411 | 74,706 | −213,117 | −300.0 | −0.540 | N/A |

| 3. Air Condition Leaving Pre-cooler 402 | | | | | | | | | | |
|---|---|---|---|---|---|---|---|---|---|---|
| Air Flow (Standard) (L/s) | Dry bulb (° C.) | Wet Bulb (° C.) | Relative Humidity (%) | Humidity Ratio (g/kg) | Specific Volume (cu · m/kg) | Enthalpy (kJ/kg) | Dew Point (° C.) | Density (kg/ cu · m) | Vapor Pressure (mm Hg) | Absolute Humidity (g/cu · m) |
| 14,159 | 28.400 | 24.355 | 72.0 | 17.70 | 0.880 | 73.664 | 22.861 | 1.1566 | 20.9035 | 20.116 |

| Energy Chang of Air across Pre-cooler 402 | | | | | | | |
|---|---|---|---|---|---|---|---|
| Start Point Name | Total Cooling (kW) | Total Energy (W) | Sensible Energy (W) | Latent Energy (W) | Moisture Difference (kg/hr) | Sensible Heat Ratio | Enthalpy/Humidity Ratio (kJ/kg/g/kg) |
| LAMEE1 | −114.7 | −114,711 | −114,711 | 0 | 0.0 | 1.000 | N/A |

| 4. Air Condition Leaving LAMEE2 110 | | | | | | | | | | |
|---|---|---|---|---|---|---|---|---|---|---|
| Air Flow (Standard) (L/s) | Dry bulb (° C.) | Wet Bulb (° C.) | Relative Humidity (%) | Humidity Ratio (g/kg) | Specific Volume (cu · m/kg) | Enthalpy (kJ/kg) | Dew Point (° C.) | Density (kg/ cu · m) | Vapor Pressure (mm Hg) | Absolute Humidity (g/cu · m) |
| 14,159 | 29.300 | 27.190 | 85.1 | 22.20 | 0.889 | 86.098 | 26.533 | 1.1502 | 26.0326 | 24.980 |

| Energy Chang of Air across LAMEE2 110 | | | | | | |
|---|---|---|---|---|---|---|
| Start Point Name | Total Energy (W) | Sensible Energy (W) | Latent Energy (W) | Moisture Difference (kg/hr) | Sensible Heat Ratio | Enthalpy/Humidity Ratio (kJ/kg/g/kg) |
| Pre-cooler | 211,440 | 16,011 | 195,429 | 275.6 | 0.076 | N/A |

| 5. Air Condition Leaving Recovery Coil 202 | | | | | | | | | | |
|---|---|---|---|---|---|---|---|---|---|---|
| Air Flow (Standard) (L/s) | Dry bulb (° C.) | Wet Bulb (° C.) | Relative Humidity (%) | Humidity Ratio (g/kg) | Specific Volume (cu · m/kg) | Enthalpy (kJ/kg) | Dew Point (° C.) | Density (kg/ cu · m) | Vapor Pressure (mm Hg) | Absolute Humidity (g/cu · m) |

-continued

| | | | | | | | | | | |
|---|---|---|---|---|---|---|---|---|---|---|
| 14,159 | 35.500 | 28.600 | 60.0 | 22.20 | 0.907 | 92.583 | 26.533 | 1.1271 | 26.0326 | 24.479 |

Energy Chang of Air across Recovery Coil 202

| Start Point Name | Total Heating (kW) | Total Energy (W) | Sensible Energy (W) | Latent Energy (W) | Moisture Difference (kg/hr) | Sensible Heat Ratio | Enthalpy/Humidity Ratio (kJ/kg/g/kg) |
|---|---|---|---|---|---|---|---|
| LAMEE2 | 110.3 | 110,298 | 110,298 | 0 | 0.0 | 1.000 | N/A |

6. Fluid Outlet of LAMEE2 110
Temperature (° C.)

| |
|---|
| 26.600 |

Referring to the psychometric process diagram of FIG. 5, the scavenger air, which in this example is outdoor air, enters the conditioning system scavenger plenum via a scavenger inlet at a dry bulb temperature of 30.7 degrees Celsius, a wet bulb temperature of 27.7 degrees Celsius and has a relative humidity of 80%. After passing through LAMEE1, the enthalpy of the scavenger air has been markedly reduced and the scavenger air is at a dry bulb temperature of approximately 34.9 degrees Celsius, a wet bulb temperature of 26 degrees Celsius and has a relative humidity of 49.8%. After passing through the pre-cooler, the scavenger air has a dry bulb temperature of 28.4 degrees Celsius, a wet bulb temperature of 24.4 degrees Celsius and a relative humidity of 72%. After passing through LAMEE2, the scavenger air is at a dry bulb temperature of about 29.3 degrees Celsius, at a wet bulb temperature of 27.2 degrees Celsius, and has a relatively humidity of 85.1%.

Additionally, the process diagram of FIG. 5 illustrates that as the scavenger air passes through the recovery coil, the air sensibly cools the fluid flowing through the recovery coil and thus the scavenger air temperature is increased as the scavenger air is heated by the fluid being circulated through the recovery coil. Finally, the temperature of the cooling fluid supplied from the outlet of LAMEE2 in the scavenger plenum to the inlet of LAHX1 in the process plenum is approximately 26.6 degrees Celsius, which, in this example, is sufficient for LAHX1 to directly and sensibly cool the process air to a target set-point temperature for the enclosed space of approximately 30 degrees Celsius.

Figure 6:
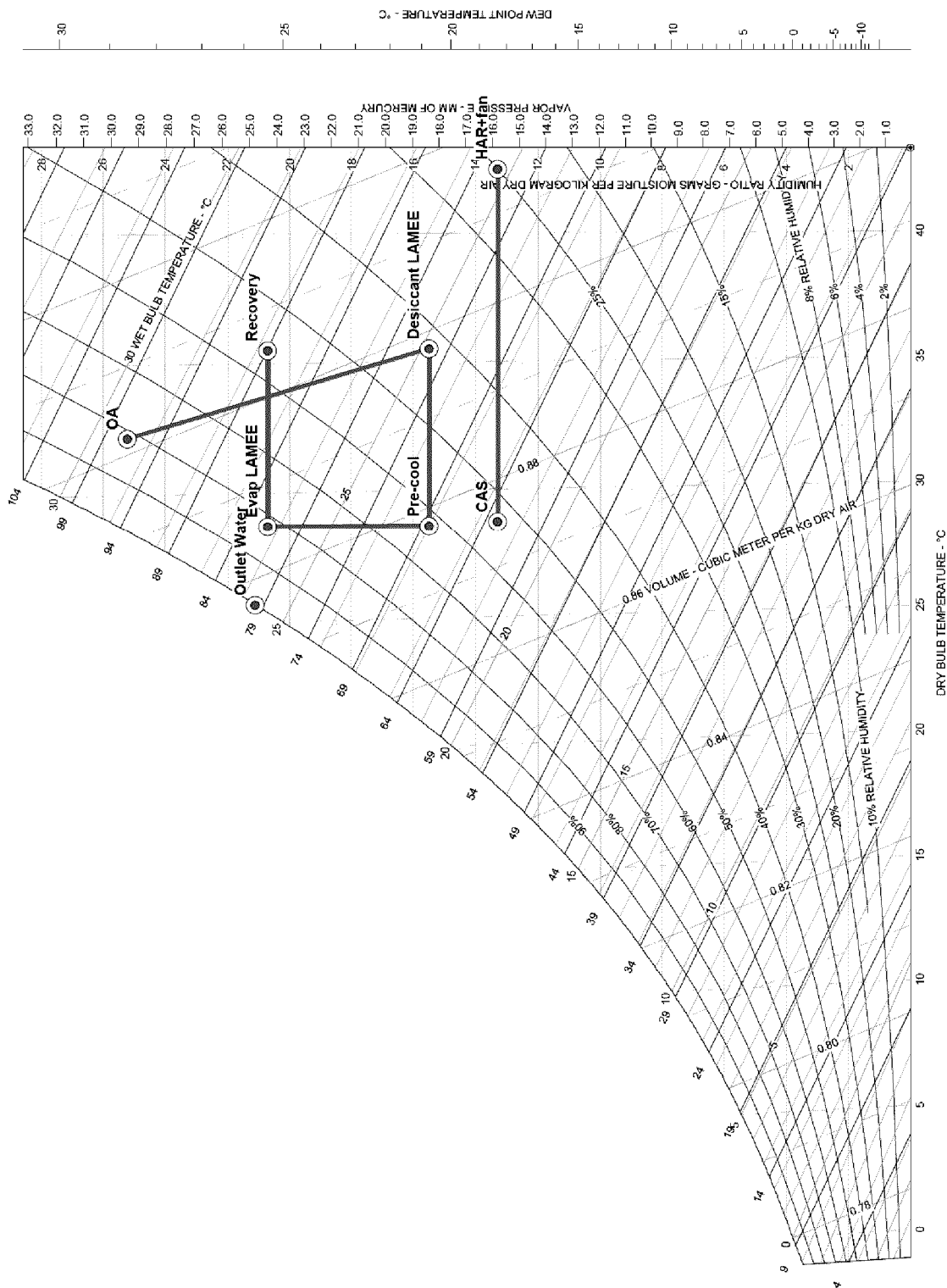
FIG. 6 is a psychometric process diagram for a theoretical system with the same components and arrangements thereof as the system modeled to produce the process diagram of FIG. 5, except the pre-cooler and the recovery coil have lower capacities/conditioning effectiveness, and a different outdoor air condition is evaluated.

FIG. 6 is a psychometric process diagram for a theoretical system with the same components and arrangements thereof as the system modeled to produce the process diagram of FIG. 5, except the pre-cooler and the recovery coil have lower capacities/conditioning effectiveness. The psychometric process diagram of FIG. 6 illustrates the conditions of the example modeled system and, in particular, conditions of the working fluid(s) thereof at different components of the system and/or at different points during operation. The process diagram depicted in FIG. 6 was created using various numerical, analytical, algorithmic, etc. methods, tools, etc. to estimate the physical characteristics of a system in accordance with this disclosure when operated under certain initial conditions.

The example modeled system is operated at ambient conditions including outdoor air dry bulb temperature of approximately 32.2 degrees Celsius, outdoor air wet bulb temperature of 29.4 degrees Celsius and relative humidity of 81.5%. Additionally, the altitude of the modeled system is 16 meters, the barometric pressure is approximately 758.56 mm Hg, and the atmospheric pressure is approximately 101.133 kPa. The liquid desiccant employed in LAMEE1 is a lithium chloride solution with a salt concentration of approximately 38% and a target fluid inlet temperature of approximately 33.9 degrees Celsius. The target set-point temperature for the process air supplied to the enclosed space from the outlet of the process plenum is approximately 28.7 degrees Celsius. The characteristic values associated with the process diagram of FIG. 6 are as follows:

1. Air Condition and Flow Rate at Scavenger Inlet 120

| Air Flow (Standard) (L/s) | Dry Bulb (° C.) | Wet Bulb (° C.) | Relative Humidity (%) | Humidity Ratio (g/kg) | Specific Volume (cu · m/kg) | Enthalpy (kJ/jg) | Dew Point (° C.) | Density (kg/ cu · m) | Vapor Pressure (mm Hg) | Absolute Humidity (g/cu · m) |
|---|---|---|---|---|---|---|---|---|---|---|
| 14,159 | 32.200 | 29.400 | 81.5 | 25.20 | 0.901 | 96.814 | 28.617 | 1.1373 | 29.4044 | 27.957 |

2. Air Condition Leaving LAMEE1 108

| Air Flow (Standard) (L/s) | Dry Bulb (° C.) | Wet Bulb (° C.) | Relative Humidity (%) | Humidity Ratio (g/kg) | Specific Volume (cu · m/kg) | Enthalpy (kJ/jg) | Dew Point (° C.) | Density (kg/ cu · m) | Vapor Pressure (mm Hg) | Absolute Humidity (g/cu · m) |
|---|---|---|---|---|---|---|---|---|---|---|
| 14.159 | 35.500 | 24.843 | 42.3 | 15.50 | 0.897 | 75.385 | 20.744 | 1.1315 | 18.3679 | 17.270 |

Energy Change of Air across LAMEE1 108

| Start Point Name | Total Energy (W) | Sensible Energy (W) | Energy (W) Latent | Moisture Difference (kg/hr) | Sensible Heat Ratio | Enthalpy/ Humidity Ratio (kJ/kg/g/kg) |
|---|---|---|---|---|---|---|
| Inlet 120 | −364,416 | 58,008 | −422,424 | −594.0 | −0.159 | N/A |

3. Air Condition Leaving Pre-cooler 402

| Air Flow (Standard) (L/s) | Dry Bulb (° C.) | Wet Bulb (° C.) | Relative Humidity (%) | Humidity Ratio (g/kg) | Specific Volume (cu · m/kg) | Enthalpy (kJ/jg) | Dew Point (° C.) | Density (kg/ cu · m) | Vapor Pressure (mm Hg) | Absolute Humidity (g/cu · m) |
|---|---|---|---|---|---|---|---|---|---|---|
| 14,159 | 28.600 | 23.009 | 62.5 | 15.50 | 0.877 | 68.253 | 20.744 | 1.1574 | 18.3679 | 17.665 |

Energy Change of Air across Pre-cooler 402

| Start Point Name | Total Cooling (kW) | Total Energy (W) | Sensible Energy (W) | Latent Energy (W) | Moisture Difference (kg/hr) | Sensible Heat Ratio | Enthalpy/ Humidity Ratio (kJ/kg/g/kg) |
|---|---|---|---|---|---|---|---|
| LAMEE1 | −121.3 | −121,290 | 121,290 | 0 | 0.0 | 1.000 | N/A |

4. Air Condition Leaving LAMEE2 110

| Air Flow (Standard) (L/s) | Dry Bulb (° C.) | Wet Bulb (° C.) | Relative Humidity (%) | Humidity Ratio (g/kg) | Specific Volume (cu · m/kg) | Enthalpy (kJ/jg) | Dew Point (° C.) | Density (kg/ cu · m) | Vapor Pressure (mm Hg) | Absolute Humidity (g/cu · m) |
|---|---|---|---|---|---|---|---|---|---|---|
| 14,159 | 28.700 | 26.210 | 82.3 | 20.70 | 0.885 | 81.638 | 25.389 | 1.1535 | 24.3278 | 23.393 |

Energy Change of Air across LAMEE2 110

| Start Point Name | Total Energy (W) | Sensible Energy (W) | Energy Latent (W) | Moisture Difference (kg/hr) | Sensible Heat Ratio | Enthalpy/ Humidity Ratio (kJ/kg/g/kg) |
|---|---|---|---|---|---|---|
| Pre-cooler | 227,637 | 1,774 | 225,863 | 318.4 | 0.008 | N/A |

5. Air Condition Leaving Recovery Coil 202

| Air Flow (Standard) (L/s) | Dry Bulb (° C.) | Wet Bulb (° C.) | Relative Humidity (%) | Humidity Ratio (g/kg) | Specific Volume (cu · m/kg) | Enthalpy (kJ/jg) | Dew Point (° C.) | Density (kg/ cu · m) | Vapor Pressure (mm Hg) | Absolute Humidity (g/cu · m) |
|---|---|---|---|---|---|---|---|---|---|---|
| 14,159 | 35.500 | 27.812 | 56.1 | 20.70 | 0.905 | 88.733 | 25.389 | 1.1281 | 24.3278 | 22.878 |

Energy Change of Air across Recovery Coil 202

| Start Point Name | Total Heating (kW) | Total Energy (W) | Sensible Energy (W) | Latent Energy (W) | Moisture Difference (kg/hr) | Sensible Heat Ratio | Enthalpy/ Humidity Ratio (kJ/kg/g/kg) |
|---|---|---|---|---|---|---|---|
| LAMEE2 | 120.6 | 120,650 | 120,650 | 0 | 0.0 | 1.000 | N/A |

6. Fluid Outlet of LAMEE2 110 Temperature (° C.)

| |
|---|
| 25.700 |

Referring to the psychometric process diagram of FIG. 6, the scavenger air, which in this example is outdoor air, enters the conditioning system scavenger plenum via a scavenger inlet at a dry bulb temperature of 32.2 degrees Celsius, a wet bulb temperature of 29.4 degrees Celsius and has a relative humidity of 81.5%. After passing through LAMEE1, the enthalpy of the scavenger air has been markedly reduced and the scavenger air is at a dry bulb temperature of approximately 35.5 degrees Celsius, a wet bulb temperature of 24.8 degrees Celsius and has a relative humidity of 42.3%. After passing through the pre-cooler, the scavenger air has a dry bulb temperature of 28.6 degrees Celsius, a wet bulb temperature of approximately 23 degrees Celsius and a relative humidity of 62.5%. After passing through LAMEE2, the scavenger air is at a dry bulb temperature of about 28.7 degrees Celsius, at a wet bulb temperature of 26.2 degrees Celsius, and has a relatively humidity of 82.3%.

Additionally, the process diagram of FIG. 6 illustrates that as the scavenger air passes through the recovery coil, the air sensibly cools the fluid flowing through the recovery coil and thus the scavenger air temperature is increased as the scavenger air is heated by the fluid being circulated through the recovery coil. Finally, the temperature of the cooling fluid supplied from the outlet of LAMEE2 in the scavenger plenum to the inlet of LAHX1 in the process plenum is approximately 25.7 degrees Celsius, which, in this example, is sufficient for LAHX1 to directly and sensibly cool the process air to a target set-point temperature for the enclosed space of approximately 28.7 degrees Celsius.

Referring again to FIG. 4, conditioning system 400 includes a liquid desiccant regeneration system, which is fluidically connected to LAMEE1 108 via second fluid circuit 214. The liquid desiccant regeneration system can take a number of different specific forms and is generally configured to regenerate diluted desiccant leaving LAMEE1 108 and, in some cases, to supply the water removed from the desiccant to other components, including, for example, LAMEE2 110. Thus, desiccant at a target concentration can be returned to LAMEE1 108 for use thereby/therein and water removed from the scavenger air by LAMEE1 can be supplied to a component that employs water to some useful effect(s) like replacing/supplying the water consumed in LAMEE2 110.

In general, example liquid desiccant regeneration systems can include thermally driven brine concentration systems. For example, a vacuum membrane distillation system could be employed, a byproduct of which is distilled water. In one example, a vacuum membrane distillation system from memsys GmbH of Germany. Liquid desiccant regeneration systems can be employed in any examples in accordance with this disclosure, both to reconstitute a liquid desiccant used in a dehumidifying LAMEE and also to extract water removed from the scavenger air for some useful effect elsewhere in the same or a different system.

Figure 7:
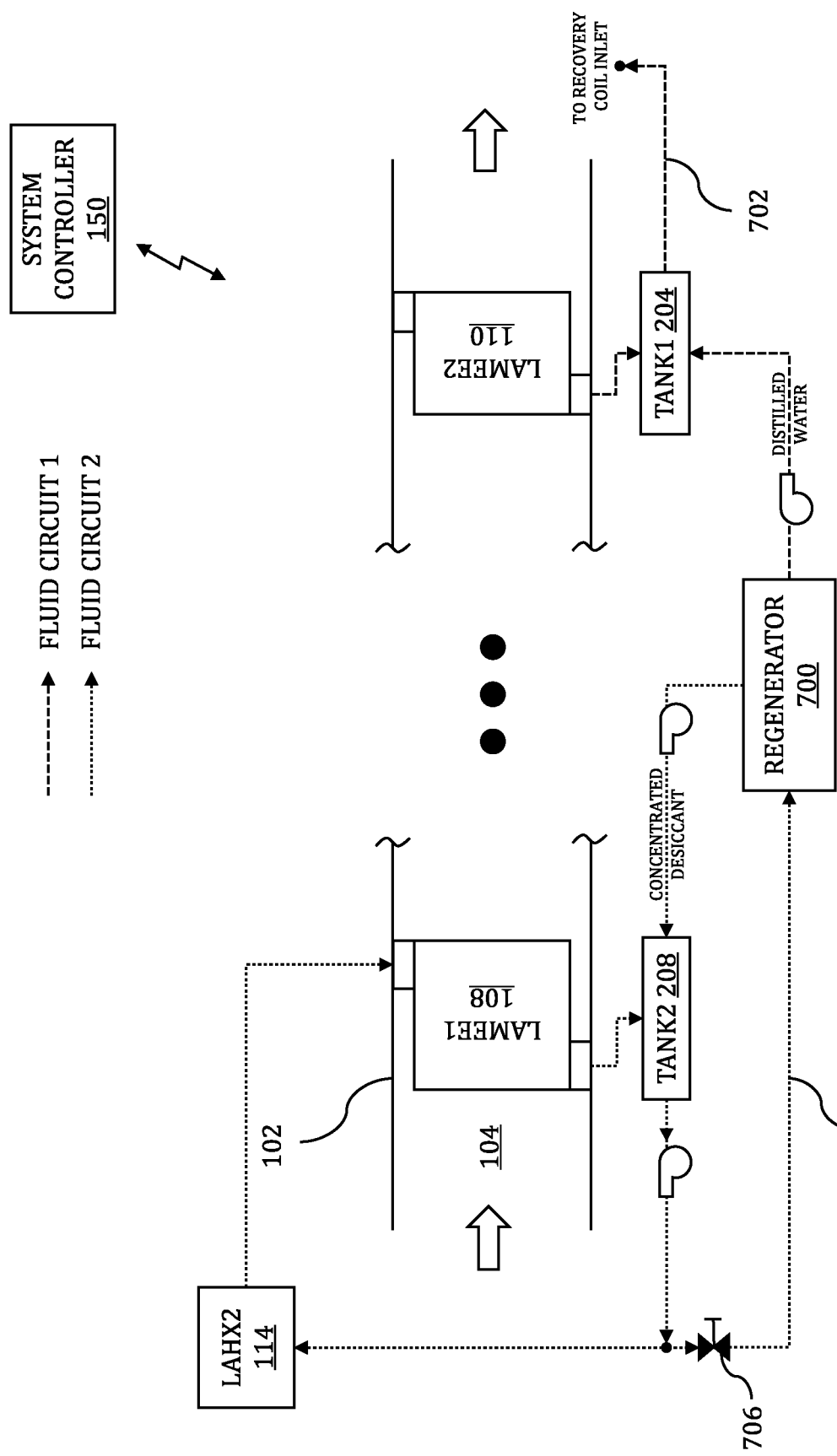
FIG. 7 depicts an example liquid desiccant regeneration system connected to a conditioning system in accordance with this disclosure.

FIG. 7 depicts an example liquid desiccant regeneration system connected to a conditioning system in accordance with this disclosure. The regeneration system including a desiccant regenerator 700 is fluidically coupled to LAMEE1 108 and LAMEE2 110. The system of FIG. 7 can thus be employed with and generally connected to any example conditioning systems in accordance with this disclosure, including the examples of FIGS. 1, 2, 4 and 9-13.

Regenerator 700 is generally configured to modulate and maintain the liquid desiccant flowing through LAMEE1 at a target relative concentration (for example, water to salt), including, for example, delivering a lithium chloride liquid desiccant to the fluid inlet of LAMEE1 at a concentration in a range from approximately 32% lithium chloride to approximately 38% lithium chloride. Additionally, regenerator 700 can extract water from the diluted desiccant flowing out of LAMEE1 and supply this water to LAMEE2. As noted above, the water collection rate/capacity of dryer LAMEE1 in examples according to this disclosure may exceed the evaporation rate of the evaporative cooler LAMEE2. As such, in at least some examples and operating conditions, the water removed from the scavenger air by LAMEE1 (in addition to markedly reducing the enthalpy of the scavenger air and thereby boosting the cooling capacity of LAMEE2) can be collected in quantities sufficient to completely supply the fluid necessary to drive operation of LAMEE2.

FIG. 7 depicts a portion of an example conditioning system including LAMEE1 108 and LAMEE2 110 disposed in scavenger plenum 104. The fluid tanks 204 and 208 and associated pumps are fluidically interconnected with LAMEE1 108 and LAMEE2 110 and regenerator 700 by one or more fluid circuits, including, for example, first and second fluid circuits 702 and 704. As explained above, LAMEE1 108 is configured to remove water from the scavenger air flowing through scavenger plenum 104. The water extracted from the scavenger air by LAMEE1 108 dilutes the liquid desiccant flowing through LAMEE1. In the example of FIG. 7, The diluted desiccant flows out of the fluid outlet of LAMEE1 108 and into tank 208, where the diluted desiccant intermixes with concentrated desiccant supplied by regenerator 700 and from which liquid desiccant flows to the fluid inlet of LAMEE1 108 and flows into regenerator 700 via modulating transfer valve 706.

In this example, valve 706 can be controlled to modulate the flow rate of desiccant out of tank 208 and thereby divert an amount of desiccant to regenerator 700 necessary to maintain the intermixed desiccant in tank 208 at a target or within a threshold range of desiccant concentration, including, for example, maintaining the desiccant in tank 208 at a concentration in a range from approximately 32% lithium chloride to approximately 38% lithium chloride. In one example, transfer valve 706 is controlled to deliver approximately 250 gallons per minute (gpm) to the fluid inlet of LAMEE1 108 and to deliver approximately 12 gpm to regenerator 700. As the humidity of the scavenger air flowing into LAMEE1 108 rises, the amount of desiccant diverted into regenerator 700 can be increased by controlling transfer valve 706. In some examples, transfer valve 706 can be controlled by system controller 150 described with reference to the examples of FIGS. 1, 2 and 4.

The dehumidification capacity of LAMEE1 108 can depend on a flow rate, a temperature, and a concentration of the liquid desiccant passing there through. In some cases, an example conditioning system in accordance with this disclosure can operate with a set point temperature and a set point concentration of the liquid desiccant flowing into LAMEE1 108. Additionally, in some examples, the flow rate of the desiccant through LAMEE1 108 can be constant. The load on the LAMEE1 108 can vary as the conditions of the air stream passing through scavenger plenum 104 vary. For example, if the air stream increases in humidity, the load on the LAMEE1 108 can increase. As a result, the liquid desiccant exiting LAMEE1 108 can require more regeneration, relative to if LAMEE1 receives a relatively lower humidity air stream. The regeneration system can therefore be configured such that as additional regeneration of the desiccant is required, the flow rate of liquid desiccant to regenerator 700 can be increased via the modulating valve 706. To achieve selective modulation of desiccant flow rate and concentration, for example intermixed in tank2 208, the regeneration system can be configured such that the flow of liquid desiccant to the LAHX2 114 can be relatively constant and the flow of liquid desiccant through the modulating valve 706 can be variable.

Regenerator 700 can be a thermally driven brine concentration device/system. In one example, regenerator 700 is a vacuum multi-effect membrane distillation device, which is configured to employ heat to distill the desiccant solution flowing there through. In one example, regenerator 700 can distill 3 liters of water per kW hr of heat input at approximately 80 degrees Celsius. It may be possible, in some cases, to use heat removed from the enclosed space to drive regenerator 700, including, for example, using heat removed from servers and other equipment in a data center to drive the regenerator. However, the heat input requirements to distill the liquid desiccant may be greater than can be typically removed from such equipment in a data center and, as such, in some cases, an additional heat/energy source may be needed to drive distillation of the desiccant by regenerator 700. Regenerator 700 can also include other types of devices, including, for example, electro dialysis, reverse osmosis (RO) filtration, a gas boiler with condenser, a vacuum assisted, multi-stage flash, or other membrane distillation devices other than a vacuum multi-effect membrane distillation device.

In operation, the desiccant exiting tank 208 can be transported to regenerator 700 via second fluid circuit 704. Regenerator 700 can separate water from the desiccant such that a concentrated desiccant supply can be transported back to tank 208 via second fluid circuit 704 and a supply of distilled water can be transported from regenerator to various components/locations via first fluid circuit 702.

In one example, the distilled water can be transported to tank 204 for evaporative cooler LAMEE2 110. Thus the water in the air stream passing through scavenger plenum 104 can be absorbed by the desiccant in the desiccant dryer LAMEE1 108, separated from the desiccant in regenerator 700, and then used as the cooling fluid for the evaporative cooler LAMEEs 110. This can result in a significant reduction or elimination of water for operation of an evaporative cooler LAMEE or other type of evaporative cooler.

Figure 8:
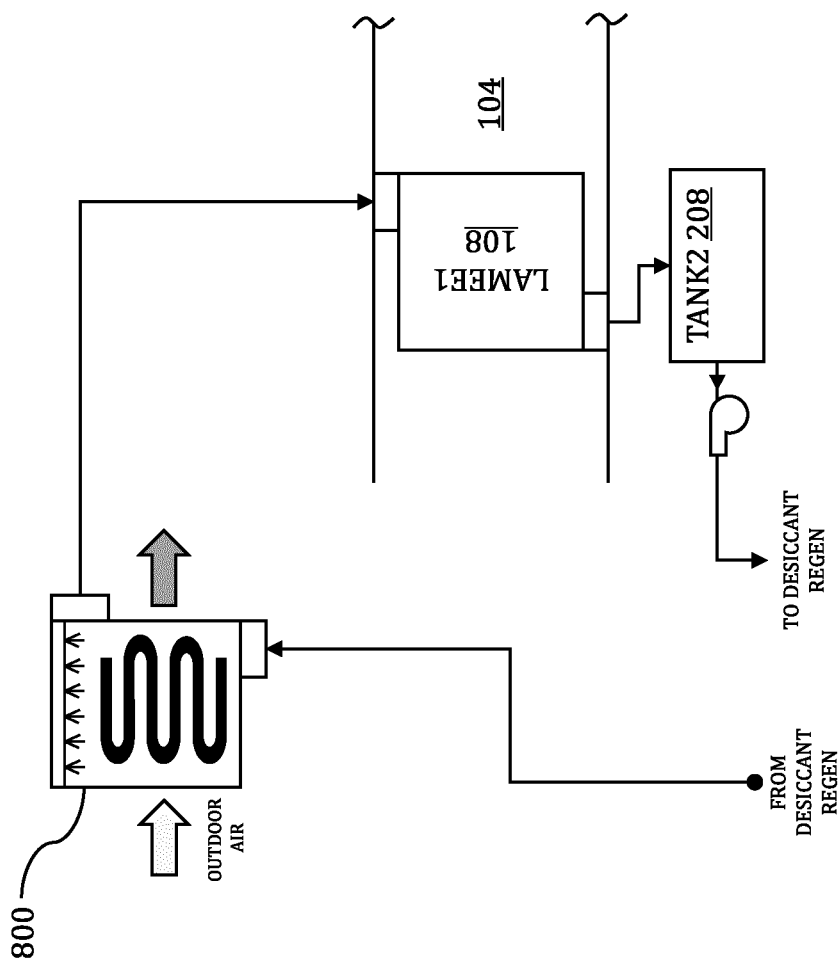
FIG. 8 depicts an example liquid-to-air heat exchanger configured to cool a liquid desiccant employed in a desiccant dryer liquid-to-air membrane energy exchanger.

As described above, one feature of example conditioning systems in accordance with this disclosure is the ability to sensibly cool the liquid desiccant employed in LAMEE1 108 using only outdoor air. FIG. 8 depicts an example LAHX 800 that cools the liquid desiccant employed in LAMEE1 108. LAHX 800 is fluidically connected to LAMEE1 108 by a fluid circuit 802 in a manner similar to LAHX2 114 of the examples of FIGS. 1, 2, 4 and 9-13.

As described above with reference to FIG. 7, after the liquid desiccant exits the LAMEE1 108, the liquid desiccant can be discharged into a tank 208, onto the regeneration system and from the regeneration system to LAHX 800. LAHX 800 can be configured to reduce a temperature of the desiccant prior to passing the desiccant into LAMEE1 108. LAHX 800 and regenerator 700, in combination, can thus decrease a temperature and increase a concentration of the liquid desiccant prior to circulating the desiccant through the desiccant dryer LAMEE1 108 in scavenger plenum 104. Both capabilities can be important in order for the desiccant to effectively remove moisture from the air stream passing through LAMEE1 108.

LAHX 800 can include any type of device suitable for cooling the liquid desiccant. In one example, LAHX 800 is configured to cool the liquid desiccant employed in LAMEE1 108 using outdoor air only. In one example, LAHX 800 is a polymer fluid cooler (with or without evaporative cooling capability), a plate exchanger, or other suitable heat exchangers. As schematically depicted, LAHX 800 can be located external to and separate from scavenger plenum 104 and/or other components of the conditioning system. In another example, however, LAHX 800 could be collocated in a common cabinet with other components of the system and outdoor air could be ducted through the LAHX.

The design of example regeneration systems in combination with desiccant dryer LAMEE1 108 can facilitate operation of conditioning systems in accordance with this disclosure with little to no external water consumption. LAMEE1 108 can remove the water from the air stream and use that water (which is separated from the desiccant for regeneration of the desiccant) as the cooling fluid for one or more coolers in the conditioning system. The recovered water can be stored in a tank and can be used as needed. Operation of evaporative coolers, like LAMEE2 110, can commonly require a significant amount of water. Example conditioning systems having such desiccant regeneration/water extraction can eliminate or markedly decrease the external water needed to operate the system, which, in turn, can decrease costs, complexity, and externalities of the system.

The design of example regeneration systems in combination with desiccant dryer LAMEE1 108 can also improve operation of evaporative cooler LAMEE2 110 (or other evaporative cooling device) since water can be collected directly from the atmosphere. Such water recovered from the liquid desiccant in the regenerator is often considered relatively high quality water, which can be ideal for many cooling applications, including evaporative coolers. Such high quality water can increase the lifespan of the media in LAMEE2 110 and can decrease required maintenance on the cooler. In contrast, if the water supplied to the LAMEE2 110 is potable water from wells or surface water sources, in some cases, mineral build up or scaling can occur, which may require the conditioning system or portions thereof to include management of mineral concentrations or other water treatment units.

Figure 9:
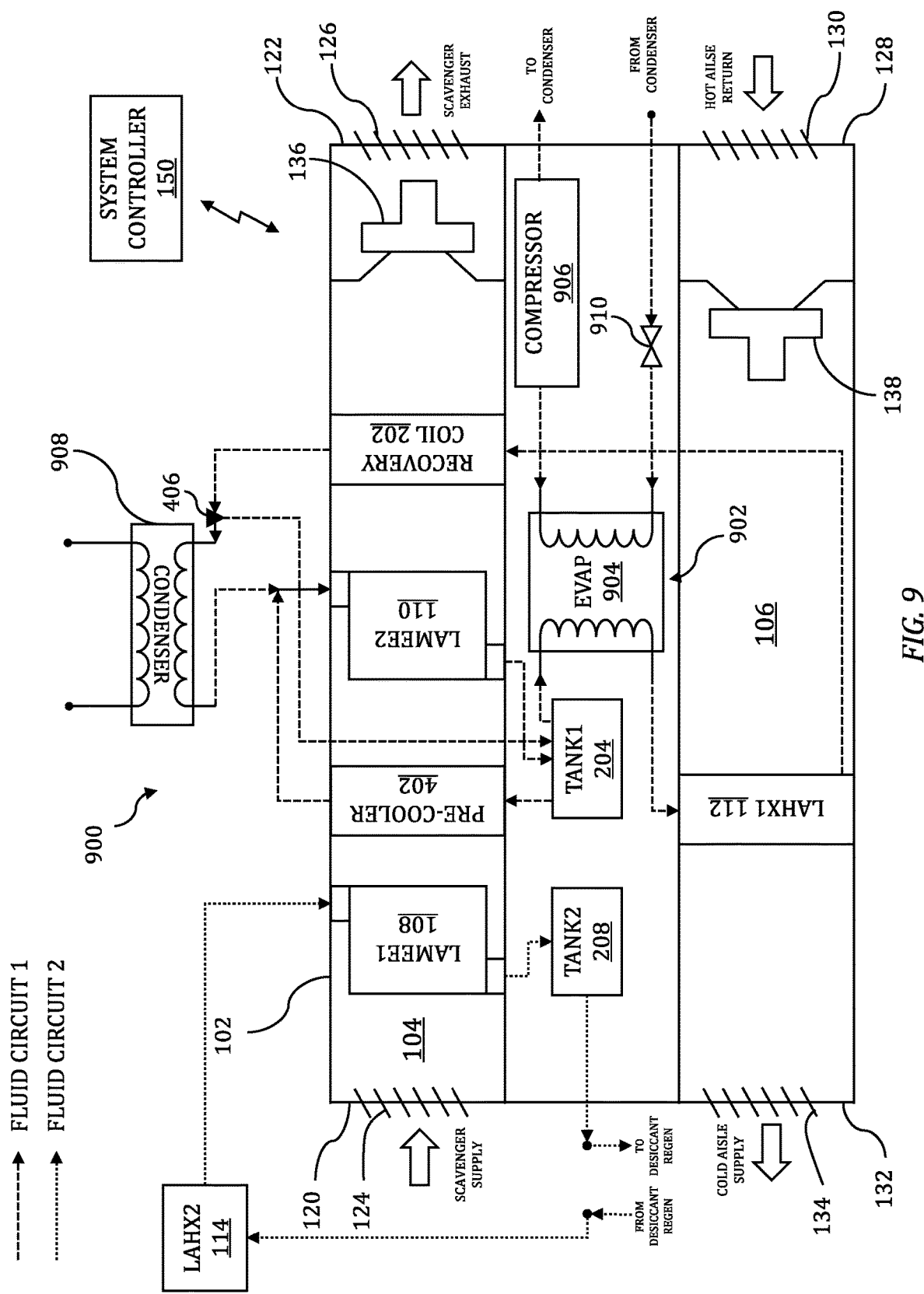
FIGS. 9 and 10 depict two other example conditioning systems.
Figure 10:
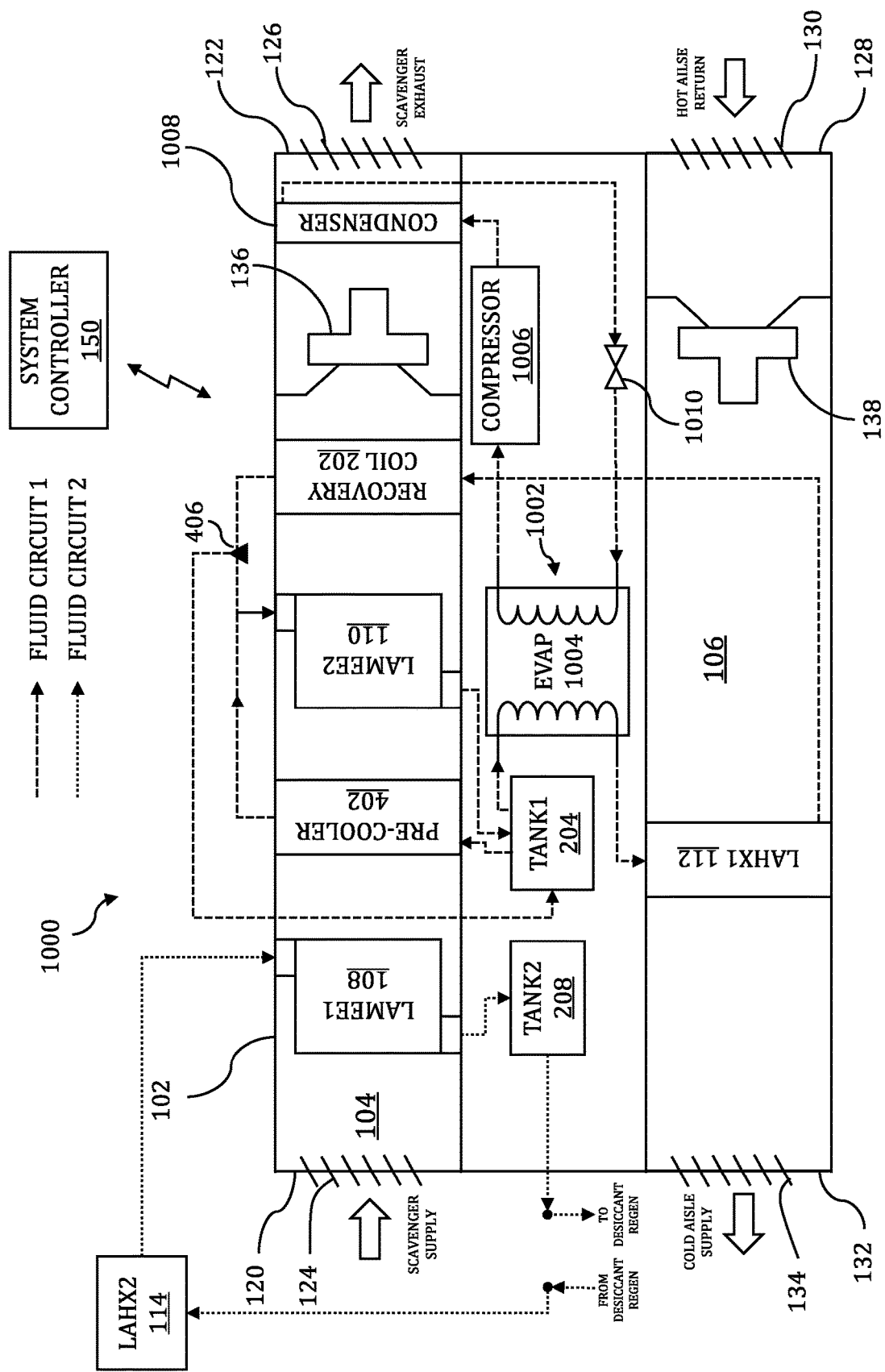

FIGS. 9 and 10 depict two other example conditioning systems 900 and 1000. Conditioning systems 900 and 1000 share many of the components and functions of example conditioning systems 100, 200 and 400 of FIGS. 1, 2 and 4, and each adds a mechanical cooling system to the fluid circuit to provide cooling to the water (or other fluid) stored in tank 204. The mechanical cooling system included in conditioning system 900 of FIG. 9 includes a water-cooled condenser, while the mechanical cooling system included in conditioning system 1000 of FIG. 10 includes an air-cooled condenser.

In FIG. 9, conditioning system 900 includes system cabinet 102, scavenger plenum 104, process plenum 106, LAMEE1 108, pre-cooler 402, LAMEE2 110, recovery coil 202, LAHX1 112, LAHX2 114, and DX unit 902. Scavenger plenum 104 includes inlet 120 and outlet 122 and associated and generally collocated dampers 124 and 126, respectively. Process plenum 106 includes inlet 128, with which is associated and collocated damper 130, and outlet 132, which is associated and collocated damper 134. Conditioning system 900 also includes scavenger fan 136, process fan 138, valve 406, system controller 150 and tanks 204 and 208. Pumps to facilitate transport of cooling fluid through system 900 have been omitted from FIG. 9, but the appropriate number and arrangement of such pumps could be included in this and other conditioning systems in accordance with this disclosure.

In FIG. 9, conditioning system 900 includes DX or direct expansion unit 902. A conditioning system having pre-cooler 402, as shown in FIG. 9, in combination with a DX unit 902 can be used, for example, in extreme outdoor air conditions. If the temperature in tank 204 is higher than a target set point temperature (to cover 100% of the load), DX unit 902 can cool the water to the target set point temperature. Thus, DX unit 902 can provide additional cooling of the water (or other fluid) leaving tank 204 so that the water can be sufficiently cool to cover the heating/cooling load for the enclosed space.

DX unit 902 includes evaporator 904, compressor 906, condenser 908 and expansion valve 910. DX unit 902 is configured to cool the water in tank 204 using, for example, a condensed refrigerant liquid. In operation, DX unit 902 cools the water or other fluid in tank 204 by passing the condensed refrigerant through one side of a first heat exchanger, evaporator 904, which cools the water flowing through the other side of evaporator 904. In evaporator 904, the refrigerant expands as it absorbs heat, eventually converting to a gas. DX unit 902 then pumps the refrigerant to compressor 906, which compresses the gas refrigerant and passes it through another heat exchanger, condenser 908. The heat that is absorbed by the refrigerant can be exhausted, and the cooled, compressed refrigerant is once again in liquid form. DX unit 902 then pumps (or otherwise transports) the cooled refrigerant liquid back to evaporator 904 through expansion valve 910 and the cycle begins again.

In the example of FIG. 9, condenser 908 is a water-cooled condenser. Condenser 908 is a heat exchanger through which flows the refrigerant of DX unit 902 and the water (or other fluid) of LAMEE2 110. The water is cooled in LAMEE2 110, as described with reference to other examples. The cooled water from LAMEE2 110 is transported by the fluid circuit of conditioning system 900 to and flows through condenser 908. The cooled water cools the compressed refrigerant flowing through the other side of compressor 908 and the cooled refrigerant flows back to evaporator 904 through expansion valve 910. The water exiting condenser 908 is conveyed to the inlet of LAMEE2

110, for example, after mixing with water from pre-cooler 402, which is also conveyed to the inlet of the LAMEE2 110.

As with at least some other examples in accordance with this disclosure, conditioning system 900 can be operated in multiple modes depending upon various factors, including the heat load from the enclosed space and/or the outdoor air (or incoming scavenger air) conditions. For example, system controller 150 can be configured to control elements of system 900 (and other example systems in accordance with this disclosure) to operate differently in different modes. System controller 150 can be configured to operate system 900 in an economizer mode and evaporation mode, as well as other modes. In the economizer mode, generally, there is sufficient cooling capacity in the outdoor air entering the system that LAMEE2 110 (or pre-cooler 402 with a slightly modified fluid circuit) can cool the water or other fluid with the scavenger air without cooling by LAMEE1 108 being required. In the evaporation mode, for example, pre-cooler 402, LAMEE1 108, LAMEE2 110 and recovery coil 202 may all be activated and used to cool the water flowing through the system using the scavenger air passing through scavenger plenum 104.

In one example, system controller 150 is configured to cause conditioning system 900 to operate in the evaporation mode. In this mode, for example, outdoor scavenger air is drawn into and through scavenger plenum 104 by fan 136. The outdoor air passes through LAMEE1 108, by which the enthalpy of the outdoor/scavenger air is reduced. The outdoor air passes through and is cooled by pre-cooler 402 using fluid delivered to the inlet of the pre-cooler by a fluid circuit from tank1 204. The cooled outdoor air then flows through and evaporatively cools the fluid flowing through LAMEE2 110. The cooling fluid is delivered to LAMEE2 110 by the fluid circuit from the outlet of water-side of condenser 908 and from the outlet of pre-cooler 402. The scavenger air passes LAMEE2 110 and flows through recovery coil 202. Recovery coil 202 receives fluid from the outlet of LAHX1 112 and the scavenger air cools the heated fluid received from LAHX1. Fan 136 then exhausts the scavenger air out of outlet 122 of scavenger plenum 104.

The water or other evaporative cooling fluid cooled by LAMEE2 110 is transported by the fluid circuit to tank1 204, which stores the water. As described above, DX unit 902 can be activated to cool the water or other fluid stored in tank1 204 to keep the fluid at a target set point temperature. From tank1 204, the water is transported to the inlet of pre-cooler 402 and to the inlet of the water-side of evaporator 904. The water is transported from the outlet of the water-side of evaporator 904 to LAHX1 112. LAHX1 112 cools the heated process air returned to process plenum 106 from the enclosed space using the water cooled by LAMEE2 110 and DX unit 902.

Still in the evaporation mode, the water flows from the outlet of LAHX1 112 in process plenum 106 to the inlet of recovery coil 202 in scavenger plenum 104. System controller 150 can, in the evaporation mode, activate or not activate valve 406 (depending upon the default state of the valve) to cause the water from the outlet of recovery coil 202 to flow into the water-side of condenser 908. The water exits condenser 908 and returns to the inlet of LAMEE2 110.

System controller 150 can also be configured to cause conditioning system 900 to operate in the economizer mode. For example, in the economizer mode, system controller 150 can cause pre-cooler 402, LAMEE1 108 and, in some cases, DX unit 902 to be deactivated and/or cause the scavenger air to bypass the pre-cooler 402 and the LAMEE1 108. In this mode, LAMEE2 110 cools the water using the scavenger air and transports the water to LAHX1 112 via valve 406, tank1 204, and the water-side of evaporator 904.

FIG. 10 depicts another example conditioning system 1000. The primary substantive difference between conditioning system 900 of FIG. 9 and conditioning system 1000 of FIG. 10 is that DX unit 902 of conditioning system 900 includes a water-cooled condenser 908, while DX unit 1002 of conditioning system 1000 includes an air-cooled condenser 1008. DX unit 1002 can be employed in system 1000 to maintain cooling fluid stored in tank 204 at a target set point temperature.

In FIG. 10, DX unit 1002 includes evaporator 1004, compressor 1006, air-cooled condenser 1008, and expansion valve 1010. Air-cooled condenser 1008 is arranged in scavenger plenum 104 downstream of recovery coil 202 and, in some examples, downstream of fan 136, close to outlet 122 of scavenger plenum 104. Compressed refrigerant is transported by the fluid circuit of DX unit 1002 from compressor 1006 to condenser 1008. The scavenger air flowing through scavenger plenum 104 passes through and cools the refrigerant flowing through condenser 1008.

Although the condenser 1008 is shown inside the plenum 104 in FIG. 10, the condenser 1008 can be located outside of the plenum 104 and outside of the cabinet 102. The condenser 1008 can be located external to the cabinet 102 and can be used, for example, in climates typically having mild outdoor air conditions. Condenser 1008 can use outdoor air, which in some cases can be at a lower temperature than scavenger air passing through the condenser in plenum 104 as shown in FIG. 10. If condenser 1008 is located external to cabinet 102, it is recognized that additional components may be included with the condenser, for example, one or more fans.

Conditioning systems 900 and 1000 can include multiple cooling fluids and associated cooling fluid circuits. For example, the refrigerant flowing through DX unit 1002 can be a first cooling fluid and the conduits and other components for conveying the refrigerant can be a first or a first portion of a fluid circuit. The second cooling fluid flowing through pre-cooler 402, LAMEE2 110, LAHX1 112 and recovery coil 202 can be water or predominantly water. A separate or a portion of a larger fluid cooling circuit (for example, conduits, valves, pumps, filters, etcetera) can be employed to transport the water among the various components in conditioning systems 900 and 1000. The two cooling fluid circuits or two portions of one circuit can be fluidically isolated from one another such that the first and second cooling fluids do not intermix.

Figure 11:
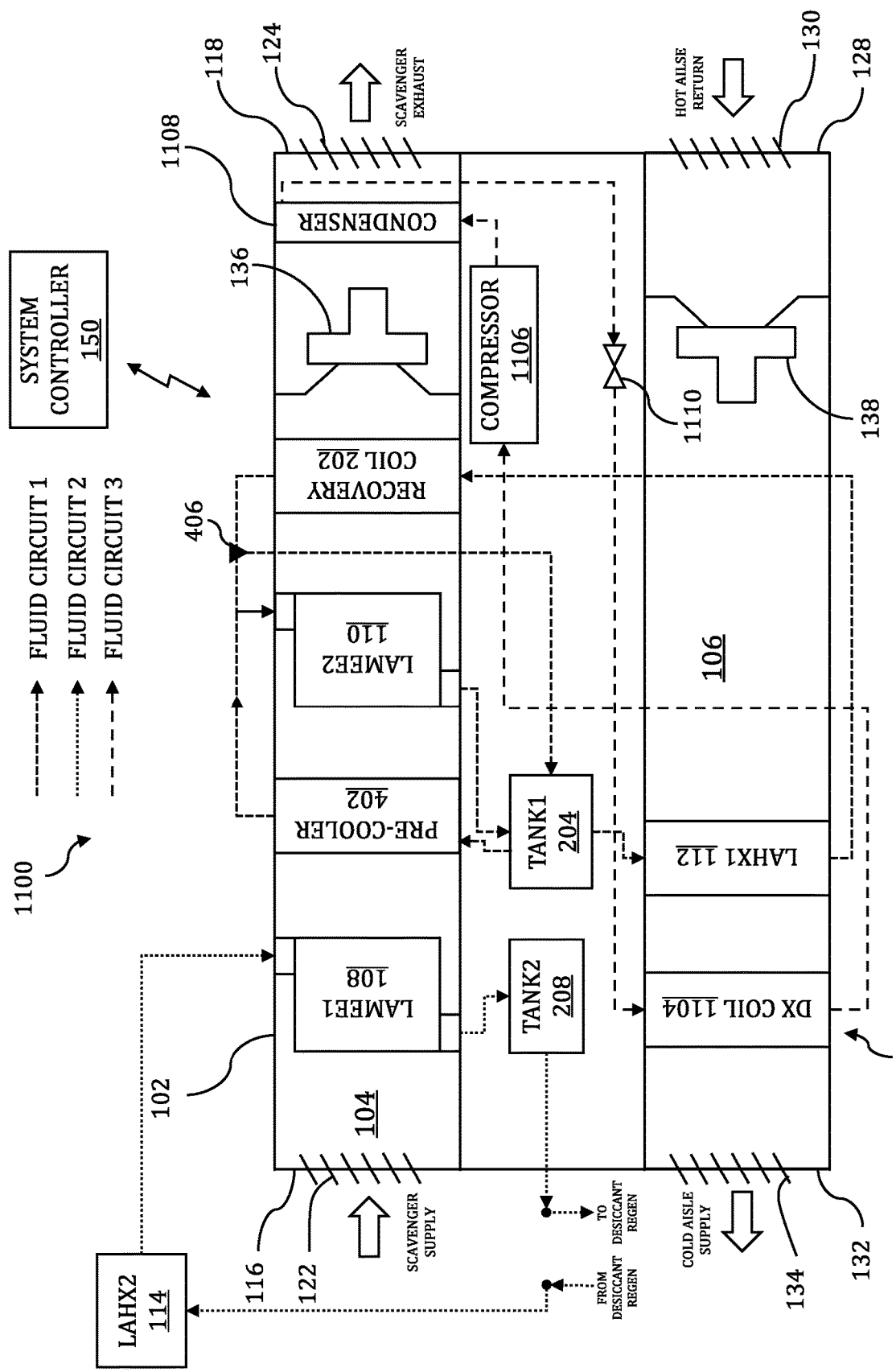
FIG. 11 depicts another example conditioning system.

FIG. 11 depicts another example conditioning system 1100. Conditioning system 1100 shares many of the components and functions of example conditioning systems 900 and 1000 of FIGS. 9 and 10, except that system 1100 employs a mechanical cooling system 1102 to supplement cooling of the process air flowing through process plenum 106. Mechanical cooling system 1102 includes an air-cooled condenser 1108, but, in another example, a water-cooled condenser could be employed in conditioning system 1100.

Mechanical cooling of the process air can function to provide needed cooling in certain outdoor or other conditions. Additionally, if the water cooling system or components thereof, for example, pre-cooler 402, LAMEE2 110, LAHX1 112, and/or recovery coil 202, malfunction or go offline for some reason, mechanical cooling system 1102 may be employed to provide some or all the required cooling of the heated process air received from the enclosed space to the target supply air temperature.

In FIG. 11, conditioning system 1100 includes system cabinet 102, scavenger plenum 104, process plenum 106, LAMEE1 108, pre-cooler 402, LAMEE2 110, recovery coil 202, LAHX1 112, LAHX2 114, and mechanical cooling system 1102. Scavenger plenum 104 includes inlet 120 and outlet 122 and associated and generally collocated dampers 122 and 124, respectively. Process plenum 106 includes inlet 128, with which is associated and collocated damper 130, and outlet 132, which is associated and collocated damper 134. Conditioning system 1100 also includes scavenger fan 136, process fan 138, valve 406, system controller 150 and tank1 204 and tank2 208. Pumps to facilitate transport of cooling fluid through system 1100 have been omitted from FIG. 11, but the appropriate number and arrangement of such pumps could be included in this and other conditioning systems in accordance with this disclosure.

Conditioning system 1100 includes DX unit 1102 (or some other similar mechanical cooling system). DX unit 1102 includes DX coil 1104, compressor 1106, condenser 1108 and expansion valve 1110. DX coil 1104 is arranged downstream of LAHX1 110 in process plenum 106. DX unit 1102 is configured to cool the process air flowing through process plenum 106 using, for example, a condensed refrigerant liquid. In operation, DX unit 1102 cools the process air by passing the condensed refrigerant through the coil, which cools the process air and causes the refrigerant to expand as it absorbs heat, eventually converting to a gas. DX unit 1102 then pumps the refrigerant to compressor 1106, which compresses the gas refrigerant and passes it through another heat exchanger, condenser 1108 arranged in scavenger plenum 104. The scavenger air cools the refrigerant flowing through condenser 1108, after which the cooled, compressed refrigerant is once again in liquid form. DX unit 1102 then pumps (or otherwise transports) the cooled refrigerant liquid back to DX coil 1104 through expansion valve 1110 and the cycle begins again.

As with at least some other examples in accordance with this disclosure, conditioning system 1100 can be operated in multiple modes depending upon various factors, including the heat load from the enclosed space and/or the outdoor air (or incoming scavenger air) conditions. For example, system controller 150 can be configured to control elements of system 1100 (and other example systems in accordance with this disclosure) to operate differently in different modes. System controller 150 can be configured to operate system 1100 in an economizer mode and evaporation mode, as well as other modes. For example, in the economizer mode, generally, there is sufficient cooling capacity in the outdoor air entering the system that LAMEE2 110 can cool the water or other fluid with the scavenger air without conditioning by LAMEE1 108 being required. In this mode, for example, system controller 150 can cause LAMEE1 108, pre-cooler 402, and, in some cases, DX unit 1102 to be deactivated and/or cause the scavenger air to bypass the pre-cooler and LAMEE1. In this mode, as described with reference to other examples in accordance with this disclosure, LAMEE2 110 cools the water using the scavenger air and transports the water to LAHX1 112 via valve 406 and tank 204. In the evaporation mode, for example, LAMEE1 108, pre-cooler 402, LAMEE2 110 and recovery coil 202 may all be activated and used to cool the water (or other heat transfer fluid) flowing to and employed by LAHX1 112 to cool the process air. Additionally, in an evaporation plus DX mode, DX unit 1102 may be activated and used to provide supplemental cooling to the process air cooled by LAHX1 112.

In one example, system controller 150 is configured to cause conditioning system 1100 to operate in the evaporation mode. In this mode, for example, outdoor scavenger air is drawn into and through scavenger plenum 104 by fan 136. The outdoor air passes through LAMEE1 108, by which the enthalpy of the outdoor/scavenger air is reduced. The outdoor air then passes through and is cooled by pre-cooler 402 using fluid delivered to the inlet of the pre-cooler by a fluid circuit from tank1 204. The cooled outdoor air then flows through and evaporatively cools the fluid flowing through LAMEE2 110. The scavenger air passes LAMEE2 110 and flows through recovery coil 202. Recovery coil 202 receives fluid from the outlet of LAHX1 112 and the scavenger air cools the heated fluid received from LAHX1 112. Fan 136 then exhausts the scavenger air out of outlet 122 of scavenger plenum 104.

The water or other evaporative cooling fluid cooled by LAMEE1 108 is transported by the fluid circuit to tank1 204, which stores the water. From tank1 204, the water is transported to the inlet of pre-cooler 402 and to the inlet of LAHX1 112. LAHX1 112 directly and sensibly cools the heated process air returned to process plenum 106 from the enclosed space using the water cooled by LAMEE2 110.

Still in the evaporation mode, the water flows from the outlet of LAHX1 112 in process plenum 106 to the inlet of recovery coil 202 in scavenger plenum 104. System controller 150 can, in the evaporation mode, activate or not activate valve 406 (depending upon the default state of the valve) to cause the water from the outlet of recovery coil 202 to flow into tank 204.

In the evaporation plus DX mode, system controller 150 activates DX unit 1102. In this mode, LAHX1 112 cools the process air using the cooled water or other fluid from tank 204. Additionally, the process air passes LAHX1 112 and is cooled further by DX coil 1104 arranged in process plenum 106 downstream of LAHX1 112. In this case, DX coil 1104 may cool the process air to the target supply temperature before the air is supplied to the enclosed space.

System controller 150 can also be configured to cause conditioning system 1100 to operate in the economizer mode. For example, in the economizer mode, system controller 150 can cause LAMEE1 108, pre-cooler 402, and, in some cases, DX unit 1102 to be deactivated and/or cause the scavenger air to bypass the pre-cooler and LAMEE1. In this mode, as described with reference to other examples in accordance with this disclosure, LAMEE2 110 cools the water using the scavenger air and transports the water to LAHX1 112 via valve 406 and tank 204.

Figure 12:
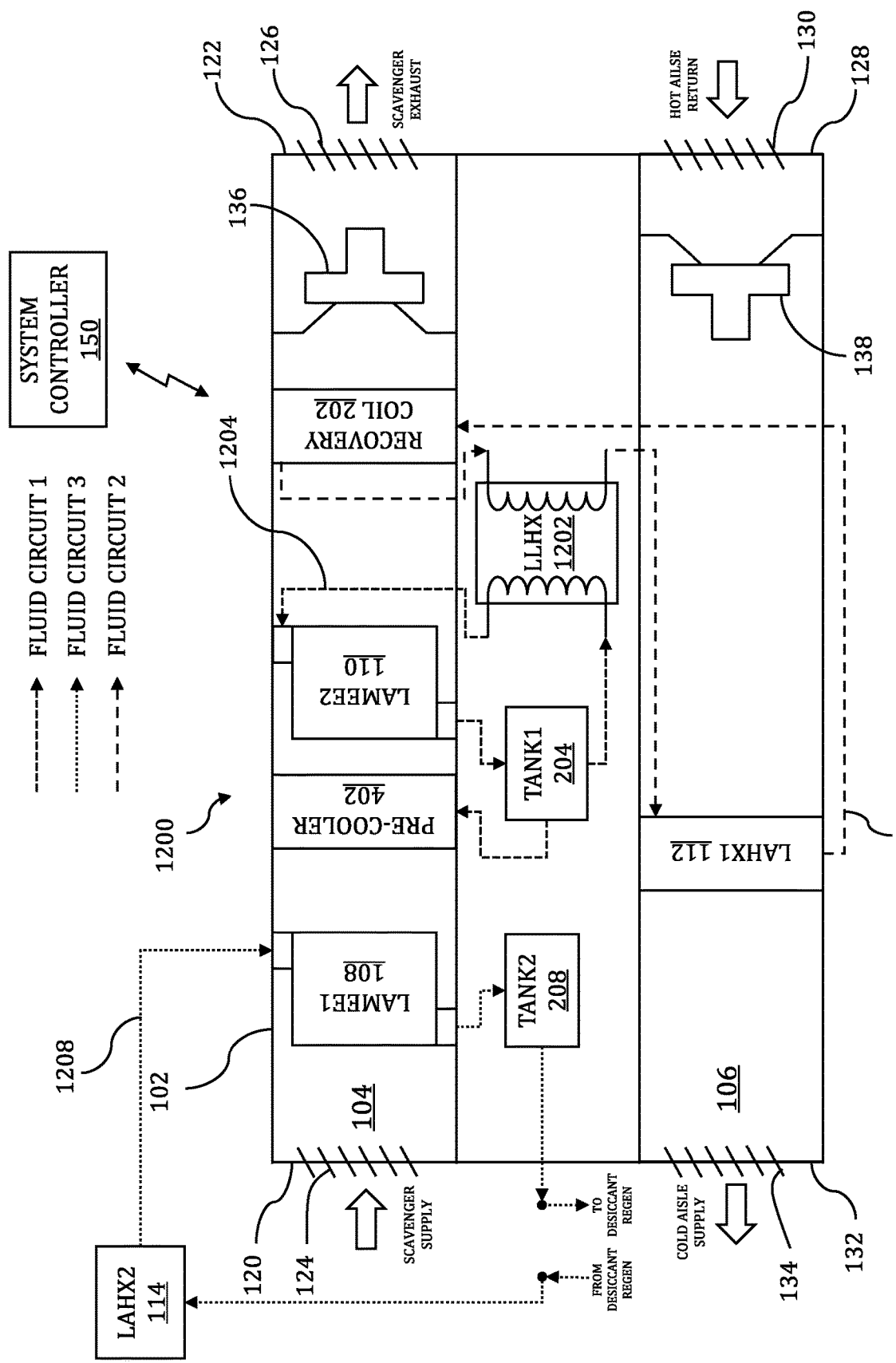
FIG. 12 depicts another example conditioning system.

FIG. 12 depicts another example conditioning system 1200 including a liquid-to-liquid heat exchanger (LLHX) 1202. Conditioning system 1200 has many components and functions in common with the above-described examples. For example, in FIG. 12, conditioning system 1200 includes system cabinet 102, scavenger plenum 104, process plenum 106, LAMEE1 108, LAMEE2 110, LAHX1 112 and LAHX2 114. Scavenger plenum 104 includes inlet 120, outlet 122 and associated and generally collocated therewith are dampers 124 and 126, respectively. Process plenum 106 includes inlet 128, with which is associated and collocated damper 130, and outlet 132, which is associated and collocated damper 134. Conditioning system 1200 also includes scavenger fan 136, process fan 138, system controller 150 and tanks 204 and 208. Pumps to facilitate transport of cooling fluids through system 1200 have been omitted from FIG. 12, but the appropriate number and arrangement of such pumps could be included in this and other conditioning systems in accordance with this disclosure.

In the example of FIG. 12, conditioning system LLHX 1202, which is configured and arranged to use the water or other first cooling fluid coming from LAMEE2 110, via a first fluid circuit 1204 and tank1 204, to cool a second cooling fluid flowing through the LLHX 1202, LAHX1 112 and recovery coil 202 via second fluid circuit 1206. Employing LLHX 1202 in conditioning system 1200 can have a number of advantages, including, for example, reducing the risk of freezing in the fluid circuit 1206 in a winter/economizer mode, because the second cooling fluid can be glycol or another fluid with anti-freeze properties.

Water cooled by LAMEE2 110 is transported via fluid circuit 1204 from the outlet of LAMEE2 to tank1 204. The cooled water leaves tank 204 and enters the first side of LLHX 1202 (for example, the water side of the LLHX). The second fluid can enter the LLHX 1202 through an input line of fluid circuit 1206 and exit and be transported via another portion of circuit 1206 to LAHX1 112. The coolant can be any suitable heat transfer fluid, and, in some cases, can include anti-freeze to minimize the risk of the coolant freezing in the winter. The cooled water flowing through the water side of LLHX 1202 cools the second cooling fluid flowing through the second side of the LLHX. The cooled second cooling fluid is then transported to LAHX1 112, which uses the second cooling fluid to cool the heated process air received in process plenum 106 from the enclosed space. LAHX1 112, as described with other examples, can be configured to cool the process air to a target supply air temperature.

After being used to cool the process air, the higher-temperature (also referred to as heated) coolant can be transported via fluid circuit 1206 from an outlet of LAHX 112 in process plenum 106 to the inlet of recovery coil 202 in scavenger plenum 104. The scavenger air flowing through scavenger plenum 106 cools the heated second cooling fluid, after which the second cooling fluid recirculates back to the second side of LLHX 1202.

LLHX 1202 can be located physically in system cabinet 102, but outside of plenums 104 and 106. In some examples, LLHX 1202 may be located in either scavenger plenum 104 or process plenum 106. Additionally, LLHX 1202 can be located separate from system cabinet 102 and plenums 104 and 106, in which case pumps or other mechanisms may be employed to transport cooling fluids among the LLHX and the other components of conditioning system 1200.

Although not shown in the example of FIG. 12, conditioning system 1200 could also include a mechanical cooling system like a DX unit to provide cooling to the water or other cooling fluid stored in tank1 204 or to the second cooling fluid circulating between the LLHX 1202, LAHX1 112, and recovery coil 202. Such a DX unit can be coupled to and function in concert with conditioning system 1200 in a manner similar to that described with reference to conditioning system 1100 of FIG. 11. Additionally, in examples according to this disclosure, conditioning system 1200 may be configured with LLHX, with or without an additional mechanical cooling system, and without pre-cooler 402.

System controller 150 can be configured to control operation of conditioning system 1200 in multiple modes. A first or evaporation mode is described above, in which all of the components of conditioning system are active and providing cooling.

Additionally, system controller 150 can operate conditioning system 1200 in an economizer mode. In the economizer mode, for example, system controller 150 can cause LAMEE1 108, pre-cooler 402 and/or LAMEE2 110 to be deactivated and/or bypassed from air and/or fluid flow. In this mode, LLHX 1202 is generally inactive and the second cooling fluid is circulated via second fluid circuit 1206 in a run-around loop between LAHX1 112 and recovery coil 202. Recovery coil 202 cools the second cooling fluid using the scavenger air and transports the cooled second fluid to LAHX1 112, which uses the cooled second fluid to cool the heated process air received from the enclosed space.

Conditioning system 1200 includes multiple cooling fluids and associated cooling fluid circuits 1204 and 1206. The first cooling fluid, for example, water or predominantly water flows through LAMEE2 110, pre-cooler 402 and LLHX 1202 (at least in evaporation mode in which the LAMEE is activated to provide evaporative cooling). The second cooling fluid, for example, glycol flows through LAHX1 112, recovery coil 202 and LLHX 1202, the second cooling fluid being used in both the evaporation and the economizer modes of operation.

Figure 13:
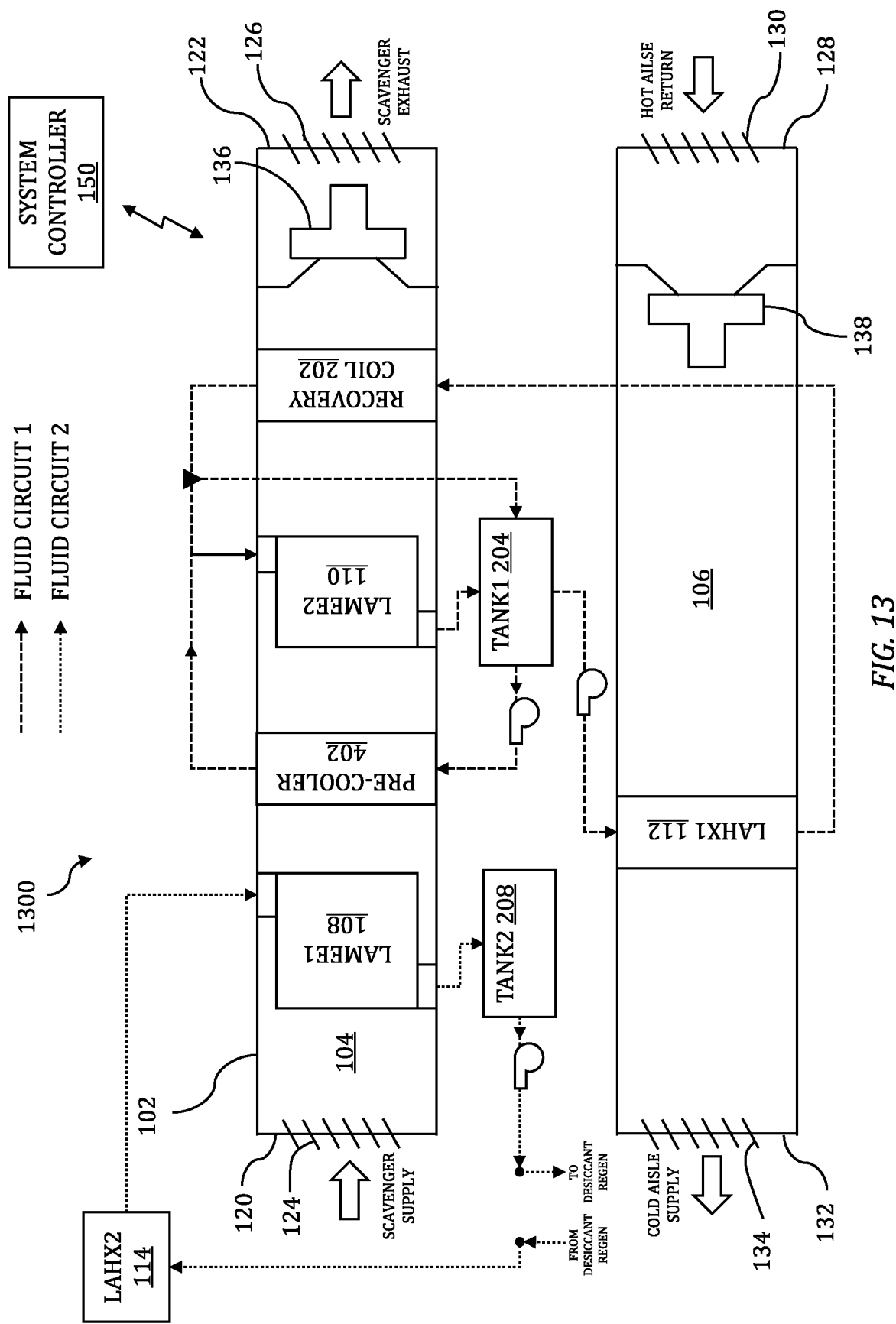
FIG. 13 depicts another example conditioning system.

FIG. 13 depicts another example conditioning system 1300 in accordance with this disclosure. In some examples, the scavenger air circuit and the process air circuit, instead of being commonly housed/packaged and collocated, may be separated by some distance. Example conditioning system 1300 of FIG. 13 is substantially the same as conditioning system 400 of FIG. 4, except that conditioning system 1300 does not include a system cabinet 102 housing the scavenger and process air circuits (and, in some cases, the fluid circuit(s)). In the example of FIG. 13, instead, scavenger plenum 104 and the associated components and process plenum 106 and the associated components are separately located and separated from one another by some distance. Although this example, in terms of componentry and functionality, is modeled after the example of FIG. 4, other example conditioning systems in accordance with this disclosure could also be so arranged and configured. For example, any of conditioning systems 100, 200, 900, 1000, 1100, and 1200 could also include scavenger and process air circuits (for example, plenum, cooling components, fluid circuits or portions thereof, etcetera) that are separate and located at a distance from one another.

Figure 14:
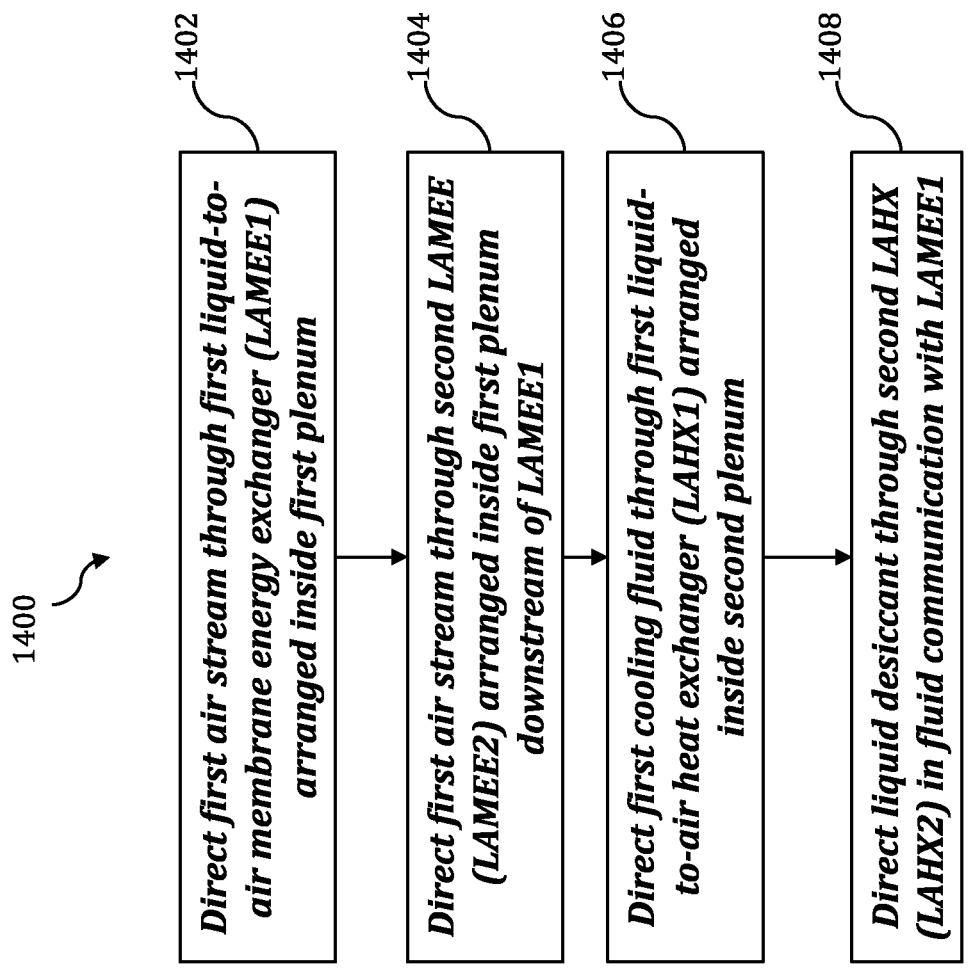
FIG. 14 is a flowchart depicting a method of operating a conditioning system in accordance with this disclosure.

FIG. 14 is a flowchart depicting an example method 1400 of operating a conditioning system in accordance with this disclosure. In FIG. 14, method 1400 includes directing a first air stream through a first liquid-to-air membrane energy exchanger (LAMEE1) arranged inside a first plenum (1402), directing the first air stream through a second LAMEE (LAMEE2) arranged inside the first plenum downstream of LAMEE1 (1404), directing a first cooling fluid through a first liquid-to-air heat exchanger (LAHX1) arranged inside a second plenum (1406), and directing the liquid desiccant through a second LAHX (LAHX2) in fluid communication with LAMEE1 (1408).

In the example method of FIG. 14, LAMEE1 configured to use a liquid desiccant to lower an enthalpy of the first air stream flowing through the first plenum. LAMEE2 is configured to use the first air stream to evaporatively cool water flowing through LAMEE2. The second plenum is configured to direct a second air stream from a second inlet to a second outlet. Additionally, the second inlet receives heated air from an enclosed space (being conditioned in whole or in part by the system) and the second outlet supplies cooled air to the space. LAHX1 is configured to directly and sensibly cool the second air stream using the first cooling fluid. LAHX2 is configured to cool the liquid desiccant using outdoor air.

Example method 1400 of FIG. 14 illustrates generally the manner in which examples according to this disclosure function to condition the air in an enclosed space. The functions of the method of FIG. 14 can be carried out by a variety of conditioning systems in accordance with this disclosure. For example, the functions of method 1400 can be carried out by conditioning system 100, 200, 400, 900, 1000, 1100, 1200 and/or 1300, the components and functions of which are described above with reference to FIGS. 1-13.

Figure 15:
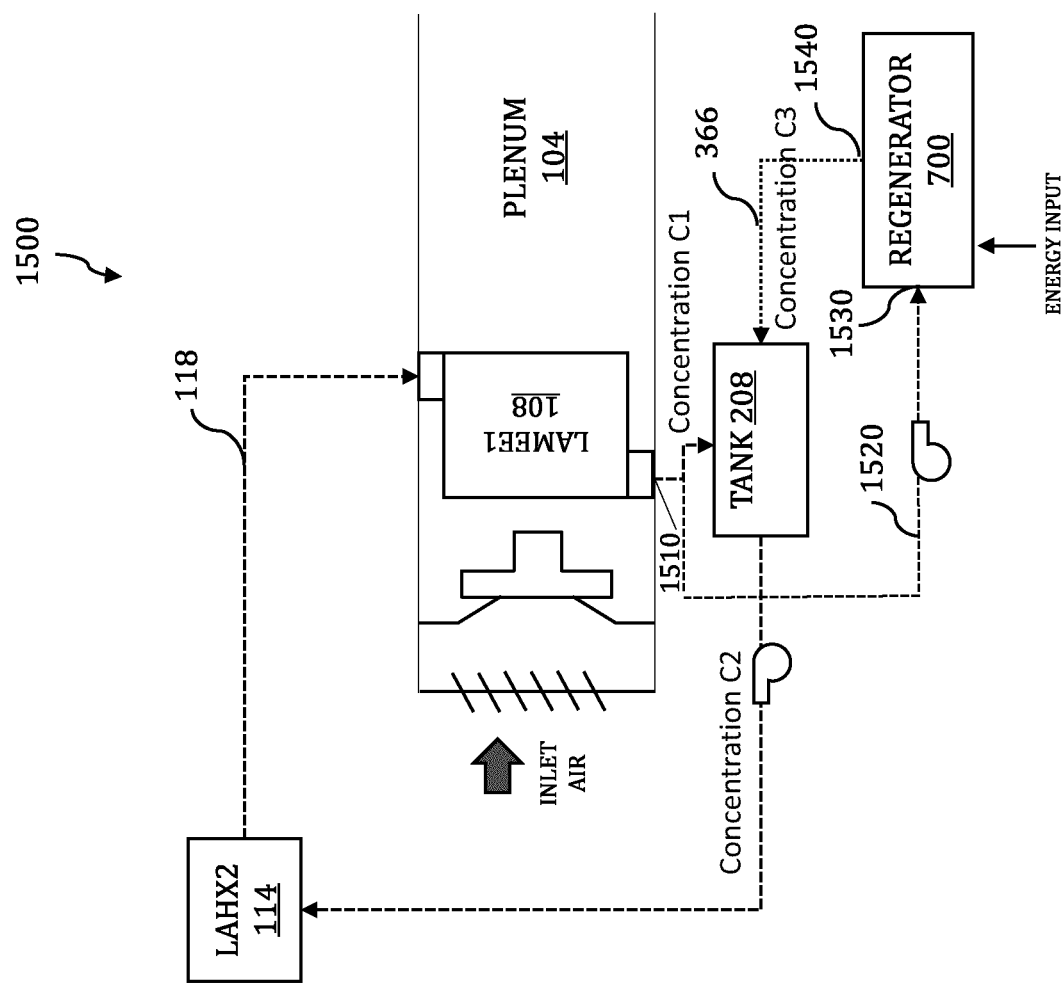
FIG. 15 depicts another example conditioning system.

FIG. 15 shows an example conditioning system 300 that can be similar to other example systems described and including an alternative design for the fluid circuits for regeneration. Only a portion of the system 1500 is shown in FIG. 15 for simplicity and it is recognized that additional components can be included. For example, only a portion of plenum 104 is shown in FIG. 15, but it is recognized that the plenum 104 can include some or all of the additional components shown and described above in reference to other examples.

LAMEE1 108 can be structured and operate in a similar manner as described in the above examples. The dilute desiccant exiting LAMEE1 108 at an outlet 1510 can be split into two flow paths-a first flow path to tank 208 or a second flow path directly to regenerator 700 (via a desiccant circuit 1520). Regenerator 700 can operate similar to the regenerators described above. The desiccant entering regenerator 700 at an inlet 1530 can be at a first concentration C1. The concentrated desiccant exiting the regenerator 700 at an outlet 1540 can be at a third concentration C3 and can be transported to the tank 208 for mixing with the desiccant already in the tank. As such, the desiccant in the tank 208 can be at a second concentration C2 that is greater than the first concentration C1 and less than the third concentration C3.

In contrast examples depicted and described above, instead of the dilute desiccant (at the concentration C1) mixing with the desiccant in the tank and then flowing to the regenerator (at the second concentration C2), the dilute desiccant exiting LAMEE1 108 in FIG. 15 is transported directly to the regenerator 700 at the first concentration C1. All of the desiccant exiting the tank 208 at the second concentration C2 is circulated through LAHX2 114 and back through LAMEE1, rather than selectively directing a portion of the desiccant at the second concentration C2 to the regenerator 700. Thus in the design of FIG. 15 the split of the desiccant flow path is at the outlet 1510 of LAMEE1 108, rather than at an outlet of the tank 208.

NOTES & EXAMPLES

The present application provides for the following exemplary embodiments or examples, the numbering of which is not to be construed as designating levels of importance:

Example 1 provides a system for controlling conditions in an enclosed space, the system comprising: a first plenum configured to direct a first air stream from a first inlet to a first outlet; a second plenum configured to direct a second air stream from a second inlet to a second outlet, the second inlet receiving heated air from the space and the second outlet supplying cooled air to the space; a first liquid-to-air membrane energy exchanger (LAMEE1) arranged inside the first plenum, LAMEE1 configured to use a liquid desiccant to lower an enthalpy of the first air stream; a second LAMEE (LAMEE2) arranged inside the first plenum downstream of LAMEE1, LAMEE2 configured to use the first air stream to evaporatively cool water flowing through LAMEE2; a first liquid-to-air heat exchanger (LAHX1) arranged inside the second plenum, LAHX1 configured to directly and sensibly cool the second air stream using a first cooling fluid; and a second LAHX (LAHX2) in fluid communication with LAMEE1, LAHX2 being configured to receive the liquid desiccant from LAMEE1 and cool the liquid desiccant using outdoor air.

Example 2 provides the system of Example 1 and optionally wherein LAMEE1 is configured to lower the enthalpy of the first air stream by removing water therefrom.

Example 3 provides the system of Example 1 and/or Example 2 and optionally wherein LAMEE1 is configured to lower the enthalpy of the first air stream by removing water therefrom and wherein at least a portion of the water flowing through LAMEE2 comprises the water removed from the first air stream by LAMEE1.

Example 4 provides the system of any of Examples 1-3 and optionally further comprising a pre-cooler coil arranged inside the scavenger plenum upstream of LAMEE2, the pre-cooler coil configured to condition the scavenger air prior to the scavenger air entering LAMEE2.

Example 5 provides the system of Example 4 and optionally wherein the pre-cooler coil is configured to receive at least a portion of the water cooled by LAMEE2 to condition the scavenger air.

Example 6 provides the system of Example 4 and optionally further comprising a fluid storage tank to store the water received from a fluid outlet of LAMEE2.

Example 7 provides the system of Example 6 and optionally further comprising a mechanical cooling system configured to cool the water in the storage tank using a first cooling fluid.

Example 8 provides the system of Example 6 and optionally further comprising a liquid-to-liquid heat exchanger (LLHX) configured to cool the water in the storage tank using a first cooling fluid.

Example 9 provides the system of Example 8 and optionally further comprising a third LAHX (LAHX3), LAHX3 arranged inside of the first plenum downstream of LAMEE2 and configured to cool at least one of the water and the first cooling fluid using the scavenger air.

Example 10 provides the system of Example 9 and optionally further comprising: a first fluid circuit configured to transport the water from a fluid outlet of LAMEE2, through the LLHX and return the water to a fluid inlet of LAMEE2; and a second fluid circuit fluidically isolated from the first fluid circuit, the second fluid circuit configured to transport the first cooling fluid from an outlet of LAHX3 through the LLHX to an inlet of LAHX1, and return the first cooling fluid from the fluid outlet of LAHX1 to a fluid inlet of LAHX3.

Example 11 provides the system of any of Examples 1-10 and optionally further comprising a direct exchange (DX) coil arranged inside the process plenum downstream of LAHX1, the DX coil being configured to cool the process air using a second cooling fluid flowing there through.

Example 12 provides the system of any of Examples 1-11 and optionally wherein LAMEE1 is configured to lower the enthalpy of the first air stream by removing water and heat therefrom, a temperature of the liquid desiccant at a fluid inlet of LAMEE1 being lower than a temperature of the liquid desiccant at a fluid outlet of LAMEE1.

Example 13 provides a system for controlling conditions in an enclosed space, the system comprising: a scavenger plenum configured to direct scavenger air from a scavenger inlet to a scavenger outlet; a process plenum configured to direct process air from a process inlet to a process outlet, the process inlet receiving heated air from the space and the process outlet supplying cooled air to the space; a first liquid-to-air membrane energy exchanger (LAMEE1) arranged inside the scavenger plenum, LAMEE1 configured to use a first fluid flowing through LAMEE1 to reduce a humidity of the scavenger air, a first concentration of water in the scavenger air at an air inlet of LAMEE1 being higher than a second concentration of water in the scavenger air at an air outlet of LAMEE1; an evaporative cooler arranged inside the scavenger plenum downstream of LAMEE1, the evaporative cooler configured to use the scavenger air to evaporatively cool a second fluid flowing there through, a temperature of the second fluid at a fluid outlet of the evaporative cooler being lower than a temperature of the second fluid at a fluid inlet of the evaporative cooler; a first liquid-to-air heat exchanger (LAHX1) arranged inside the process plenum, LAHX1 configured to directly and sensibly cool the process air being directed through the process plenum using a third fluid flowing through LAHX1; and a second LAHX (LAHX2), LAHX2 in fluid communication with LAMEE1 and configured to receive and cool the first fluid using outdoor air.

Example 14 provides the system of Example 13 and optionally wherein LAMEE1 is configured to lower the enthalpy of the first air stream by removing water therefrom.

Example 15 provides the system of Example 13 and/or Example 14 and optionally wherein the second fluid comprises water, and wherein LAMEE1 is configured to lower the enthalpy of the first air stream by removing water therefrom, and wherein at least a portion of the water flowing through the evaporative cooler comprises the water removed from the first air stream by LAMEE1.

Example 16 provides the system of any of Examples 13-15 and optionally further comprising a pre-cooler coil arranged inside the scavenger plenum upstream of LAMEE2, the pre-cooler coil configured to condition the scavenger air prior to the scavenger air entering LAMEE2.

Example 17 provides the system of Example 16 and optionally wherein the pre-cooler coil is configured to receive at least a portion of the second fluid cooled by the evaporative cooler to condition the scavenger air.

Example 18 provides the system of Example 16 and optionally further comprising a fluid storage tank to store the second fluid received from a fluid outlet of the evaporative cooler.

Example 19 provides the system of Example 18 and optionally further comprising a mechanical cooling system configured to cool the second fluid in the storage tank using a first cooling fluid.

Example 20 provides the system of Example 18 and optionally further comprising a liquid-to-liquid heat exchanger (LLHX) configured to cool the second fluid in the storage tank using a first cooling fluid.

Example 21 provides the system of Example 20 and optionally further comprising a third LAHX (LAHX3), LAHX3 arranged inside of the first plenum downstream of the evaporative cooler and configured to cool at least one of the second fluid and the first cooling fluid using the scavenger air.

Example 22 provides the system of Example 21 and optionally further comprising: a first fluid circuit configured to transport the water from a fluid outlet of the evaporative cooler, through the LLHX and return the water to a fluid inlet of the evaporative cooler; and a second fluid circuit fluidically isolated from the first fluid circuit, the second fluid circuit configured to transport the first cooling fluid from an outlet of LAHX3 through the LLHX to an inlet of LAHX1, and return the first cooling fluid from the fluid outlet of LAHX1 to a fluid inlet of LAHX3.

Example 23 provides the system of any of Examples 13-22 and optionally further comprising a direct exchange (DX) coil arranged inside the process plenum downstream of LAHX1, the DX coil being configured to cool the process air using a second cooling fluid flowing there through.

Example 24 provides the system of any of Examples 13-23 and optionally wherein LAMEE1 is configured to lower the enthalpy of the first air stream by removing water and heat therefrom, a temperature of the liquid desiccant at a fluid inlet of LAMEE1 being lower than a temperature of the liquid desiccant at a fluid outlet of LAMEE1.

Example 25 provides a method for controlling conditions in an enclosed space, the method comprising: directing a first air stream through a first liquid-to-air membrane energy exchanger (LAMEE1) arranged inside a first plenum, LAMEE1 configured to use a liquid desiccant to lower an enthalpy of the first air stream; directing the first air stream through a second LAMEE (LAMEE2) arranged inside the first plenum downstream of LAMEE1, LAMEE2 configured to use the first air stream to evaporatively cool water flowing through LAMEE2; directing a first cooling fluid through a first liquid-to-air heat exchanger (LAHX1) arranged inside a second plenum, the second plenum configured to direct a second air stream from a second inlet to a second outlet, the second inlet receiving heated air from the space and the second outlet supplying cooled air to the space, LAHX1 configured to directly and sensibly cool the second air stream using the first cooling fluid; and directing the liquid desiccant through a second LAHX (LAHX2) in fluid communication with LAMEE1, LAHX2 being configured to cool the liquid desiccant using outdoor air.

Example 26 provides a system for controlling conditions in an enclosed space, the system comprising: a first plenum configured to direct a first air stream from a first inlet to a first outlet; a second plenum configured to direct a second air stream from a second inlet to a second outlet, the second inlet receiving heated air from the space and the second outlet supplying cooled air to the space; a first liquid-to-air membrane energy exchanger (LAMEE1) arranged inside the first plenum, LAMEE1 configured to use a liquid desiccant to lower an enthalpy of the first air stream; an evaporative cooler arranged inside the first plenum downstream of LAMEE1, the evaporative cooler configured to use the first air stream to evaporatively cool water flowing therethrough; a first liquid-to-air heat exchanger (LAHX1) arranged inside the second plenum, LAHX1 configured to directly and sensibly cool the second air stream using a first cooling fluid; and a second LAHX (LAHX2) in fluid communication with LAMEE1, LAHX2 being configured to receive the liquid desiccant from LAMEE1 and cool the liquid desiccant using outdoor air.

Example 27 provides the system of Example 26 and optionally wherein the evaporative cooler comprises a second LAMEE.

Example 28 provides the system of Example 26 and/or Example 27 and optionally wherein LAMEE1 is configured to lower the enthalpy of the first air stream by removing water therefrom.

Example 29 provides the system of any of Examples 26-28 and optionally wherein LAMEE1 is configured to lower the enthalpy of the first air stream by removing water therefrom and wherein at least a portion of the water flowing through LAMEE2 comprises the water removed from the first air stream by LAMEE1.

Example 29 provides the system of any of Examples 26-29 and optionally wherein LAMEE1 is configured to lower the enthalpy of the first air stream by removing water and heat therefrom, a temperature of the liquid desiccant at a fluid inlet of LAMEE1 being lower than a temperature of the liquid desiccant at a fluid outlet of LAMEE1.

Various examples according to this disclosure have been described. These and other examples are within the scope of the following claims.

What is claimed is:

1. A system for controlling conditions in an enclosed space, the system comprising:
   a first plenum configured to direct a first air stream from a first inlet to a first outlet;
   a second plenum configured to direct a second air stream from a second inlet to a second outlet, the second inlet receiving heated air from the space and the second outlet supplying cooled air to the space;
   a first liquid-to-air membrane energy exchanger (LAMEE1) arranged inside the first plenum, LAMEE1 configured to use a liquid desiccant to lower an enthalpy of the first air stream;
   a second LAMEE (LAMEE2) arranged inside the first plenum downstream of LAMEE1, LAMEE2 configured to use the first air stream to evaporatively cool water flowing through LAMEE2;
   a first liquid-to-air heat exchanger (LAHX1) arranged inside the second plenum, LAHX1 configured to directly and sensibly cool the second air stream using a first cooling fluid; and
   a second LAHX (LAHX2) in fluid communication with LAMEE1, LAHX2 being configured to receive the liquid desiccant from LAMEE1 and cool the liquid desiccant using outdoor air.

2. The system of claim 1, wherein LAMEE1 is configured to lower the enthalpy of the first air stream by removing water therefrom.

3. The system of claim 1, wherein LAMEE1 is configured to lower the enthalpy of the first air stream by removing water therefrom and wherein at least a portion of the water flowing through LAMEE2 comprises the water removed from the first air stream by LAMEE1.

4. The system of claim 1, further comprising a pre-cooler coil arranged inside the first plenum upstream of LAMEE2, the pre-cooler coil configured to condition the first air stream prior to the first air stream entering LAMEE2.

5. The system of claim 4, wherein the pre-cooler coil is configured to receive at least a portion of the water cooled by LAMEE2 to condition the first air stream.

6. The system of claim 4, further comprising a fluid storage tank to store the water received from a fluid outlet of LAMEE2.

7. The system of claim 6, further comprising a mechanical cooling system configured to cool the water in the storage tank using the first cooling fluid.

8. The system of claim 6, further comprising a liquid-to-liquid heat exchanger (LLHX) configured to cool the water in the storage tank using the first cooling fluid.

9. The system of claim 8, further comprising a third LAHX (LAHX3), LAHX3 arranged inside of the first plenum downstream of LAMEE2 and configured to cool at least one of the water and the first cooling fluid using the first air stream.

10. The system of claim 9, further comprising:
    a first fluid circuit configured to transport the water from a fluid outlet of LAMEE2, through the LLHX and return the water to a fluid inlet of LAMEE2; and
    a second fluid circuit fluidically isolated from the first fluid circuit, the second fluid circuit configured to transport the first cooling fluid from an outlet of LAHX3 through the LLHX to an inlet of LAHX1, and return the first cooling fluid from the fluid outlet of LAHX1 to a fluid inlet of LAHX3.

11. The system of claim 1, further comprising a direct exchange (DX) coil arranged inside the second plenum downstream of LAHX1, the DX coil being configured to cool the second air stream using a second cooling fluid flowing there through.

12. The system of claim 1, wherein LAMEE1 is configured to lower the enthalpy of the first air stream by removing water and heat therefrom, a temperature of the liquid desiccant at a fluid inlet of LAMEE1 being lower than a temperature of the liquid desiccant at a fluid outlet of LAMEE1.

13. The system of claim 1, further comprising a third LAHX (LAHX3) arranged inside of the first plenum downstream of LAMEE2 and configured to receive the first cooling fluid from LAHX1 and to cool the first cooling fluid using the first air stream.

14. The system of claim 13, wherein:
    the first cooling fluid is the water; and
    the water flows from an outlet of the LAHX3 to an inlet of the LAMEE2.

15. A system for controlling conditions in an enclosed space, the system comprising:
    a scavenger plenum configured to direct scavenger air from a scavenger inlet to a scavenger outlet;
    a process plenum configured to direct process air from a process inlet to a process outlet, the process inlet receiving heated air from the space and the process outlet supplying cooled air to the space;
    a first liquid-to-air membrane energy exchanger (LAMEE1) arranged inside the scavenger plenum, LAMEE1 configured to use a first fluid flowing through LAMEE1 to reduce a humidity of the scavenger air, a first concentration of water in the scavenger air at an air inlet of LAMEE1 being higher than a second concentration of water in the scavenger air at an air outlet of LAMEE1;
    an evaporative cooler arranged inside the scavenger plenum downstream of LAMEE1, the evaporative cooler configured to use the scavenger air to evaporatively cool a second fluid flowing there through, a temperature of the second fluid at a fluid outlet of the evaporative cooler being lower than a temperature of the second fluid at a fluid inlet of the evaporative cooler;
    a first liquid-to-air heat exchanger (LAHX1) arranged inside the process plenum, LAHX1 configured to directly and sensibly cool the process air being directed through the process plenum using a third fluid flowing through LAHX1; and
    a second LAHX (LAHX2), LAHX2 in fluid communication with LAMEE1 and configured to receive the first fluid from the LAMEE1 and cool the first fluid using outdoor air.

16. The system of claim 15, wherein LAMEE1 is configured to lower the enthalpy of the scavenger air by removing water therefrom.

17. The system of claim 15, wherein the second fluid comprises water, and wherein LAMEE1 is configured to lower the enthalpy of the scavenger air by removing water therefrom, and wherein at least a portion of the water flowing through the evaporative cooler comprises the water removed from the scavenger air by LAMEE1.

18. The system of claim 15, further comprising a pre-cooler coil arranged inside the scavenger plenum upstream of LAMEE2, the pre-cooler coil configured to condition the scavenger air prior to the scavenger air entering LAMEE2.

19. The system of claim 18, wherein the pre-cooler coil is configured to receive at least a portion of the second fluid cooled by the evaporative cooler to condition the scavenger air.

20. The system of claim 18, further comprising a fluid storage tank to store the second fluid received from a fluid outlet of the evaporative cooler.

21. The system of claim 20, further comprising a mechanical cooling system configured to cool the second fluid in the storage tank using a first cooling fluid.

22. The system of claim 20, further comprising a liquid-to-liquid heat exchanger (LLHX) configured to cool the second fluid in the storage tank using a first cooling fluid.

23. The system of claim 22, further comprising a third LAHX (LAHX3), LAHX3 arranged inside of the scavenger plenum downstream of the evaporative cooler and configured to cool at least one of the second fluid and the first cooling fluid using the scavenger air.

24. The system of claim 23, further comprising:
a first fluid circuit configured to transport the water from a fluid outlet of the evaporative cooler, through the LLHX and return the water to a fluid inlet of the evaporative cooler; and
a second fluid circuit fluidically isolated from the first fluid circuit, the second fluid circuit configured to transport the first cooling fluid from an outlet of LAHX3 through the LLHX to an inlet of LAHX1, and return the first cooling fluid from the fluid outlet of LAHX1 to a fluid inlet of LAHX3.

25. The system of claim 15, further comprising a third LAHX (LAHX3) arranged inside of the scavenger plenum downstream of evaporative cooler and configured to receive the third fluid from LAHX1 and to cool the third fluid using the scavenger air.

26. The system of claim 25, wherein:
the third fluid is the second fluid; and
the water flows from an outlet of the LAHX3 to an inlet of the evaporative cooler.

27. A method for controlling conditions in an enclosed space, the method comprising:
directing a first air stream through a first liquid-to-air membrane energy exchanger (LAMEE1) arranged inside a first plenum, LAMEE1 configured to use a liquid desiccant to lower an enthalpy of the first air stream;
directing the first air stream through a second LAMEE (LAMEE2) arranged inside the first plenum downstream of LAMEE1, LAMEE2 configured to use the first air stream to evaporatively cool water flowing through LAMEE2;
directing a first cooling fluid through a first liquid-to-air heat exchanger (LAHX1) arranged inside a second plenum, the second plenum configured to direct a second air stream from a second inlet to a second outlet, the second inlet receiving heated air from the space and the second outlet supplying cooled air to the space, LAHX1 configured to directly and sensibly cool the second air stream using the first cooling fluid; and
directing the liquid desiccant through a second LAHX (LAHX2) in fluid communication with LAMEE1, LAHX2 being configured to receive the liquid desiccant from the LAMEE1 and to cool the liquid desiccant using outdoor air.

28. The method of claim 27, further comprising directing the first cooling fluid received from the LAHX1 through a third LAHX (LAHX3), the LAHX3 arranged inside the first plenum downstream of the LAMEE2 and configured to cool the first cooling fluid using the first air stream.

29. The method of claim 28, wherein:
the first cooling fluid is the water; and
the water flows from an outlet of the LAHX3 to an inlet of the LAMEE2.

* * * * *